(12) United States Patent
Yeoh

(10) Patent No.: US 11,173,656 B2
(45) Date of Patent: Nov. 16, 2021

(54) ADDITIVE MANUFACTURING SYSTEM USING INTERLINKED REPEATING SUBUNITS

(71) Applicant: Ivan Li Chuen Yeoh, Tampa, FL (US)

(72) Inventor: Ivan Li Chuen Yeoh, Tampa, FL (US)

( * ) Notice: Subject to any disclaimer, the term of this patent is extended or adjusted under 35 U.S.C. 154(b) by 137 days.

(21) Appl. No.: 16/270,253

(22) Filed: Feb. 7, 2019

(65) Prior Publication Data

US 2019/0299519 A1 Oct. 3, 2019

Related U.S. Application Data

(60) Provisional application No. 62/651,731, filed on Apr. 3, 2018.

(51) Int. Cl.
*B29C 64/00* (2017.01)
*B29C 64/141* (2017.01)
(Continued)

(52) U.S. Cl.
CPC ............ *B29C 64/141* (2017.08); *B22F 10/10* (2021.01); *B28B 1/001* (2013.01); *B29C 64/20* (2017.08);
(Continued)

(58) Field of Classification Search
CPC .............................. B29C 64/141; B33Y 10/00
See application file for complete search history.

(56) References Cited

U.S. PATENT DOCUMENTS 3,875,878 A * 4/1975 Kaminski ............ D05B 23/002
112/116
3,997,318 A 12/1976 Takatoki et al.
(Continued)

FOREIGN PATENT DOCUMENTS

EP 3181273 A1 6/2017
EP 3 208 077 A1 8/2017
(Continued)

OTHER PUBLICATIONS

Translation of Korea Patent KR101210358B1 with a publication date of Dec. 11, 2012; Applicant: Wonkwang University Industry-Academy Collaboration Foundation.
(Continued)

*Primary Examiner* — Leith S Shafi
*Assistant Examiner* — Nicholas R Krasnow
(74) *Attorney, Agent, or Firm* — Smith & Hopen, P.A.; Paul Murty

(57) ABSTRACT

An additive manufacturing system and an input material that overcomes that need to heat and extrude solidifying materials to create a three-dimensional structure. The system arranges subunits of the input material into repeating, interlinked subunits that can be arranged to manufacture a three-dimensional structure that is flexible but also has sufficient structural integrity to retain a desired shape during the additive manufacturing process or post-manufacturing usage. During the additive manufacturing process, the flexible input material can be manipulated and reformed to match the shape and structure of a target three-dimensional structure, upon which the manufactured three-dimensional structure is based. As elongated units of the input material are received by the additive manufacturing machine, the machine assembles the input material into the interlinked, repeating subunits, thereby removing the need to heat and extrude an input material to create a structure.

1 Claim, 66 Drawing Sheets

(51) Int. Cl.
  *B33Y 10/00* (2015.01)
  *B33Y 30/00* (2015.01)
  *B29C 64/20* (2017.01)
  *B28B 1/00* (2006.01)
  *B33Y 70/00* (2020.01)
  *B22F 10/10* (2021.01)

(52) U.S. Cl.
  CPC .............. *B33Y 10/00* (2014.12); *B33Y 30/00* (2014.12); *B33Y 70/00* (2014.12)

(56) References Cited

U.S. PATENT DOCUMENTS

| | | | |
|---|---|---|---|
| 4,346,741 A | | 8/1982 | Banos et al. |
| 5,042,273 A | * | 8/1991 | Luigi ..................... D04B 27/08 66/208 |
| 5,231,855 A | | 8/1993 | Seta |
| 5,445,092 A | * | 8/1995 | Washburn, Jr. .......... D05B 1/20 112/116 |
| 5,987,929 A | * | 11/1999 | Bostani .................. D04B 35/00 66/1 R |
| 6,086,968 A | | 7/2000 | Horovitz |
| 6,129,122 A | | 10/2000 | Bilisik |
| 6,289,700 B1 | * | 9/2001 | Gangi ...................... D02G 3/42 28/144 |
| 7,251,960 B1 | * | 8/2007 | Zorini ..................... D04B 25/06 66/204 |
| 9,750,317 B2 | | 9/2017 | Ng |
| 2014/0150292 A1 | | 6/2014 | Podhajny et al. |
| 2014/0216110 A1 | * | 8/2014 | Smelcer .................. D04B 3/02 66/118 |
| 2016/0114532 A1 | | 4/2016 | Schirtzinger et al. |
| 2016/0167296 A1 | * | 6/2016 | Hudson .................. B33Y 10/00 264/40.7 |
| 2016/0288417 A1 | | 10/2016 | McCann et al. |
| 2017/0066196 A1 | | 3/2017 | Beard et al. |
| 2017/0087768 A1 | * | 3/2017 | Bheda ................... B29C 64/112 |
| 2017/0129171 A1 | * | 5/2017 | Gardner ................. B33Y 50/02 |
| 2017/0129178 A1 | | 5/2017 | Waatti et al. |
| 2017/0165908 A1 | | 6/2017 | Pattinson et al. |
| 2018/0036916 A1 | * | 2/2018 | Pettey .................. B29C 33/3842 |
| 2018/0132579 A1 | | 5/2018 | Ng |
| 2019/0344477 A1 | * | 11/2019 | Huffa ...................... B29B 11/16 |
| 2020/0149269 A1 | * | 5/2020 | Crump ................ B28B 23/0006 |
| 2020/0223121 A1 | * | 7/2020 | Batchelder ............ B29C 64/209 |

FOREIGN PATENT DOCUMENTS

| | | |
|---|---|---|
| KR | 101210358 B1 | 12/2012 |
| KR | 101275659 B1 | 6/2013 |
| WO | 03082550 A2 | 10/2003 |

OTHER PUBLICATIONS

International Search Report and Written Opinion for PCT/US19/23889 (filing date: Mar. 25, 2019) dated Jun. 20, 2019; Applicant: Ivan Li Chuen Yeoh.
International Preliminary Report on Patentability for PCT/US19/23889 (filing date: Mar. 25, 2019) dated Oct. 15, 2020; Applicant: Ivan Li Chuen Yeoh.
Translation of Korea Patent KR101275659B1 with a filing date of Dec. 26, 2011; Applicant: Wonkwang University Industry-Academy Collaboration Foundation.

\* cited by examiner

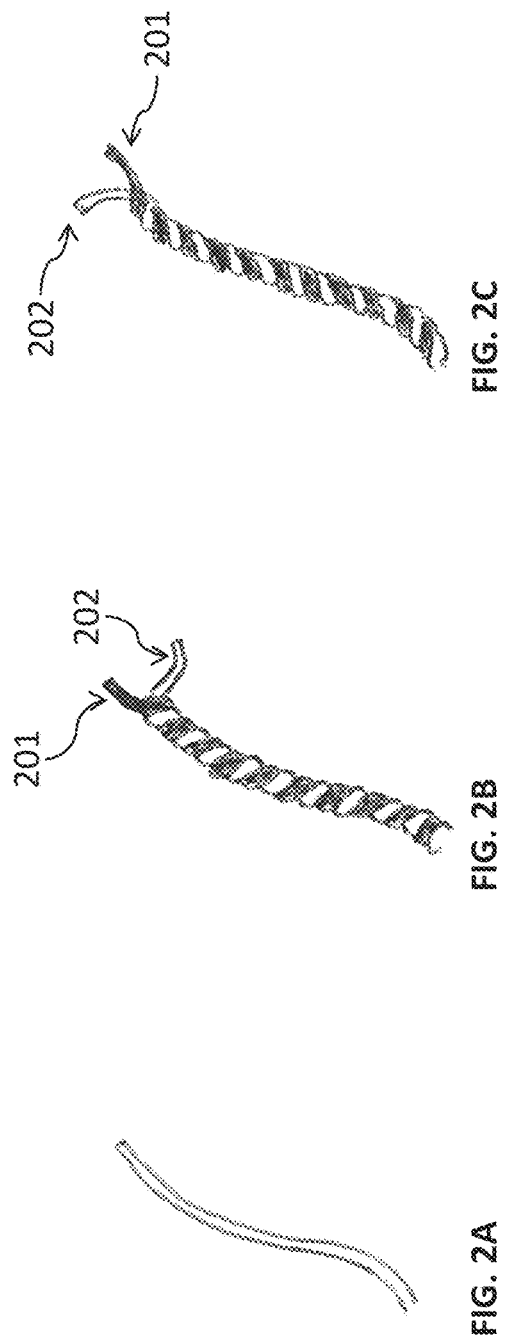
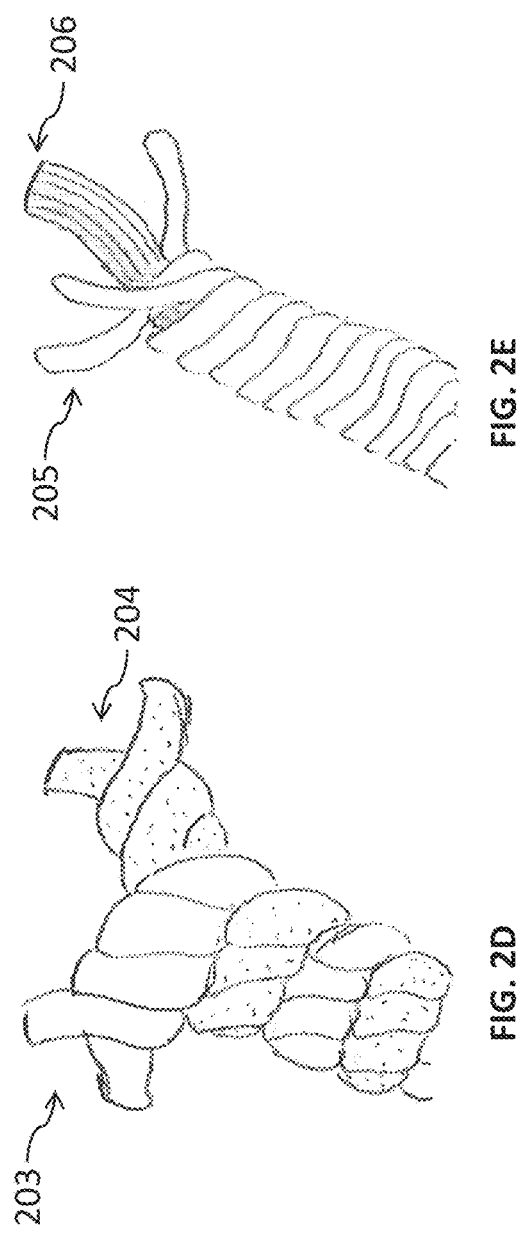

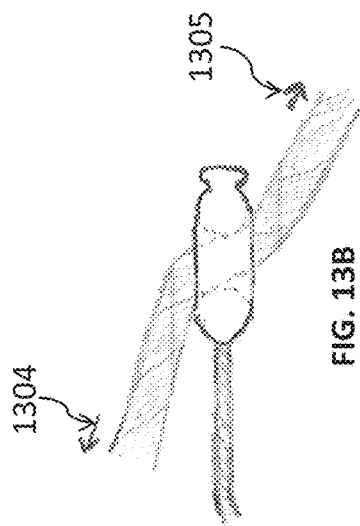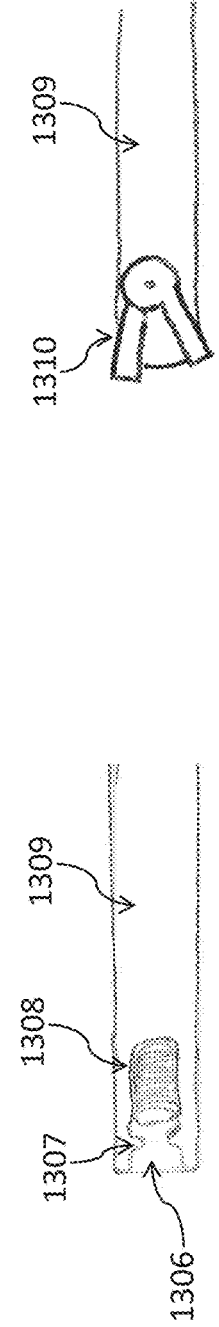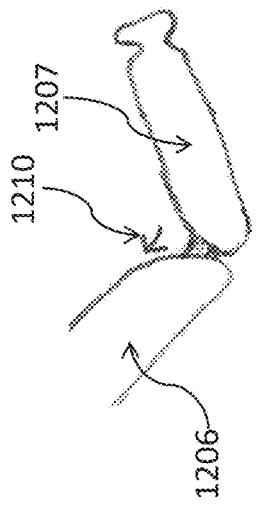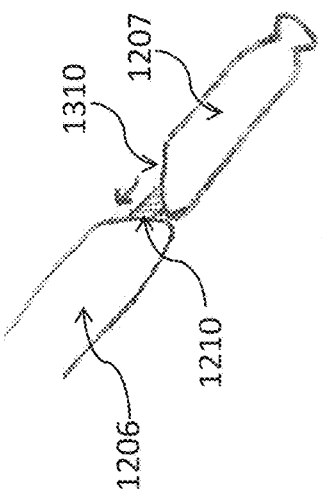
FIG. 13A  FIG. 13B  FIG. 13C  FIG. 13D  FIG. 13E  FIG. 13F

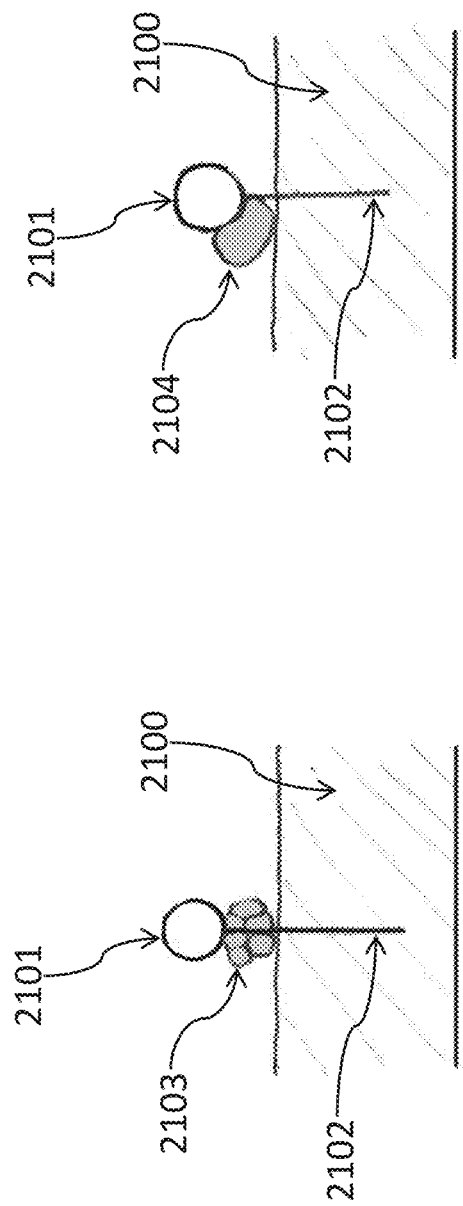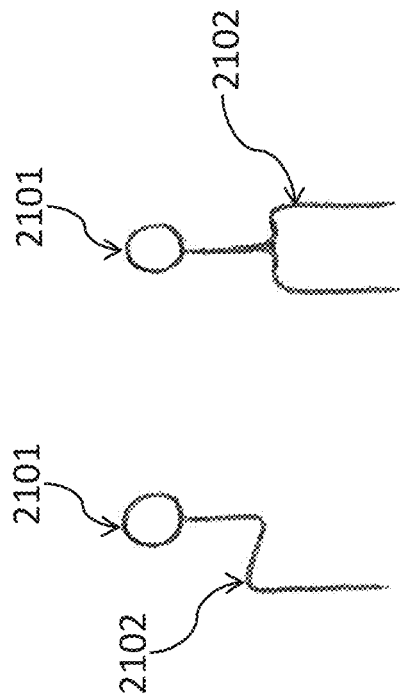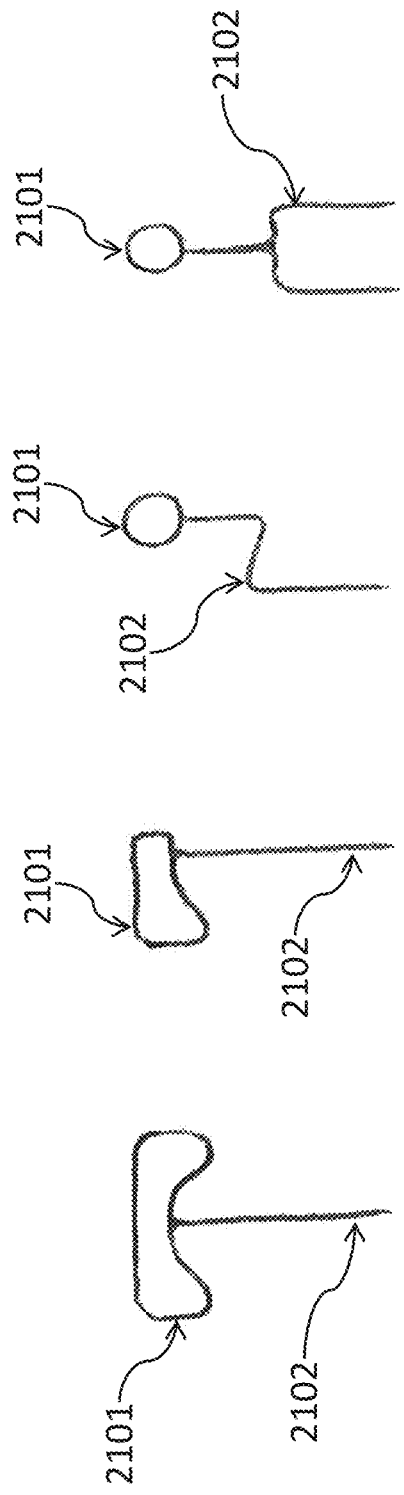
FIG. 21A
FIG. 21B
FIG. 21C
FIG. 21D
FIG. 21E
FIG. 21F

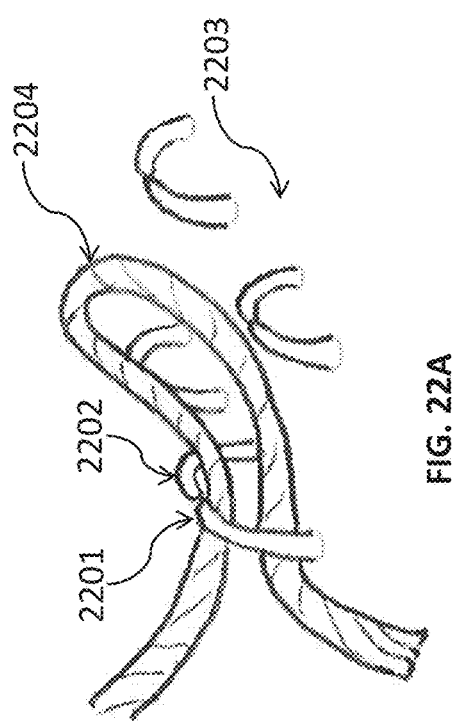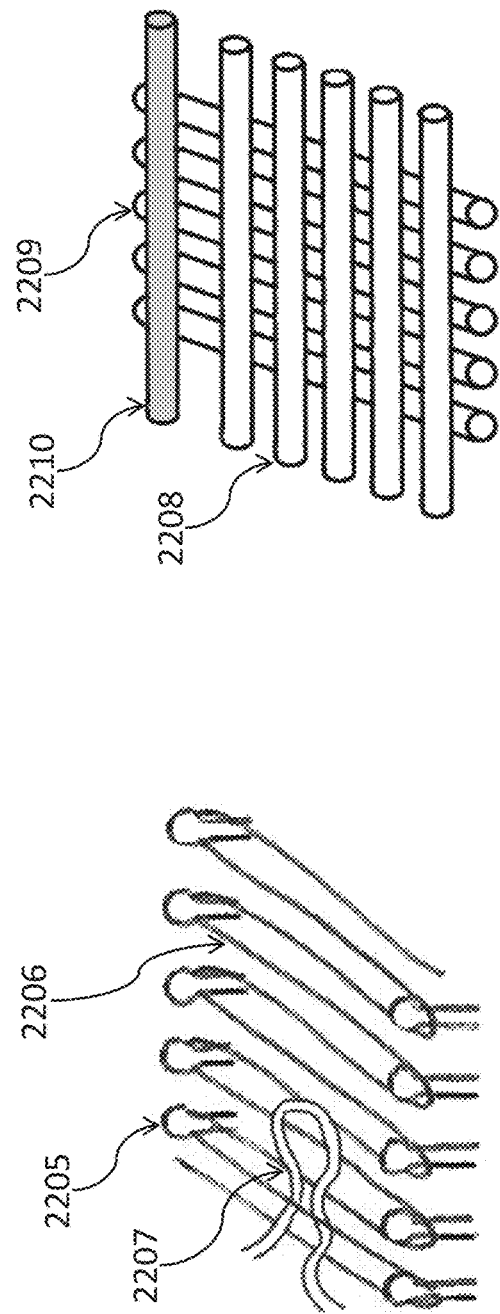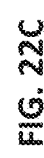
FIG. 22A
FIG. 22B
FIG. 22C

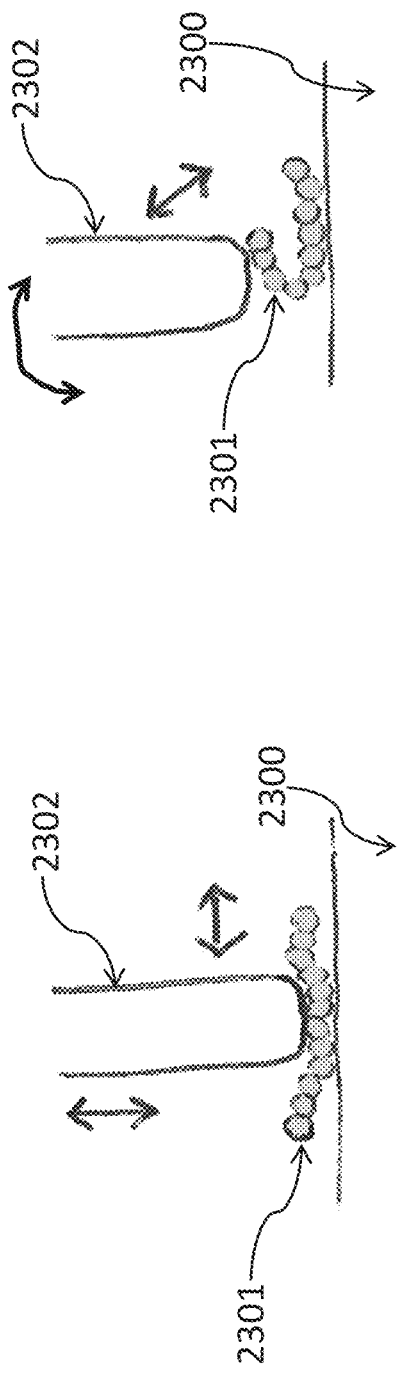
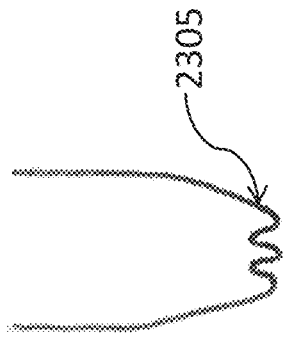
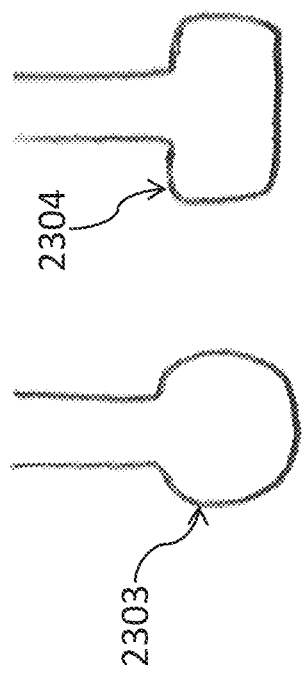
FIG. 23A
FIG. 23B
FIG. 23C
FIG. 23D
FIG. 23E

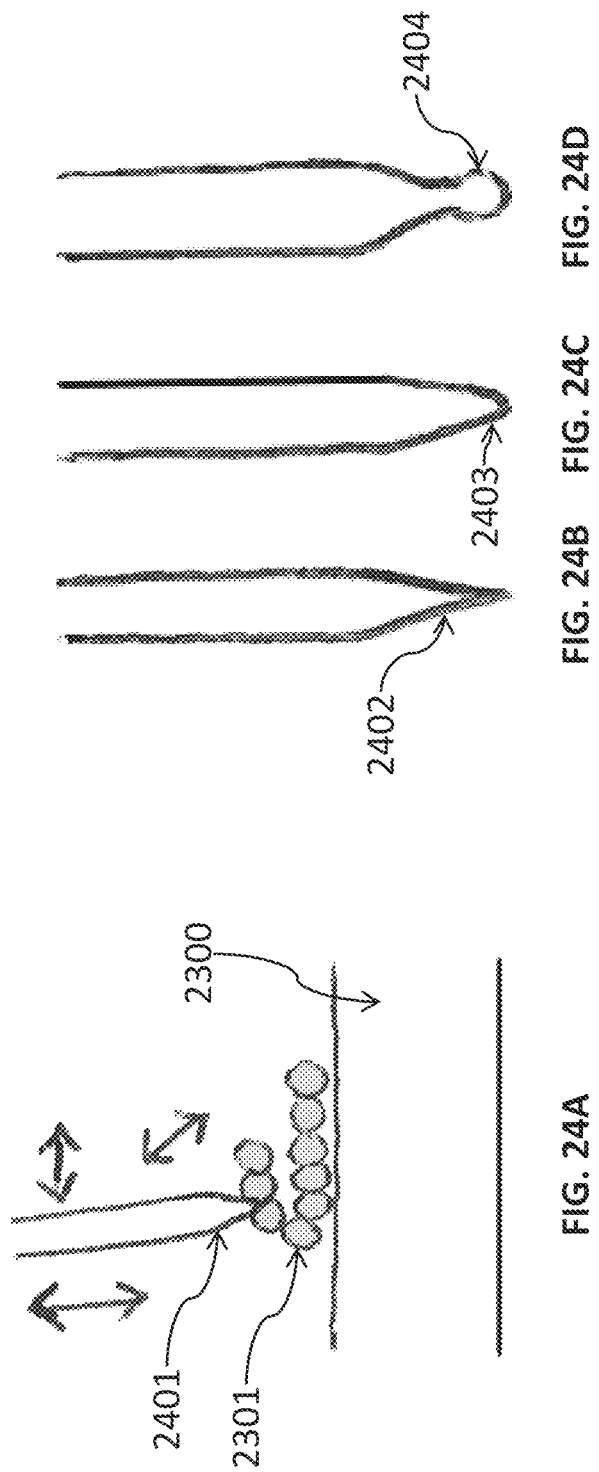

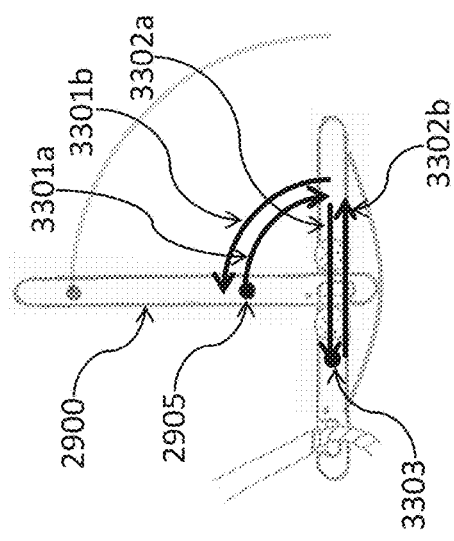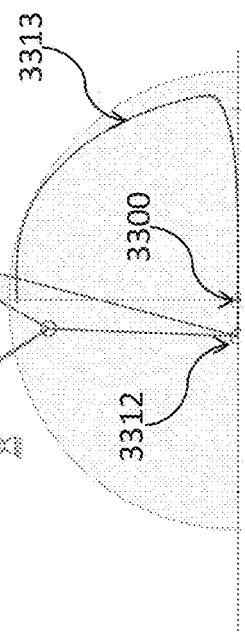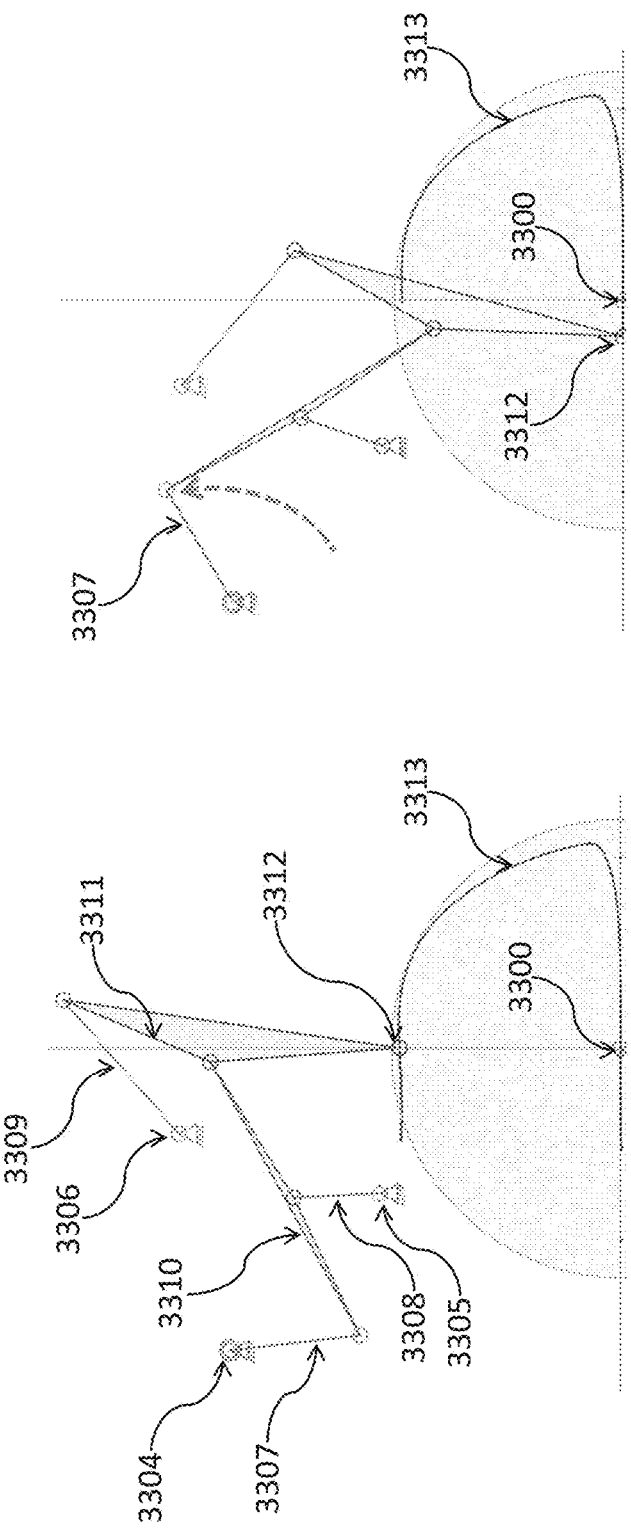

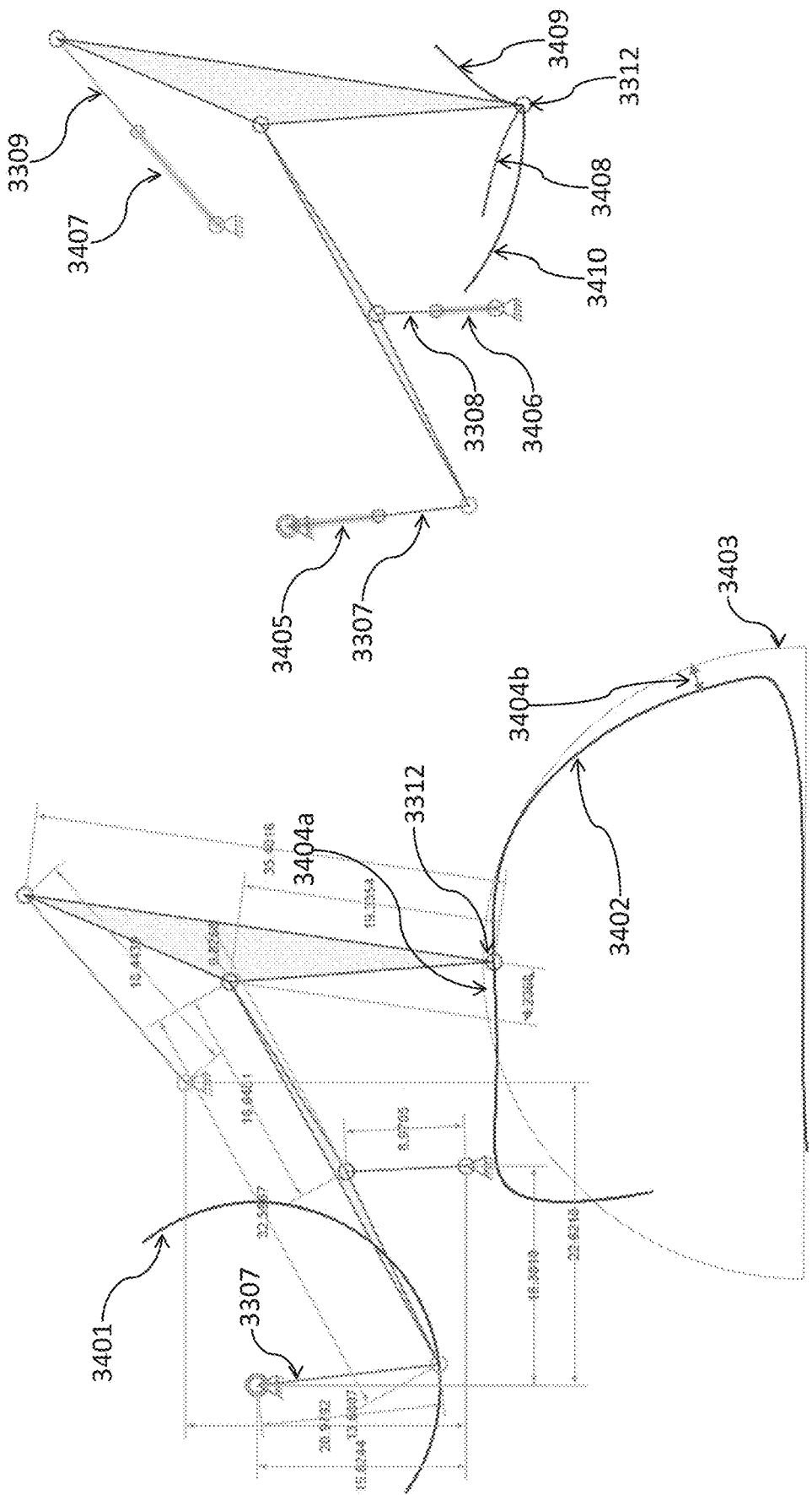

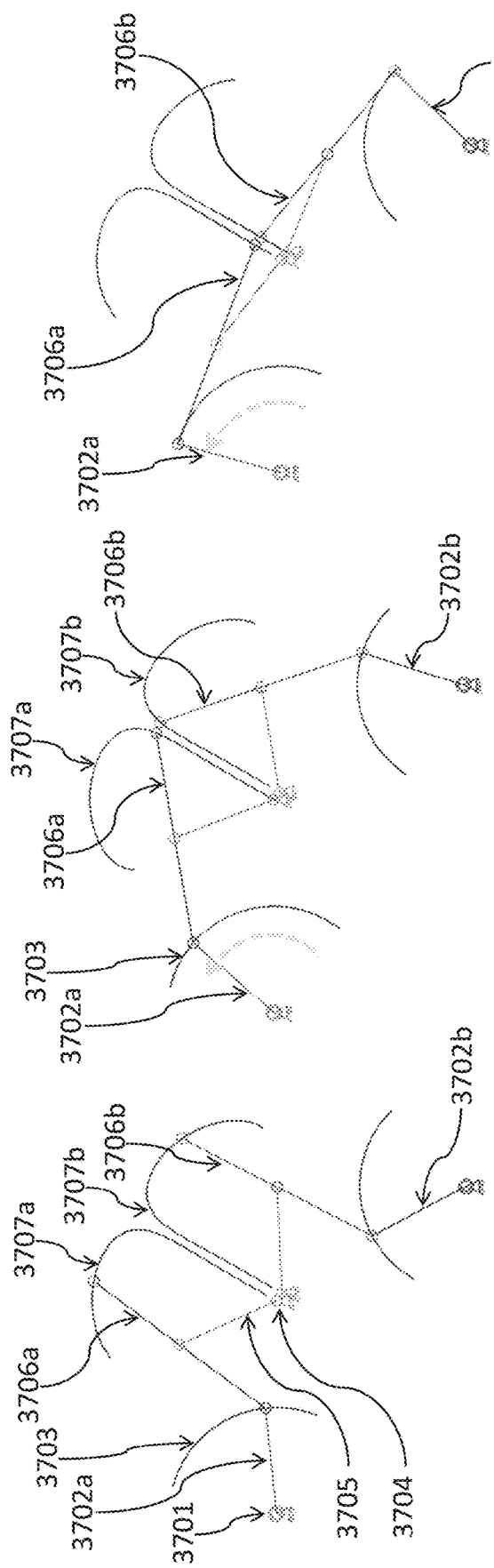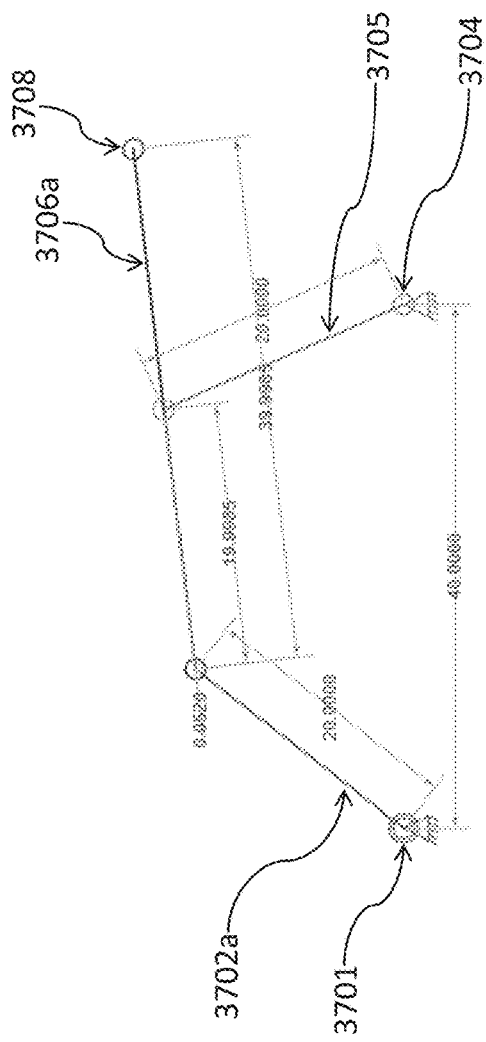
FIG. 37A
FIG. 37B
FIG. 37C
FIG. 37D

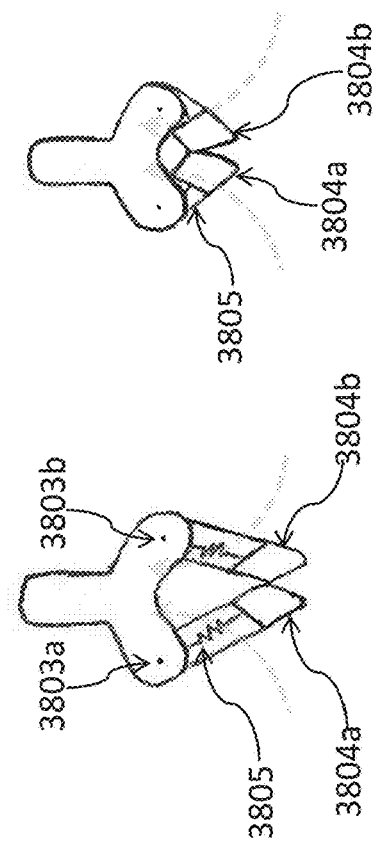
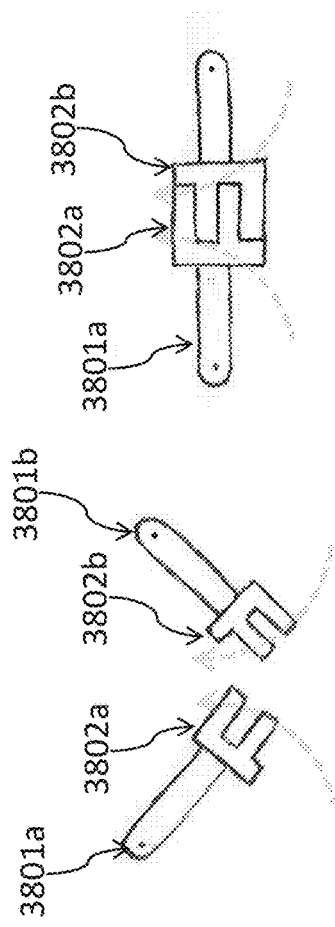
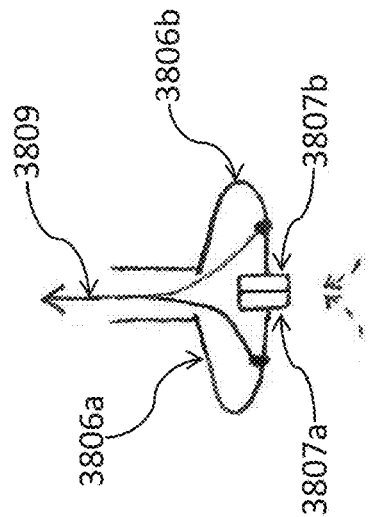
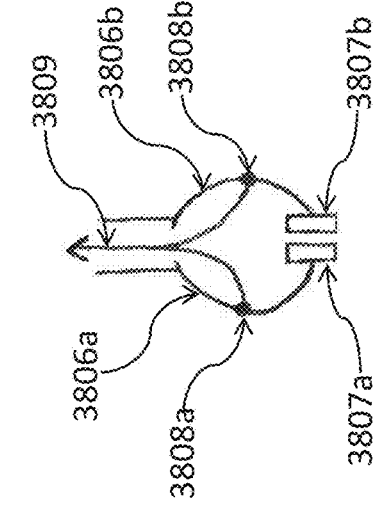
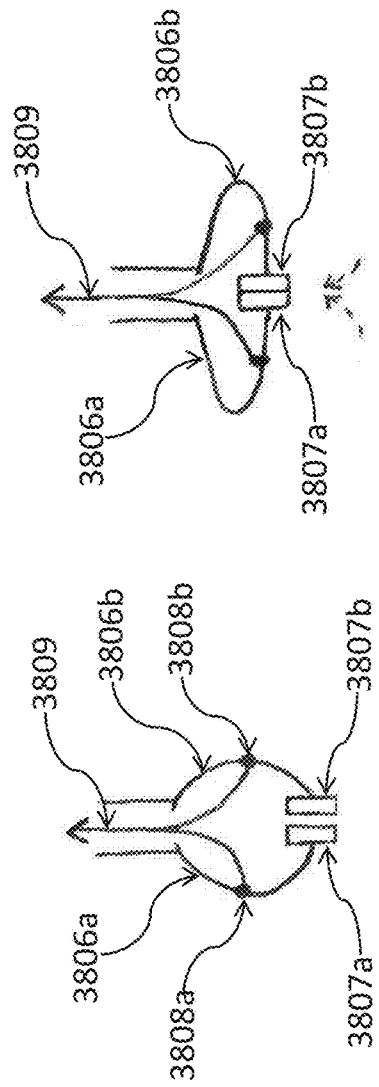
FIG. 38A  FIG. 38B  FIG. 38C  FIG. 38D  FIG. 38E  FIG. 38F

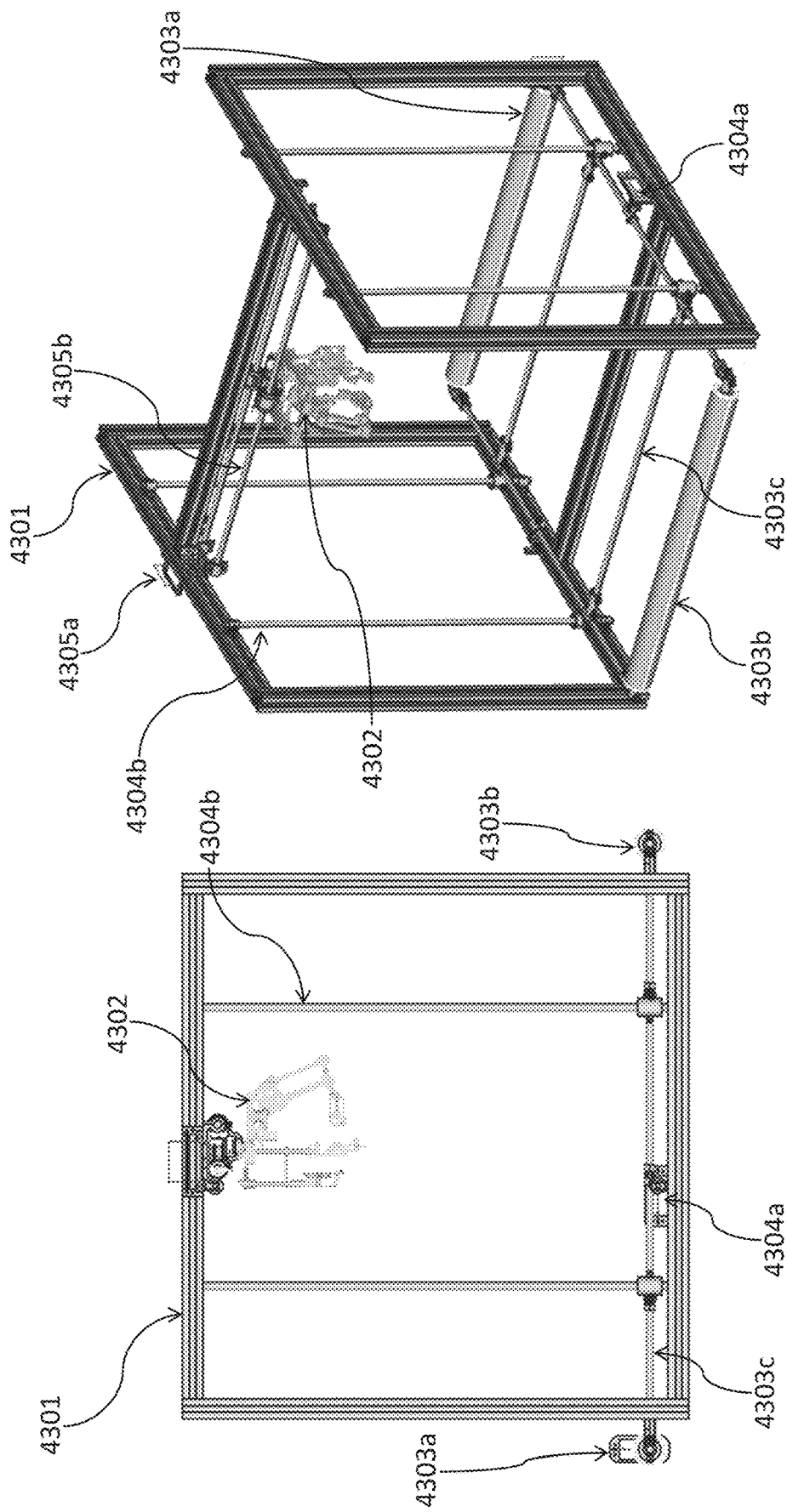

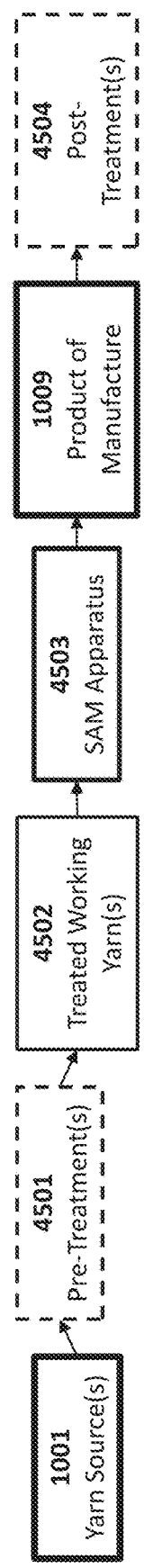
FIG. 44
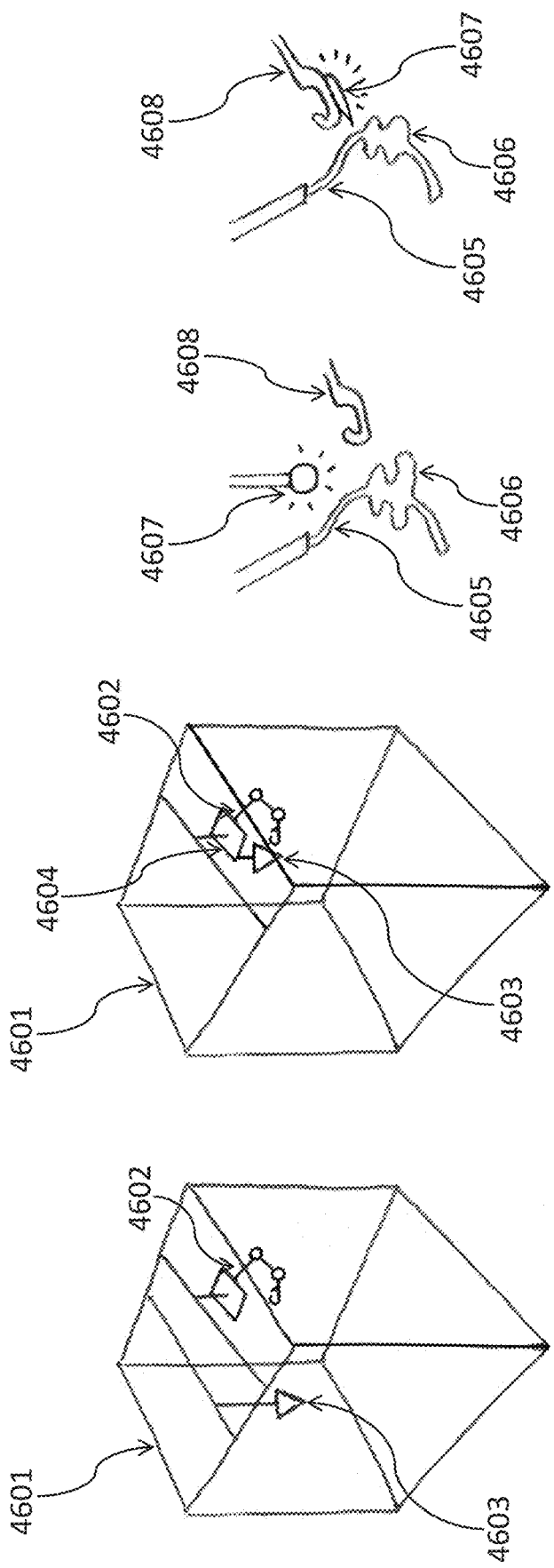
FIG. 45A
FIG. 45B
FIG. 45C
FIG. 45D

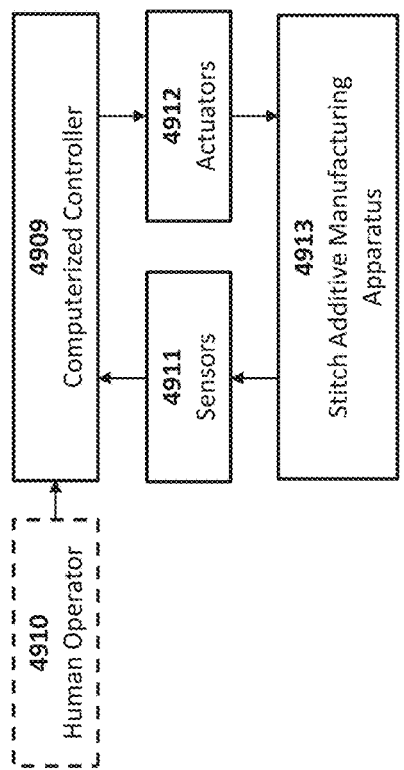
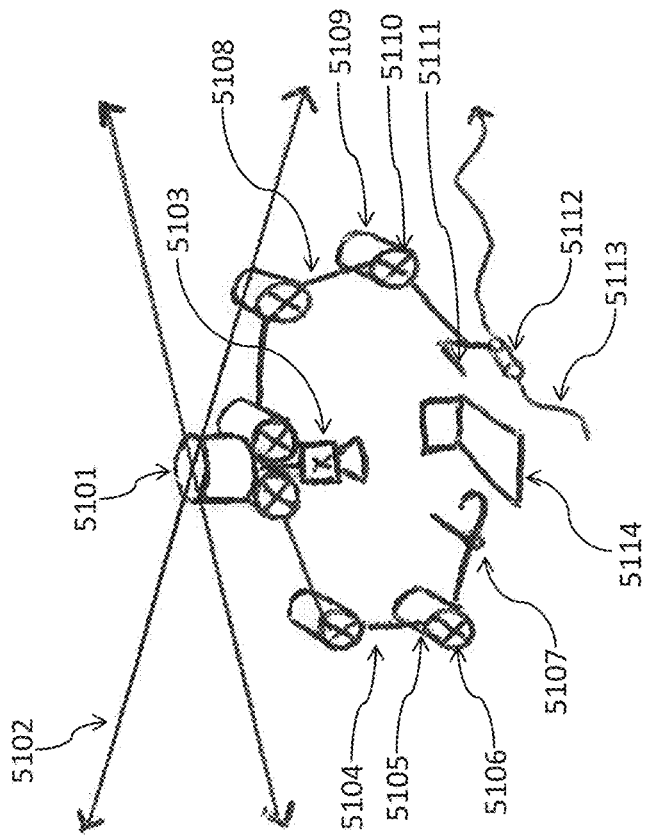
FIG. 50

ADDITIVE MANUFACTURING SYSTEM USING INTERLINKED REPEATING SUBUNITS

CROSS-REFERENCE TO RELATED APPLICATIONS

This nonprovisional application is a continuation of and claims priority to provisional application No. 62/651,731, entitled "Systems and methods of manufacturing using yarn-like input," filed Apr. 3, 2018, by the same inventor.

BACKGROUND OF THE INVENTION

1. Field of the Invention

This invention relates, generally, to additive manufacturing systems. More specifically, it relates to improved input materials and output structures for additive manufacturing machines, such as yarn-like input interlinked as subunits into the output macro-structure, allowing for customization of flexibility, tensile strength and other properties of the printed piece, beyond the capabilities of typically-used binder-powder, heat-fusible or photo/thermo-polymerizing raw materials and traditional additive manufacturing systems and methods.

2. Brief Description of the Prior Art

Additive manufacturing practices have been used since at least as early as the 1980s to make custom three-dimensional structures by progressively consolidating material together, as opposed to traditional machining practices which typically perform material removal to make parts with more limited shapes, dictated by the machining process. As such, an additive manufacturing machine could generate an entire structure during one or more printing sessions, as opposed to a series of machined or bulk-formed sub-parts being fabricated and then manually assembled into a final desired three-dimensional structure. Additive manufacturing has proven useful in manufacturing small objects, such as heart valves for patients requiring valve replacement surgery, as well as large objects, such as entire houses and other structures.

While additive manufacturing continues to improve and new uses are continually identified, additive manufacturing processes suffer from certain disadvantages. For example, due to the heat needed to melt the plastics typically used during a printing job, additive manufacturing machines tend to consume much more energy than similar injection molding processes to create a 3D structure. Moreover, the plastics, filaments and other materials typically used in additive manufacturing processes tend to be custom and precision-made resources, making them expensive for the average user. Perhaps even more harmful are the health and environmental impacts of using plastic materials in additive manufacturing processes—the use of plastics can lead to emissions that are harmful to both humans and the environment. Continued use of plastics, particularly non-biodegradable plastics, leads to harmful environmental impacts as byproducts of the production process, as well as the plastics themselves, tend to be disposed in landfills rather than be recycled for other uses, leading to waste.

Furthermore, the available selection of additive manufacturing input materials is constrained by the methods used in traditional additive manufacturing (AM), such as traditional additive manufacturing methods that employ binding, deposition, jetting and powder fusion; extrusion; sheet lamination; and vat photo-polymerization. Powder fusion-type methods require input materials in powder-like format, or small granulations that are then fused and built-up; materials that cannot be powderized or jetted cannot be used with such AM methods. Traditional additive manufacturing methods that employ extrusion require input materials that can be melted or otherwise extruded from a nozzle, and that will fuse with previously extruded material; materials that cannot be extruded cannot be used with such AM methods. Traditional additive manufacturing methods that employ sheet lamination require input material in the format of sheets. Finally, traditional additive manufacturing methods that employ vat photo-polymerization require input material in the format of liquid resin.

The above-constrained selection of input materials typically consists of plastics such as acrylonitrile butadiene styrene (ABS) and poly-lactic acid (PLA) that are non-flexible and of limited material strength, in particular tensile strength. Similarly the limited range of traditional AM methods limits the achievable properties of the finished products, which are typically non-flexible, of limited material strength, and slow to manufacture.

A large portion of daily objects we use, e.g. clothing, furniture and wearable devices incorporate fabric or fabric-like materials. AM techniques have tried to produce fabric-like structures for functional e.g. wearability, breathability, comfort and aesthetic purposes using traditional AM methods, but these techniques have largely not been commercially viable.

Attempts have been made to provide improved additive manufacturing input materials. However, improvements in one property usually entails trade-off in other properties. To increase flexibility, newer materials such as thermoplastic elastomers (TPE), thermoplastic polyurethane (TPU), nylon or polypropylene have been utilized. However, these flexible materials are more expensive, difficult to handle, and are limited by traditional AM methods to producing output structures in thin layer-by-layer increments. To increase material strength, metals (e.g. stainless steel, aluminum, titanium, gold and silver) have been used together with AM methods, such as selective laser sintering (SLS), or in two-step processes of printing a disposable wax mold and casting the metal. However, these metal printed structures are highly rigid and inflexible, high tensile strength together with a flexible structure (e.g. used for wearables and other accessories) has not been achieved. To obtain a more natural aesthetic, look, and feel, plastic materials mixed with wood, sand, metals and other particles have been used to give a wooden or stony finish to 3D-prints. However, these mixed materials are difficult to work with using traditional AM machines (e.g. clogging nozzles, material adhesion), and a fabric-like finish and softness has not been achieved.

Similarly, attempts have been made to improve upon traditional additive manufacturing methods. To produce flexible structures, traditional AM methods have been employed to print fabric-like structures, e.g. 3D-printed chainmail, or other structures with repeating units joined by or composed of thin sections of material (as described in EP3181273A1 and WO2003082550A2) Further attempts to produce flexible structures involve printing fabric-like structures, e.g. 3D-printed chainmail, or other structures with repeating units using two material types. A first material type is dissolved in a post-processing stage, to release a second, permanent material in the form of e.g. linked 2D chains that could not have been printed 'floating' or without a support structure (as described in US20170165908A1). However, these methods require very high printing resolution, in order to reproduce in detail the fine fabric-like structure with flexible properties—this resolution is difficult to achieve with traditional AM materials and methods. These traditional AM-based methods are also likewise limited to traditional AM materials such as plastics and some metals, with limited range of material properties such as flexibility and tensile strength as previously discussed.

To produce soft fabric-like structures, US20160288417A1 introduced an additive manufacturing method where layers of fabric are cut and bonded together, forming a 3D structure out of fabric layer-by-layer. Some disadvantages of this AM method are: the input material must be in the format of sheets, waste material is generated from cutting the sheets to size, bonding of fabric sheets produces an anisotropic structure, and coarse surface finish.

Textile fabric materials are manufactured in contemporary large-scale industry using weaving or knitting machines. Weaving machines include modern air jet looms, water jet looms and rapier looms that produce large 2D or circular woven fabric. Knitting machines include warp knitting and weft knitting machines that produce large 2D or circular knitted fabric. Some modern weaving and knitting machines can also produce arbitrary tubular structures (as described in U.S. Pat. No. 4,346,741A), such as full garments and gloves. However, conventional weaving and knitting machines are limited to produce generally 2D or tubular structures, and since these machines typically utilize needle arrays or needle beds, the width of the product of manufacture is limited to the width of the needle arrays or needle beds.

U.S. Pat. No. 5,987,929A attempted to combine contemporary fabric manufacturing methods i.e. knitting needles with the layer-by-layer approach of additive manufacturing to produce arbitrary fabric-like 3D structures. The proposed machine included four needle-and-latch arrays and a translating vertical needle head. This approach has advantages including: The use of textile yarn to produce the final product, resulting in true fabric-like properties including flexibility, high tensile strength and fabric-like aesthetics. However, some disadvantages of this approach to manufacture 3D fabric-like structures are: The size of the product of manufacture is limited by the size of the needle-and-latch arrays. As the number of stitches per unit area is increased, more needles need to be built into the machine and to be individually controlled, increasing the cost and complexity of the machine.

US20160167296A1 attempted to combine another contemporary fabric manufacturing approach i.e. needle felting with the layer-by-layer approach of additive manufacturing to produce arbitrary fabric-like 3D structures. The proposed machine used a translating composition head, where a reciprocating felting needle draws and deposits fibers from a fiber strand source, onto the compositing surface, to build a 3D structure layer-by-layer. This approach has advantages including: The ability to use cheap and widely available textile yarn to produce the final product; and the size of product of manufacture is generally only limited by the translating volume of the composition head, with no increase in complexity for increasing volume. However, some disadvantages of this approach to manufacture 3D fabric-like structures are: Since needle felting is employed to bind the input yarn material together by puncturing the yarn with barbed needles to entangle the fibers of adjacent sections of yarn, the individual sections of yarn become indistinct and fuzzy, and the bond within the felted structure may not be as strong as the bond of woven or knitted sections of yarn; A woven or knitted fabric-like texture is also not achieved, instead a felted, more uniform, fuzzy surface texture results from this method; Only yarn comprised of fibrous material can be used, since the felting process is dependent on puncturing and entangling the constituent fibers.

However, no known prior art reference has disclosed a system utilizing yarn-like input (including but not limited to textile yarn) to produce interlinked or interlocking, repeating subunits to create three-dimensional fabric-like structures having improved structural strength, as well as customization of component flexibility and other functional and aesthetic properties. Accordingly, what is needed is an alternative input and method of generating additive manufacturing three-dimensional structures by using yarn-like input and repeating, interlinked or interlocking subunits, with minimal cost and complexity. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions, or is known to be relevant to an attempt to solve any problem with which this specification is concerned.

BRIEF SUMMARY OF THE INVENTION

The long-standing but heretofore unfulfilled need for an improved additive manufacturing input and an improved method of interlinking sections of the additive manufacturing input is now met by a new, useful, and nonobvious invention.

The novel method includes a step of providing a desired 3D structure; inserting an input material into a stitch additive manufacturing machine; arranging the input material into a plurality of interlinked subunits that resemble the desired 3D structure; and producing a stitch additive manufactured 3D structure based on the provided desired 3D structure, the produced stitch additive manufactured 3D structure including the plurality of interlinked subunits. By interlinking subunits of the input material to produce the manufactured 3D structure, the structure has sufficient structural integrity to prevent collapse during the additive manufacturing process. The desired 3D structure is transposed into a representation including repeating subunits, and the representation is translated into a sequence of material arrangement operations, such that the input material can be arranged into the plurality of interlinked subunits that resemble the desired 3D structure.

To arrange the subunits together, the method includes a step of threading a traversal, such as a pull-through, of a portion of the input material through at least one loop of at least one previously-formed subunit. As such, the formed subunit is linked with the at least one previously-formed subunit. Furthermore, the step includes selecting the at least one previously-formed subunit through which the formed subunit traverses. The selection is made such that the interlinked formed subunit and at least one previously-formed subunit are desired to be disposed adjacent each other with reference to the desired final 3D structure. As such, a volume of the stitch additive manufactured 3D structure incrementally increases. Importantly, the formed subunit need not be directly linked to the previously-formed subunit that is immediately prior to the formed subunit; instead, the formed subunit can be linked to any previously-formed subunit, so long as the desired end result is such that the formed and traversed previously-formed subunits are disposed adjacent one another. The term "adjacent" here means that there is direct interlink of material between the formed subunit and the traversed previously formed subunit (s). Note, for example, that a formed subunit can traverse two spatially distant previously formed subunits, forming an interlink and adjacency between the formed subunit and two spatially distant previously-formed subunits—as the formed subunit is tightened, the overall 3D structure may warp or change shape as the two previously-formed subunits are drawn closer together. Alternatively, the formed subunit can be kept looser and larger in size, such that the two spatially distant previously-formed subunits remain spatially distant, but are still interlinked with the formed subunit.

For example, in an embodiment, the step of arranging the input material into the plurality of interlinked subunits includes a step of threading a second subunit through a loop of a first subunit to interlink the second subunit to the first subunit. Further, the method includes a step of threading a traversal of a third subunit through a loop of the second subunit to interlink the third subunit to the second subunit. These threading and traversal steps can be repeated for each subsequent subunit, such that the plurality of interlinked subunits is a set of repeating, interlinked subunits. In addition, the traversal of the third subunit can be threaded through a loop of the first subunit to interlink the third subunit to the first subunit. This traversal of the third subunit through the loop of the first subunit can occur alone, or in combination with the traversal of the third subunit through the second subunit loop, and so on.

The input material is an elongated and flexible strand, and can be selected from the group consisting of natural fiber, synthetic fiber, metal fiber, metal wire, ceramic fiber, mineral fiber, edible filament, acrylonitrile butadiene styrene, thermoplastic polyurethane, thermoplastic elastomers, biocompatible nylon, hydroxyapatite, collagen, polylactic acid, polyethylene terephthalate, and combinations thereof. However, in an embodiment, the input material is flexible.

The method can be performed in conjunction with an active feeder and passive receiver. For example, the method can include a step of actively feeding the input material into the stitch manufacturing machine by inserting a flying eye on an active feeder within a cavity disposed within a passive receiver of the stitch additive manufacturing machine. The input material is received at the passive receiver from the flying eye. The method includes a step of retaining the input material by a gripping mechanism of the passive receiver. Moreover, the method includes a step of releasing the flying eye from the cavity disposed within the passive receiver, such that the flying eye translates away from the passive receiver along a length of the input material, and the step of inserting the input material into the stitch additive manufacturing machine can be repeated.

The method can alternatively be performed in conjunction with a passive feeder and active receiver. As such, either a passive feeder or an active feeder can be referred to as a "material feeder," which feeds an input material (either passively or actively) into a device to manipulate the input material, such as an additive manufacturing machine. For example, the method can include a step of passively feeding the input material into the stitch manufacturing machine by translating a hook and latch element, such as a latch hook, of an active receiver toward the input material issuing from a passive feeder. The latch hook retains the input material, and translates the input material toward the active receiver and away from the passive feeder. The latch hook releases the input material, and the latch hook translates toward the passive feeder, such that the step of inserting the input material into the stitch additive manufacturing machine can be repeated. Moreover, the hook and latch element translates into and through a loop of at least one of the plurality of interlinked subunits, and optionally translates into and through a loop of another of the plurality of interlinked subunits, forming a new interlinked subunit of the plurality of interlinked subunits.

In an embodiment, the method includes a step of anchoring the stitch additive manufactured 3D structure during the additive manufacturing process. The stitch additive manufactured 3D structure is disposed on a work anchoring surface. The stitch additive manufactured 3D structure is then retained on the work anchoring surface via an adhesion force (which does not have to be a physical bonding, but can be any force sufficient enough to force the 3D structure into contact with the work anchoring surface, preventing the 3D structure from decoupling from the work anchoring surface) between the stitch additive manufactured 3D structure and the work anchoring surface. As such, the stitch additive manufactured 3D structure is immobilized against the work anchoring surface during the additive manufacturing process, thereby reducing printing errors.

The stitch additive manufactured 3D structure can be manipulated during the additive manufacturing process by contacting at least a portion of the stitch additive manufactured 3D structure with a protruding end effector of the stitch additive manufacturing machine, and applying a directed force onto the portion of the stitch additive manufactured 3D structure by translating the protruding end effector in a direction, thereby translating the portion of the stitch additive manufactured 3D structure and manipulating the shape of the portion.

The novel system includes a passive feeder with an amount of an input material disposed thereon or issuing therefrom. The system also includes an active receiver including a hook and latch element adapted to contact the amount of the input material disposed on the passive feeder. The active receiver is also adapted to translate the amount of the input material away from the passive feeder. The active receiver arranges the amount of the input material into a plurality of interlinked subunits that resemble a desired 3D structure by forming subunits. Specifically, the active receiver forms a subunit by traversing the input material through at least one loop of at least one previously-formed subunit, thereby interlinking the formed subunit with the at least one previously-formed subunit. The at least one previously-formed subunit through which the formed subunit traverses is selected such that the interlinked formed subunit and at least one previously-formed subunit are disposed adjacent each other. Accordingly, a volume of an incrementally produced 3D structure incrementally increases. The system also includes a work anchoring surface adapted to receive and retain the incrementally produced 3D structure during manufacture via an adhesion force between the incrementally produced 3D structure and the work anchoring surface. Accordingly, at least part of the incrementally produced 3D structure is immobilized against the work anchoring surface during manufacture, thereby reducing printing errors.

An object of the invention is to provide an improved additive manufacturing input, as well as an improved method of interlinking repeating subunits, to create three-dimensional fabric-like structures having less waste products and having simultaneously greater flexibility, breathability, softness, tensile strength, structural integrity and unique aesthetic as compared with traditional additive manufacturing products and methods.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 2A depicts a single strand yarn-like input.
FIG. 2B depicts a yarn-like input.
FIG. 2C depicts a double-ply yarn-like input.
FIG. 2D depicts a four-ply multi-material yarn-like input.
FIG. 2E depicts a multi-ply multi-material yarn-like input with a central strand.
FIG. 13A depicts a flying eye embodiment, in accordance with an embodiment of the present invention.
FIG. 13B depicts a flying eye embodiment, in accordance with an embodiment of the present invention.
FIG. 13C depicts a passive receiver, in accordance with an embodiment of the present invention.
FIG. 13D depicts a passive receiver, in accordance with an embodiment of the present invention.
FIG. 13E depicts a passive receiver, in accordance with an embodiment of the present invention.
FIG. 13F depicts a passive receiver, in accordance with an embodiment of the present invention.

FIG. 21A depicts a work anchoring apparatus including pin-like components, in accordance with an embodiment of the present invention.

FIG. 21B depicts a work anchoring apparatus including pin-like components, in accordance with an embodiment of the present invention.

FIG. 21C depicts a work anchoring apparatus, in accordance with an embodiment of the present invention.

FIG. 21D depicts a work anchoring apparatus, in accordance with an embodiment of the present invention.

FIG. 21E depicts a work anchoring apparatus, in accordance with an embodiment of the present invention.

FIG. 21F depicts a work anchoring apparatus, in accordance with an embodiment of the present invention.

FIG. 22A depicts a simplified diagram of a work anchoring apparatus.

FIG. 22B depicts a simplified diagram of a work anchoring apparatus.

FIG. 22C depicts a simplified diagram of a work anchoring apparatus.

FIG. 23A depicts a cross-sectional view of an embodiment of a work manipulation apparatus using a blunt end effector.

FIG. 23B depicts a cross-sectional view of an embodiment of a work manipulation apparatus using a blunt end effector FIG. 23C depicts a blunt tusk, in accordance with an embodiment of the present invention.

FIG. 23D depicts a blunt tusk, in accordance with an embodiment of the present invention.

FIG. 23E depicts a blunt tusk, in accordance with an embodiment of the present invention.

FIG. 24A depicts a cross-sectional view of an embodiment of a work manipulation apparatus using a tapered end effector.

FIG. 24B depicts a tapered tusk, in accordance with an embodiment of the present invention.

FIG. 24C depicts a tapered tusk, in accordance with an embodiment of the present invention.

FIG. 24D depicts a tapered tusk, in accordance with an embodiment of the present invention.

FIG. 33A depicts a simplified cross-sectional view of a SAM apparatus in a stage of motion.

FIG. 33B depicts a simplified cross-sectional view of a striding mechanism including two positions of motion.

FIG. 33C depicts a simplified cross-sectional view of a striding mechanism including two positions of motion.

FIG. 34A depicts a simplified embodiment of a striding mechanism.

FIG. 34B depicts the striding mechanism of FIG. 34A with additional degrees of freedom.

FIG. 37A depicts an embodiment of a retracting gripper mechanism in an open state.

FIG. 37B depicts the retracting gripper mechanism of FIG. 37A in a closed extended state.

FIG. 37C depicts the retracting gripper mechanism of FIG. 37A in a closed retracted state.

FIG. 37D depicts one of half of the retracting gripper mechanism of FIG. 37A.

FIG. 38A depicts an embodiment of a retracting gripper mechanism in a stage of motion.

FIG. 38B depicts an embodiment of a retracting gripper mechanism in a stage of motion.

FIG. 38C depicts an embodiment of a retracting gripper mechanism in a stage of motion.

FIG. 38D depicts an embodiment of a retracting gripper mechanism in a stage of motion.

FIG. 38E depicts an embodiment of a retracting gripper mechanism in a stage of motion.

FIG. 38F depicts an embodiment of a retracting gripper mechanism in a stage of motion.

FIG. 43A depicts a build frame including attached components, in accordance with an embodiment of the present invention.

FIG. 43B depicts a build frame including attached components, in accordance with an embodiment of the present invention.

FIG. 44 depicts a diagram of a SAM workflow including pre-and-post-treatment processes, in accordance with an embodiment of the present invention.

FIG. 45A depicts a simplified diagram of an embodiment of a hybrid stitch additive manufacturing apparatus, in accordance with an embodiment of the present invention.

FIG. 45B depicts a simplified diagram of an embodiment of a hybrid stitch additive manufacturing apparatus, in accordance with an embodiment of the present invention.

FIG. 45C depicts a simplified diagram of an embodiment of a hybrid stitch additive manufacturing apparatus, in accordance with an embodiment of the present invention.

FIG. 45D depicts a simplified diagram of an embodiment of a hybrid stitch additive manufacturing apparatus, in accordance with an embodiment of the present invention.

FIG. 50 depicts a simple schematic of a SAM system sensor and actuator general configuration.

FIG. 52A depicts a simple diagram of work/sample sensing.

FIG. 52B depicts a simple diagram of work/sample topography.

FIG. 52C depicts a simple diagram of apparatus sensing.

FIG. 52D depicts a simple diagram of apparatus proprioception.

FIG. 53 depicts a simplified diagram of a SAM general ecosystem workflow.

DETAILED DESCRIPTION OF THE INVENTION

Figure 1:
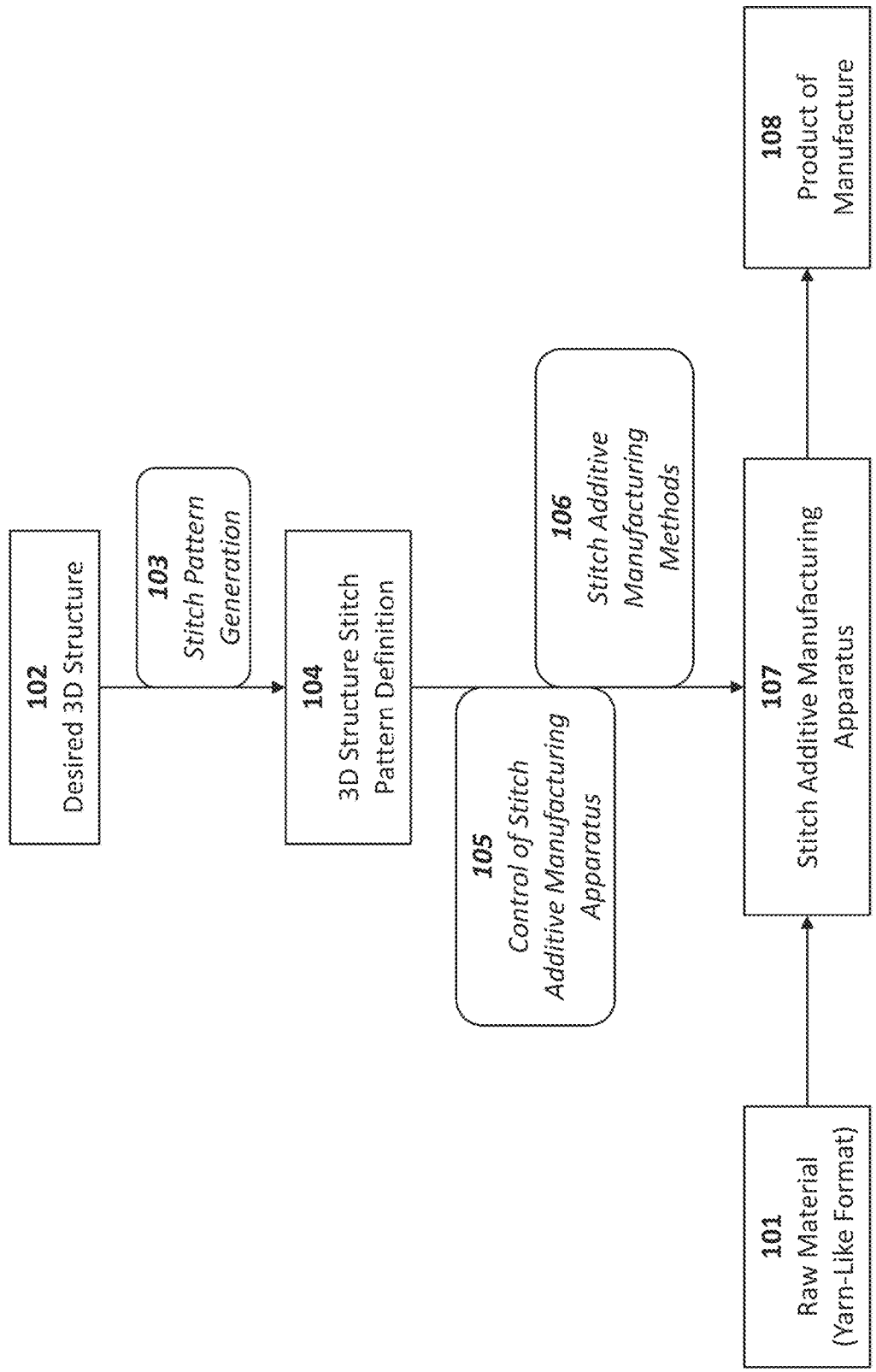
FIG. 1 is a process flow diagram providing an overview of a stitch additive manufacturing process, in accordance with an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a novel input material, machine, and manufacturing method for generating three-dimensional structures based on repeating, interlinked subunits of the input material. The novel method may be referred to as Stitch Additive Manufacturing (SAM), due to the resemblance between the repeating, interlinked subunits of input material comprising the three-dimensional structures, and traditional stitched structures. Repeating and interlinked subunits are used to manufacture three-dimensional structures that are more flexible than traditionally-printed structures, while having structural integrity due to the interlinked nature of the manufactured components.

Repeating subunits can be interlinked in two general ways: I) Fusing or II) Non-Fusing. In a fusing method, the subunits are bonded together, such that there is a continuity of volume and surface between adjacent subunits. Examples of fusing interlinking include: 1) Using conventional additive manufacturing, where repeating subunits can be printed using fused plastics, 2) Using needle-felting to bond together sections of yarn as in US20160167296A1, 3) Using heat to melt and fuse discrete premade subunits together, 4) Using a glue or bonding agent to fuse discrete premade subunits together. In a non-fusing method, the subunits are linked or interlocked together, but remain as separate, intact elements, such that there is a discontinuity of volume and surface between adjacent subunits (but overall, all subunits may still be part of the same continuous length of material). Examples of non-fusing interlinking include: 1) Methods involved in this invention Stitch Additive Manufacturing (SAM), as discussed in greater detail below, in which sections of yarn-like material are traversed through one or more previous subunits such that a newly formed subunit is interlinked with the traversed previous subunits, 2) Prior art references U.S. Pat. No. 5,987,929A (in which sections of yarn are drawn through typically one previous subunit using a knitting machine); U.S. Pat. No. 4,346,741A (in which sections of yarn are interlaced or woven together around supporting rods), and US20180132579A1 (in which premade rubber bands/loops are interlinked together using hand tools/looms).

The present invention includes an additive manufacturing machine, which will be discussed in greater detail below. However, a brief overview of how the machine improves upon prior art, conventional 3D printers is beneficial, before exploring the intricacies of the present invention. Conventional Fused Deposition Modeling (FDM) 3D printers typically use plastic filament and a heated nozzle to extrude the filament to produce 3D plastic parts. The present invention can use regular textile yarn or other strand-like input, not being limited to plastic filament, and uses a flying eye and receiver or a feeder and latch hook (in various embodiments), instead of the heated nozzle. The flying eye and receiver (or the feeder and latch hook, in various embodiments) is controlled in a specific repeating pattern, thereby causing the yarn to be repeatedly interlinked, and thereby producing a 3D part out of repeating subunits. Because there is no melting and fusing, the entire length of yarn remains intact: a very wide selection of input materials can thus be used, resulting in products with unique physical, functional and aesthetic properties.

FIG. 1 provides a simplified overview of SAM, as discussed in greater detail below. As shown in FIG. 1, elongated units of input material 101 are fed into an additive manufacturing machine, which can be a novel machine or a traditional machine currently in use within the art. Regardless of whether the machine is novel or a traditional machine, the additive manufacturing machine may be referred to as reference numeral 107. Meanwhile, a computing device receives instructions for making target three-dimensional structure 102. The computing device performs stitch pattern generation 103 algorithms. After performing pattern generation algorithms 103, the computing device outputs pattern definition 104, which is a virtual attempt to match the structure and shape of target three-dimensional structure 102, such that additive manufacturing machine 107 can generate a printed structure matching that of target three-dimensional structure 102. The instructions are designed to create a pattern from the elongated units of input material 101 to create a three-dimensional structure that matches the shape and structure of target three-dimensional structure 102. As the elongated units of input material 101 are fed into additive manufacturing machine 107, additive manufacturing machine 107 assembles the input material into interlinked, repeating subunits that form tangible three-dimensional structure 108, which is designed to resemble target three-dimensional structure 102. The overall control over the additive manufacturing machine 107 is depicted by reference numeral 105, and will be discussed in greater detail below; similarly, the various methods of performing stitch additive manufacturing is depicted as reference numeral 106, which will be discussed in greater detail below as well.

While FIG. 1 provides a simplified overview of the system, examples of input materials, methods of producing structures from input materials, and additive manufacturing machines capable of utilizing the input materials to produce three-dimensional structures, are discussed in greater detail in the sections below.

Input Material

Traditional three-dimensional printers utilize melted plastics and other polymers to create three-dimensional structures via additive manufacturing processes. However, such structures are often not flexible enough for certain applications, due to fusing together of the material used in the printing process. Accordingly, the present system includes elongated units of input material 101 that can be fed into an additive manufacturing machine to produce three-dimensional structures that are flexible yet have structural integrity, where the input material is not fused together but interlinked to form the final structure. It is appreciated that input material 101 may be arranged in a variety of formats, depending on the capabilities of the additive manufacturing machine and the requirements of the printing job. For example, FIG. 2A depicts a length of single-ply yarn which is similar to a simple filament. FIG. 2B depicts a length of double-ply yarn that has a left-handed or "S" twist, with the two constituent plies labeled 201 and 202. FIG. 2C depicts a length of double-ply yarn that has a right-handed or "Z" twist, with the two constituent plies labeled 201 and 202. FIG. 2D depicts a length of four-ply yarn comprising of an S-twisting of two Z-twisted double-plies 203 and 204. FIG. 2E depicts a multi-material yarn comprised of S-twisted nylon plies 205 surrounding a single-ply copper core 206.

An important aspect of the present invention is the interlinking (instead of fusing) relationship between subunits of input material 101, with a plurality of subunits forming a repeating, interlinked input material 101 for use in an additive manufacturing process. By interlinking repeating subunits, a three-dimensional structure formed via the additive manufacturing process can have enough structural integrity to prevent collapse during printing. FIG. 3 depicts a simple interlinked chain of three stitches of an in-progress three-dimensional structure, with each of the stitches being a subunit of the overall three-dimensional structure. The first stitch subunit is referred to by reference numeral 301; the second stitch subunit by reference numeral 302; and the third stitch subunit by reference numeral 303.

Moreover, each of the subunits 301, 302, and 303 include various subsections, which, in the case of a yarn-like input material 101, may be referred to as "loops." For example, second stitch subunit 302 includes right loop section 305 and left loop section 306, as well as bottom loop section 307. In addition, tail 308 is shown upstream from subunit 301, with tail 308 being formed prior to subunit 301. Similarly, active input 309 is shown downstream from subunits 301, 302, and 303, with active input 309 being the portion of input material 101 being used by an additive manufacturing machine to continue forming a three-dimensional structure. Active subsection 310 is portion of active input 309 that is shown being added to the interlinked structure, forming a connection with subunit 303.

Some non-exhaustive examples of materials that may be used as input materials are natural fibers, such as cotton, wool, or silk; synthetic fibers, such as nylon, polyester, or acrylic materials; metal fibers, such as steel wool or copper wire; ceramic or mineral fibers, such as aluminum silicate or polycrystalline wool; or other filament-like materials, such as carbon fiber, carbon nanotube fiber, silicone, or rubber. In other embodiments, the input materials may be electrically conductive materials. In still other embodiments, the input materials may be biologic materials, such as edible ingredients in filament format. Some examples of edible ingredients that may be used as input materials are wheat, rice, buckwheat, processed ingredients mixed with a binding agent or encased in tubes of cellulose, or other ingredients that may be in strand-like format to be used as a filament. In yet other embodiments, the input material may comprise one or more plies of biocompatible materials (e.g. biocompatible nylon, hydroxyapatite, collagen, poly-lactic acid (PLA), or polyethylene terephthalate (PETE)) suitable for interaction with or situation in human or other biological bodies. Moreover, any combination of the above non-exhaustive list may be used, with the different materials leading to three-dimensional structures having different physical qualities, depending on the requirements of the printing project to be performed.

In addition, the input materials may be treated before printing, during printing, or after printing. Treatments include adding color to the input materials, including adding different color to different components of the final three-dimensional structure to be printed, depending on the desired ultimate design of the structure. Treatments also include changing the material properties of the input material, again depending on the desired ultimate design of the structure. For example, portions of the input material may be heated to a higher temperature than the main input material, such that the heated portions are temporarily softer than the main input materials, thereby changing the flexibility or pliability of the heated portions. Treatments can also include imparting an electrical property to the input material, or changing a strength of the material, by subjecting the material or final structure to a predetermined treatment. Still other treatments can include curing, disinfecting, sterilizing, or coating the final three-dimensional structure to alter the surface properties of the structure, such as by imparting biocompatibility or enhanced bonding with other materials e.g. priming for metal coating or crystalline growth or deposition. It is appreciated that the forms of treatments discussed above are not exhaustive of the possible treatments for the input materials of the three-dimensional structure, and that various forms of treatment are contemplated and are known in the art.

Figures 3A, 3B:
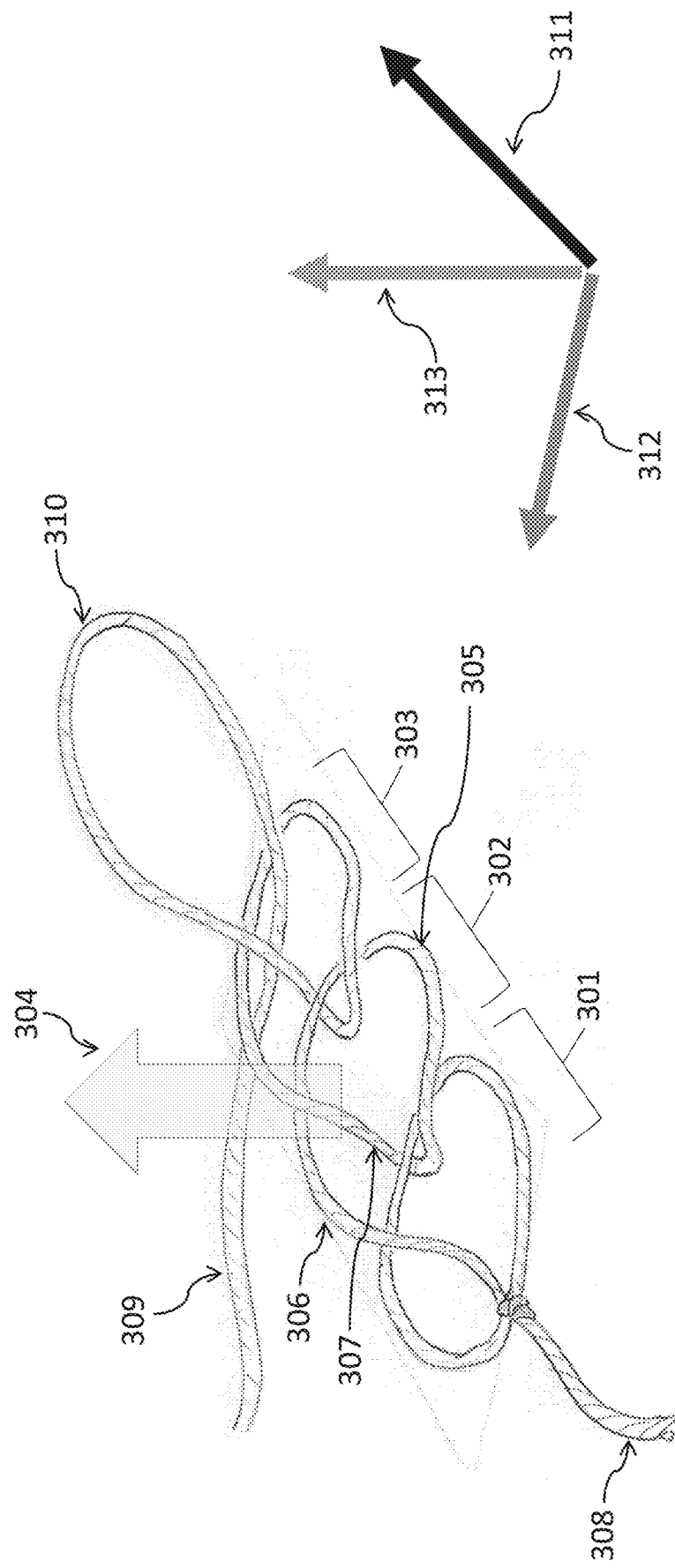
FIG. 3A depicts an example of interlinking subunit stitches.
FIG. 3B depicts directional axes for the interlinking subunit stitches of FIG. 3A.

At the stage of the additive manufacturing process depicted in FIG. 3A, the interlinking of subunits resembles that of manual stitching or crocheting, such as the stitching used in making an article of tubular clothing. Methods of manufacturing arbitrary three-dimensional structures are described in greater detail below.

Example 1: Method of Producing Structures Using Novel Input Material

Figure 4B:
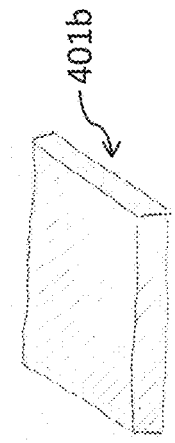
FIG. 4B depicts a cuboid representation of FIG. 4A.
Figure 4D:
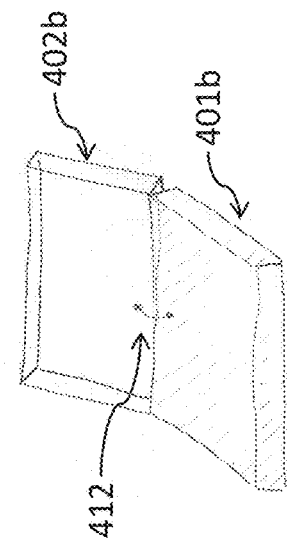
FIG. 4D depicts a cuboid representation of FIG. 4C.
Figure 4F:
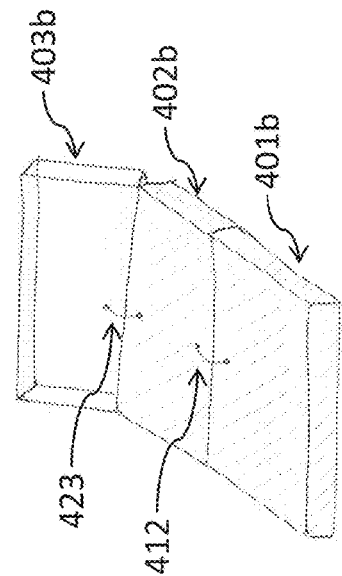
FIG. 4F depicts a cuboid representation of FIG. 4E.
Figure 4A:
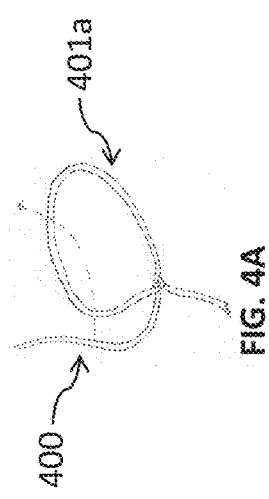
FIG. 4A depicts an initial stitching subunit.

Turning now to FIGS. 4A through 4J, the figures depict an example of a three-dimensional structure and a method of making such a structure from interlinked subunits of input material 101 discussed above. For example, as shown in FIG. 4A, first stitch 401a is formed from input material 400. As shown in FIG. 4A, first stitch 401a forms a starter loop to begin an additive manufacturing process with input material 400. FIG. 4B shows a corresponding cuboid representation of first stitch 401a, with the cuboid representation referred to as reference numeral 401b. The cuboid representation of FIG. 4B shares the same ratio of length, width, and height as the yarn-like structure from FIG. 4A; however, the cuboid representation depicts how equal-sized subunits can be used to generate a predetermined structure using the techniques discussed herein. The following figures discussed include both yarn-like representations and cuboid representations, similar to that of FIGS. 4A and 4B.

Figure 4C:
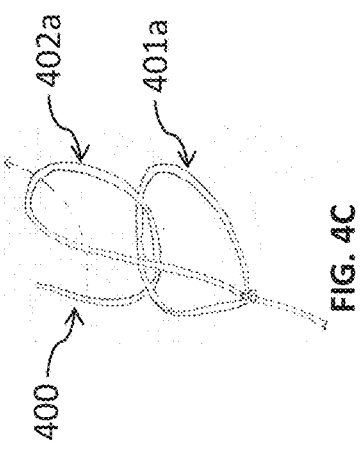
FIG. 4C depicts two interlinking stitching subunits.

To continue building on the structure depicted in FIGS. 4A and 4B, as would happen during an additive manufacturing project, the input material shown in FIGS. 4A-4B must be drawn through the previously-printed loop to create an interlinked set of subunits. As such, a section of input material 400 is drawn under the left loop of, and toward the top of, first stitch 401a—otherwise known as a traversal, such as a pull-through, since the section of input material 400 is being pulled through the loop formed by first stitch 401a. It should be understood that the term pull-through should not be construed as limiting stitch formation to only pulling actions on the input material; in other embodiments the input material may be pushed, rather than pulled to traverse through a loop during stitch formation, using motion of an implement such as the active feeder, or other implements to force the input material through a structural opening. FIG. 4C depicts the result of the pull-through, in which active loop 402a is formed and interlinked to first stitch 401a. FIG. 4D depicts the resulting pull-through in cuboid form, with active loop 402b interlinked to first stitch 401b. Whereas the interlink in FIG. 4C is represented by the physical pull-through shown in the figure, the interlink in the cuboid representation of FIG. 4D is depicted as an arced line 412 connecting first stitch 401b to active loop 402b.

Figure 4E:
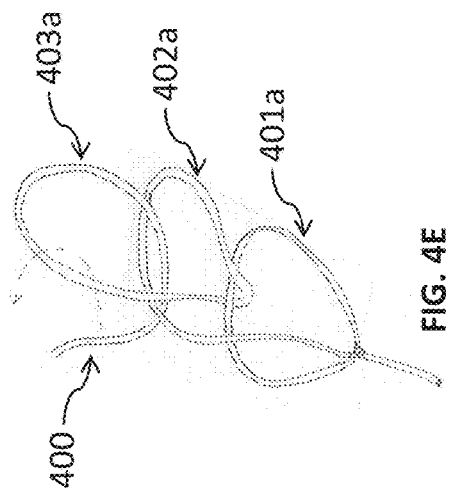
FIG. 4E depicts three interlinking stitching subunits.

The process repeats to create another interlinked subunit, as depicted in FIG. 4E, which depicts another pull-through. A new active loop 403a is created to interlink to 402a, which is now a stitch and not an active loop. When the new active loop 403a is created, the previous active loop (in this case, 402a) is no longer active, and is instead an interlinked stitch within the overall structure. Again, FIG. 4F depicts the corresponding cuboid representation, including arced line 423 connecting second stitch 402b (previously active loop 402b) to active loop 403b.

Figure 4H:
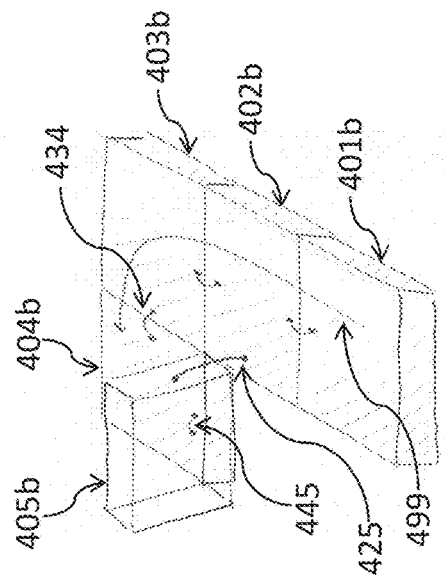
FIG. 4H depicts a cuboid representation of FIG. 4G.
Figure 4J:
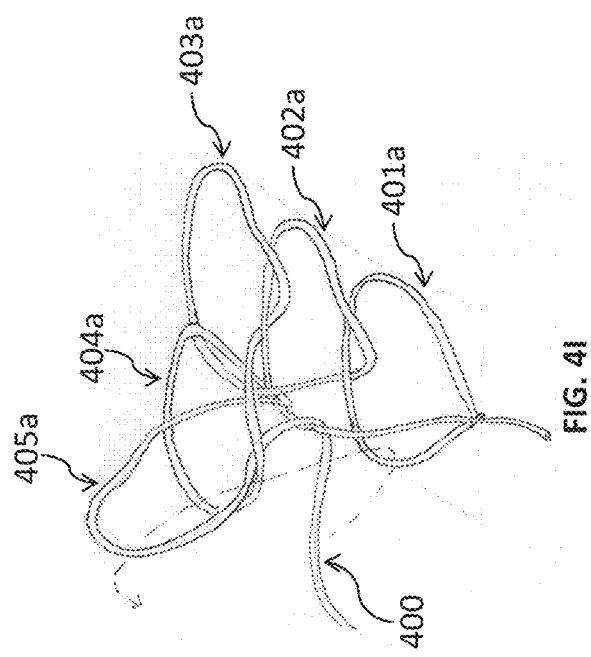
FIG. 4J depicts a cuboid representation of FIG. 4I.
Figure 4G:
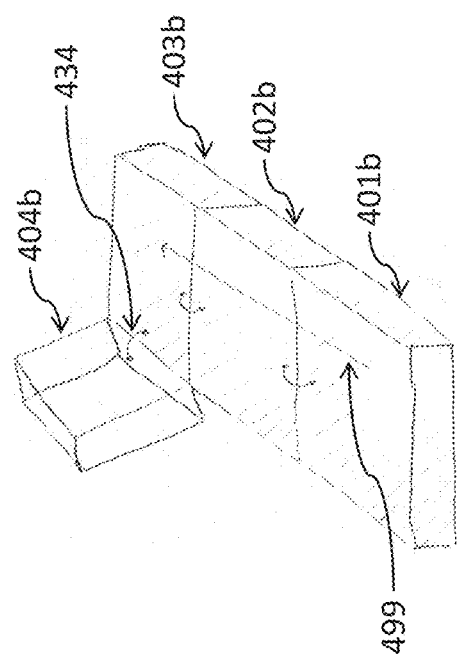
FIG. 4G depicts four interlinking stitching subunits.

FIG. 4G depicts the result of a pull-through in a different direction, such that the resulting subunit continues in a different direction from that of the first three subunits discussed in this example. To change directions, a section of input material 400 is drawn under the left loop of, and toward the top of, active loop 403a. The section of input material 400 is then biased in the left-direction relative to stitches 401a, 402a, and 403a, thereby changing the direction of the resulting active loop. As such, new active loop 404a forms interlinked to previous stitch 403a (previously an active loop that is no longer active as a result of new active loop 404a). The new active loop 404a is biased to the left of the previous stitches, thereby creating a change in direction and allowing for the addition of subunits in a different direction in turn. Again, the corresponding cuboid representation is depicted in FIG. 4H, including arced line 434 connecting subunits 403b and 404b.

Figure 4I:
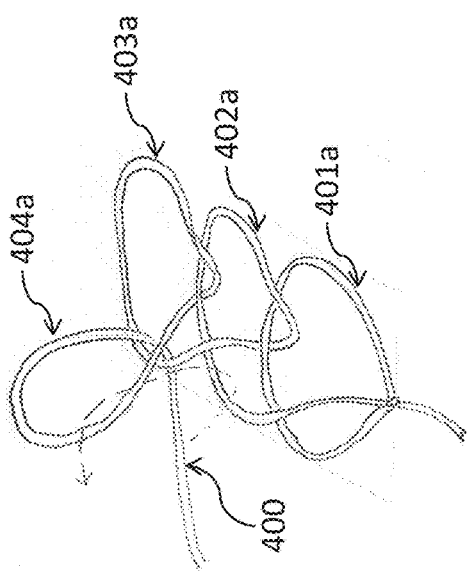
FIG. 4I depicts five interlinking stitching subunits.

Next, the process changes the direction of the subunits again, such that the next subunit added is connected to each of 404a and 402a, as shown in FIG. 4I. The process of forming active loop 405a is largely the same as the loops formed above (with the exception that in this instance the material traverses two instead of one previously formed subunit), —the previous active loop forming yet another subunit interlinked within the chain of subunits. FIG. 4J includes a depiction of the cuboid representation of the change in direction, showing that active loop 405b includes two connections interlinking the loop to previous subunits-arced line 425 connecting active loop 405b with second subunit 402b, and arced line 445 connecting active loop 405b with fourth subunit 404b. As such, the interlinked subunits have stronger connections and are disposed adjacent to each other, forming a structure having increased structural integrity and specific shape by virtue of the interlinking of the subunits to each other. The direction of stitch formation is shown as arrow 499. The interlinking method shown in FIGS. 4A-4J is a simplified example of methods of interlinking repeating subunits; however, the method remains largely the same when applied to more complex additive manufacturing projects, as will be discussed in further detail throughout this specification.

Figure 5B:
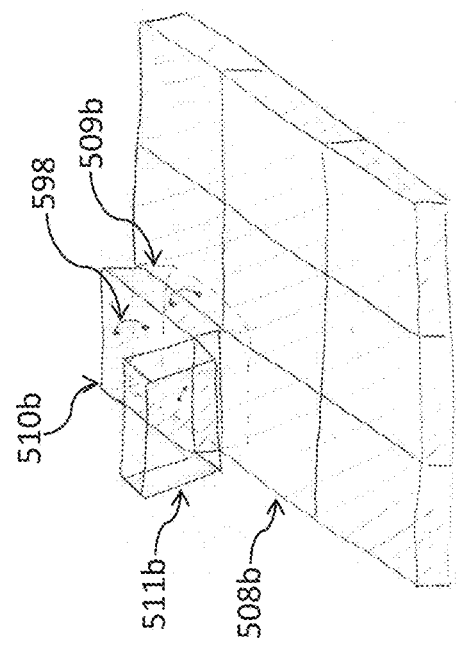
FIG. 5B depicts a cuboid representation of FIG. 5A.
Figure 5D:
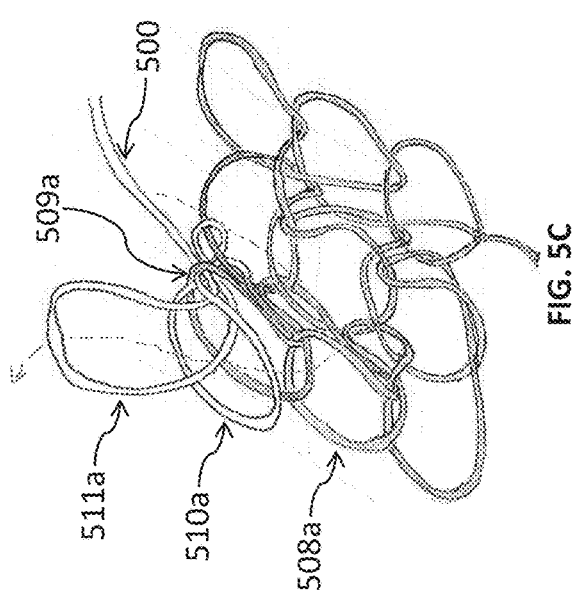
FIG. 5D depicts a cuboid representation of FIG. 5C.
Figure 5A:
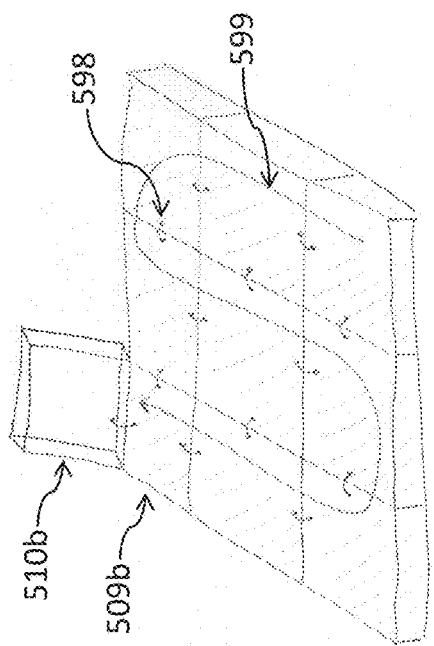
FIG. 5A depicts interlinking stitching subunits in one plane.

Example 2: Extension of Method of Producing Structures Using Novel Input Material Moreover, FIGS. 5A-5N provide an extension of the interlinking method as discussed above, forming an exemplary 3-by-3 array with working yarn material 500 spanning the x-direction and y-direction, and extending to the z-direction when a second layer is formed. Similar to FIGS. 4A-4J above, the method shown in FIGS. 5A-5J include 509a, which is the ninth stitch of the bottom layer of the array, and active loop 510a which begins to form the second layer of the array, as shown in FIGS. 5A-5D (with cuboid 509b representing ninth stitch 509a; cuboid 510b representing active loop 510a; 511a representing a new active loop after a pull-through is performed on 510a; cuboid 511b representing new active loop 511a; direction 599 depicting the direction of stitching; and arced lines 598 joining interlinked subunits, similar to the description of the subunits in the paragraphs above). Similarly, FIGS. 5E-5J depict the continued interlinking of subunits using the method described above, including new active loop 512a (and representative cuboid 512b) in FIGS. 5E-SF; new active loop 513a (and representative cuboid 513b) in FIGS. 5G-5H; new active loop 514a (and representative cuboid 514b) in FIGS. 5I-5J; new active loop 515a (and representative cuboid 515b) in FIGS. 5K-SL; and new active loop 516a (and representative cuboid 516b) in FIGS. 5M-5N. Various underlying stitches 504a, 505a, 506a, 507a, and 508a are also depicted in the figures, with the active loops interlinking to the existing stiches via a pull-through, as discussed in greater detail above; underlying cuboids 504b, 505b, 506b, 507b, and 508b are similarly shown as the cuboid representatives of the corresponding stitches. The specific steps involved in these traversals will be discussed in greater detail at the end of this specification.

It should be understood that the yarn traversal sequences described above and shown in FIGS. 4-5 can be nearly infinitely varied. For example, where a left loop was traversed, a right loop could have been chosen. Or, where a right loop of a particular stitch was traversed, the left loop of an adjacent stitch could have been traversed. Alternatively, the working yarn can traverse from the top of a stitch through towards the bottom instead of from the bottom of the stitch through towards the top. Further, the formation of stitches could have been first along the y-direction, or could have been in a spiral path. Furthermore, the formation of stitches does not have to follow the order of first creating a "layer" spanning the x-axis and y-axis, but could path toward any of the x-direction, y-direction, and z-direction at any point of the process, as the working yarn can traverse any of the loops of the previously set stitches to create a different but similarly shaped structure, or a very differently shaped structure.

It should also be recognized that the corresponding FIG. 4A through FIG. 5N are simplified depictions of the method of interlinking subunits for the purpose of creating an interlinked structure. The yarn material is depicted as thin strands that are loosely intertwined for visual clarity, so that the intricate traversals can be seen. In physical embodiments of said examples, the yarn material may be much thicker and more tightly intertwined, such that there is little gap between loop sections, and that stitches are not so neatly 'flat' on the x-direction and the y-direction, but may be warped and/or tilted in some combined orientation of the x-direction, y-direction, and z-direction. Nonetheless, the interlink patterns that are depicted will remain the same in physical embodiments of said examples.

In the examples presented previously, a single length of yarn-like material is manipulated into a 3D structure. 3D structures can also be constructed from more than one length of yarn-like material. For example, a second strand of yarn can be pulled through any of the set stiches, for example the left loop of the stitch 510a in FIG. 5M, to create a new active loop which is then used to form a new collection of stitches from this second strand of yarn.

Example 3: Alternative Method of Producing Structures Using Novel Input Material As an example of the vast realm of possibilities of methods of interlinking subunits, FIG. 6A depicts interlinking formations using counter-clockwise stitching, in contrast of the clockwise stitching shown in FIG. 3A and explored in FIGS. 4-5. In the counter-clockwise stitching shown in FIG. 6A, the yarn of the bottom loop of a stitch 601 transitions to form the right loop 602 of the next stitch before transitioning to form the left loop 603 of that next stitch, thereby producing a counter-clockwise stitch. Clockwise and counter-clockwise stitches can both be incorporated or combined into a product of manufacture. Moreover, another variation for stitch formation is that the left loop and right loop of a stitch can be twisted together such that the left loop moves towards the right of the stitch and vice versa. This twist can be accomplished by twisting the active loop before it is set into a stitch. The twist can be a half twist, a full rotation twist, a two-full rotation twist or any other rotational twist. Many different stitches can be used, so long as the underlying subunits are interlinked together, as discussed in greater detail above.

Figure 6A:
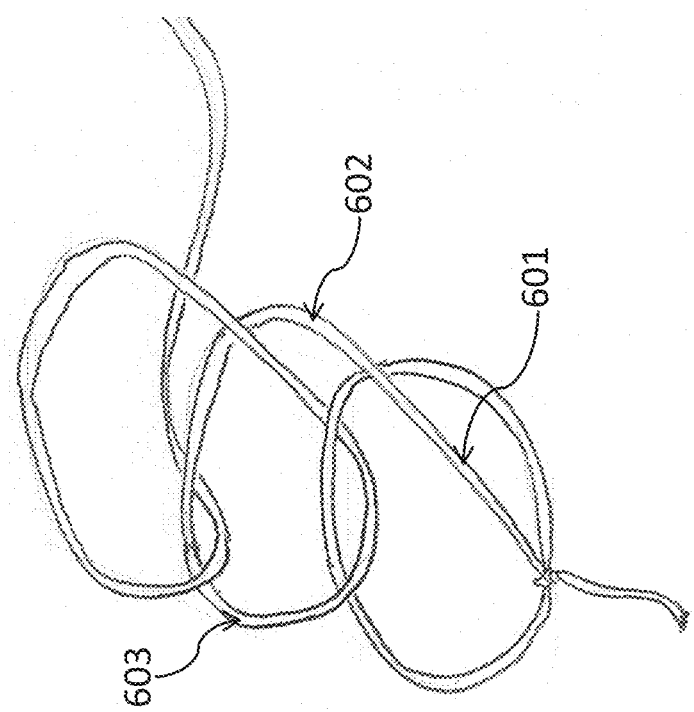
FIG. 6A depicts an alternative embodiment of interlinking stitching subunits.
Figure 6B:
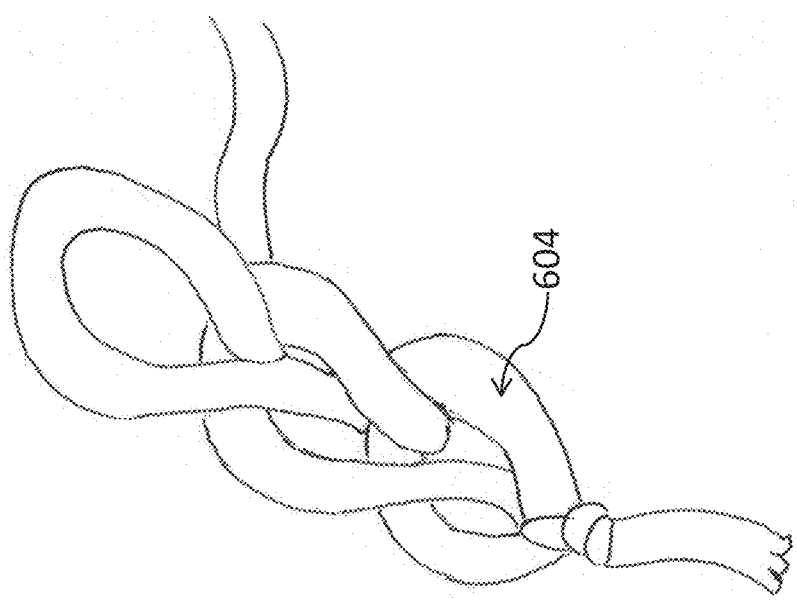
FIG. 6B depicts an alternative embodiment of interlinking stitching subunits.
Figure 6C:
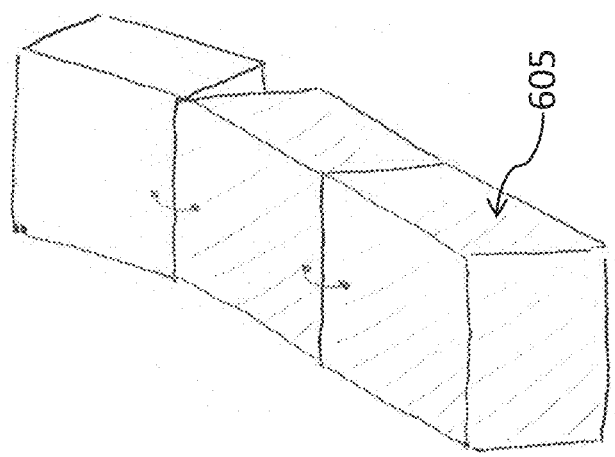
FIG. 6C depicts a cuboid representation of interlinking stitching subunits.

Moreover, FIG. 6B depicts three stitches formed from a relatively thick yarn material 604 with relatively tighter stitches, as compared with other depictions, such as FIG. 4E above. FIG. 6C depicts a corresponding cuboid representation of the structure in FIG. 6B. The cuboid 605 corresponds to the stitch 604. Notice that the cuboid 605 has a height dimension (along the z-direction) more commensurate with its length (along the x-direction) and width (along the y-direction) dimensions compared to the cuboid representation in FIG. 4F. This serves to illustrate that the dimensions of the repeating units of a SAM structure can be modulated by controlling the yarn material or the tightness of stitch formation.

Example 4: Products of Manufacture

Figure 7C:
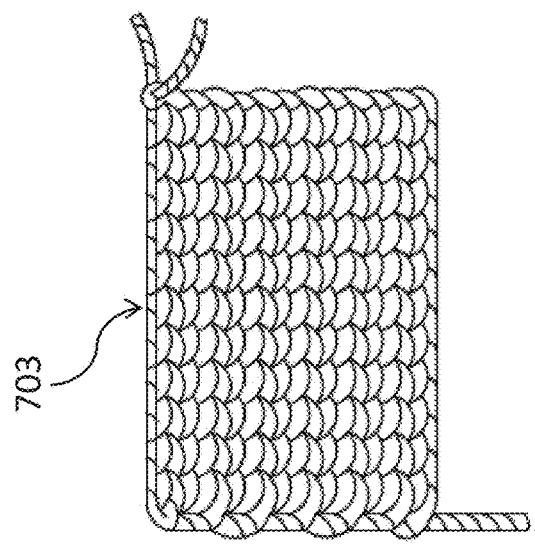
FIG. 7C depicts a final 3D product from FIG. 7B manufactured via the methods described in this specification.
Figure 7B:
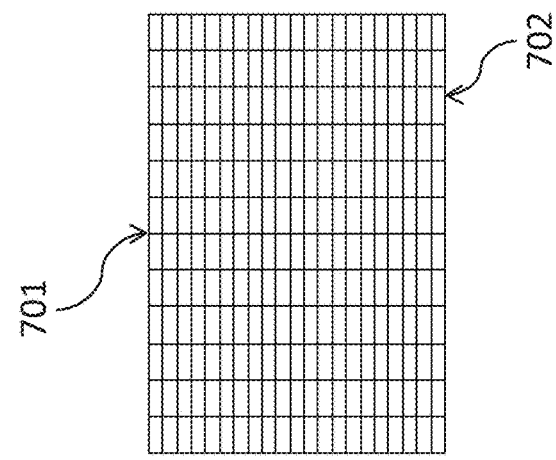
FIG. 7B depicts the desired 3D structure of FIG. 7A divided into subunits.
Figure 7A:
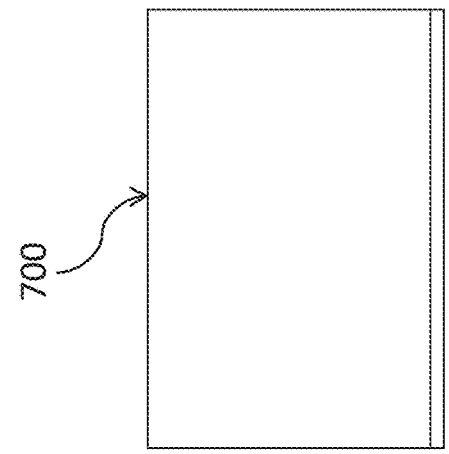
FIG. 7A depicts a desired 3D structure.

One or more of the above methods of producing a structure using a novel input can be employed to produce desired structures, such as 3D structures. FIG. 7A depicts an example of a 3D structure 700 in a 2D sheet-like form. FIG. 7B depicts a graphical representation 701 of the 3D structure 700 from FIG. 7A, with the graphical representation 701 including a plurality of repeating subunits 702. The repeating subunits 702 are similar to the cuboid representation of stitches discussed above relating to FIGS. 4-6. FIG. 7C depicts final product 703 manufactured by performing one or more of the above-described methods (or a similar method), corresponding to the interlinking pattern shown in FIG. 7B, and corresponding to the overall desired shape of structure 700 in FIG. 7A.

Figure 8C:
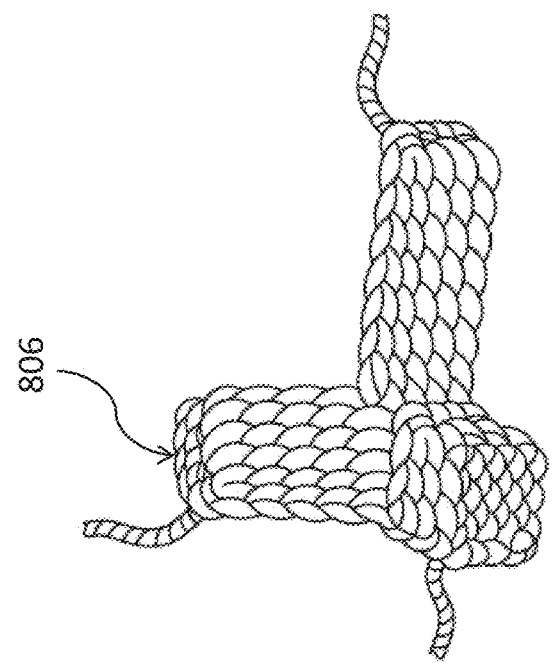
FIG. 8C depicts a final 3D product from FIG. 8B manufactured via the methods described in this specification.
Figure 8B:
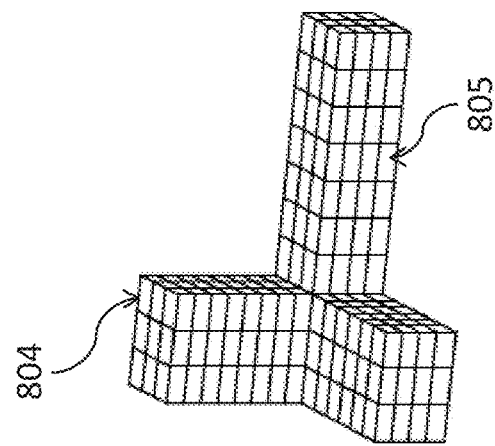
FIG. 8B depicts the desired 3D structure of FIG. 8A divided into subunits.
Figure 8A:
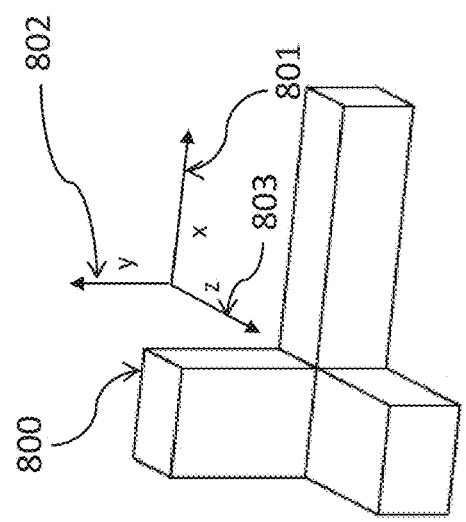
FIG. 8A depicts a desired 3D structure.

Similarly, FIG. 8A depicts an example of a 3D structure 800 including an x-direction component 801, a y-direction component 802, and a z-direction component 803, such that structure 800 has a tripod-like shape having three orthogonal extensions. FIG. 8B depicts structure 800 in a graphical representation 804, including a plurality of repeating subunits 805 comprising each of the three orthogonal extensions 801, 802, and 803. FIG. 8C depicts final product 806 manufactured by performing one or more of the above-described methods (or a similar method), corresponding to the interlinking pattern shown in FIG. 8B, and corresponding to the overall desired shape of structure 800 in FIG. 8A.

Figure 9C:
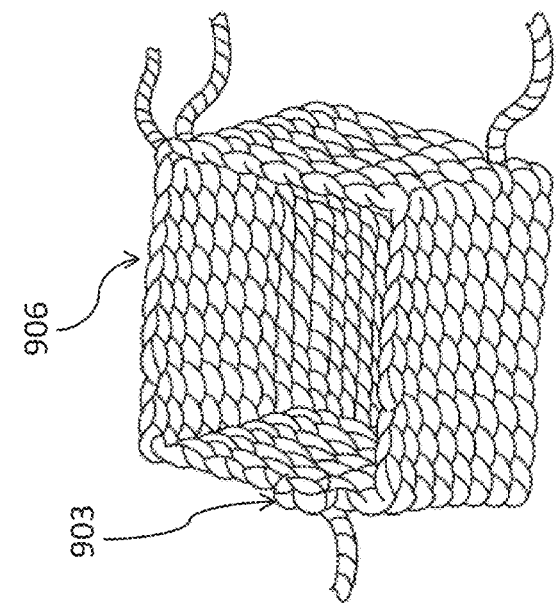
FIG. 9C depicts a final 3D product from FIG. 9B manufactured via the methods described in this specification.
Figure 9B:
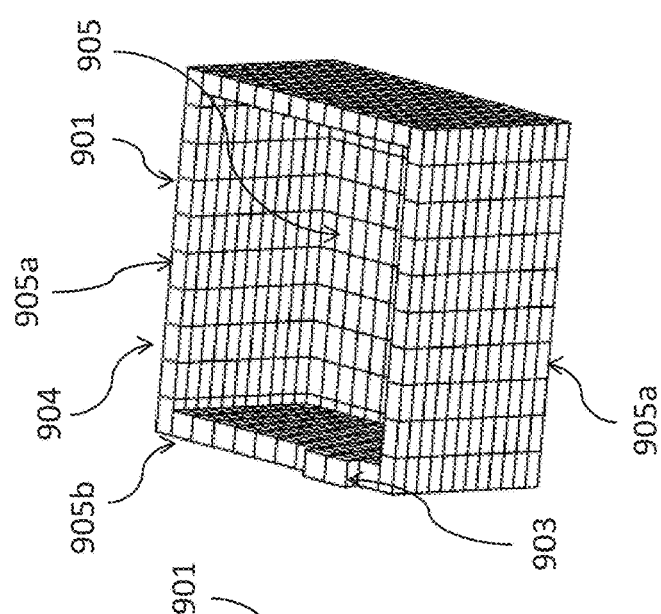
FIG. 9B depicts the desired 3D structure of FIG. 9A divided into subunits.
Figure 9A:
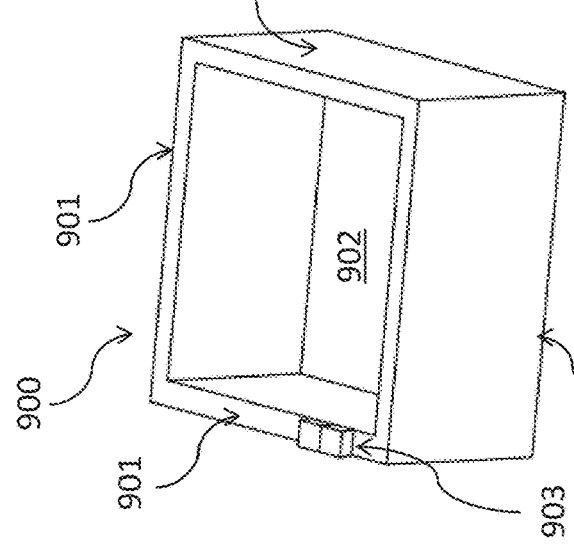
FIG. 9A depicts a desired 3D structure.

Another example of a product of manufacture is depicting in FIGS. 9A-9C. Similar to the examples above, FIG. 9A depicts structure 900 having a plurality of walls 901 and a base 902, with the structure 900 having an open top-portion, allowing for access to the void disposed between the plurality of walls 901 and the base 902. One of the plurality of walls 901 includes an extension 903 that extends above the remaining of the plurality of walls 901 along the z-direction of the structure 900. FIG. 9B depicts a graphical representation 904 including a plurality of repeating subunits 905 comprising the plurality of walls 901 and the base 902. As shown in FIG. 9B, the repeating subunits 905a of two of the walls 901 of the graphical representation 904 are smaller in volume and in surface area than the repeating subunits 905b of the remaining two walls 901 of the graphical representation 904, thereby demonstrating that subunits need not be identical to be interlinked. FIG. 9C depicts final product 906 manufactured by performing one or more of the above-described methods (or a similar method), corresponding to the interlinking pattern shown in FIG. 9B, and corresponding to the overall desired shape of structure 900 in FIG. 9A. As shown in FIG. 9C, extension 903 is a separate, interlinked strand of yarn-like material from the remainder of structure 900. Moreover, extension 903 may be a different material from the material used to create the other subunits of the structure 900. As such, complex structures can be created by using the methods of manufacture described in detail above.

System for Efficient Stitch Additive Manufacturing

Figure 10:
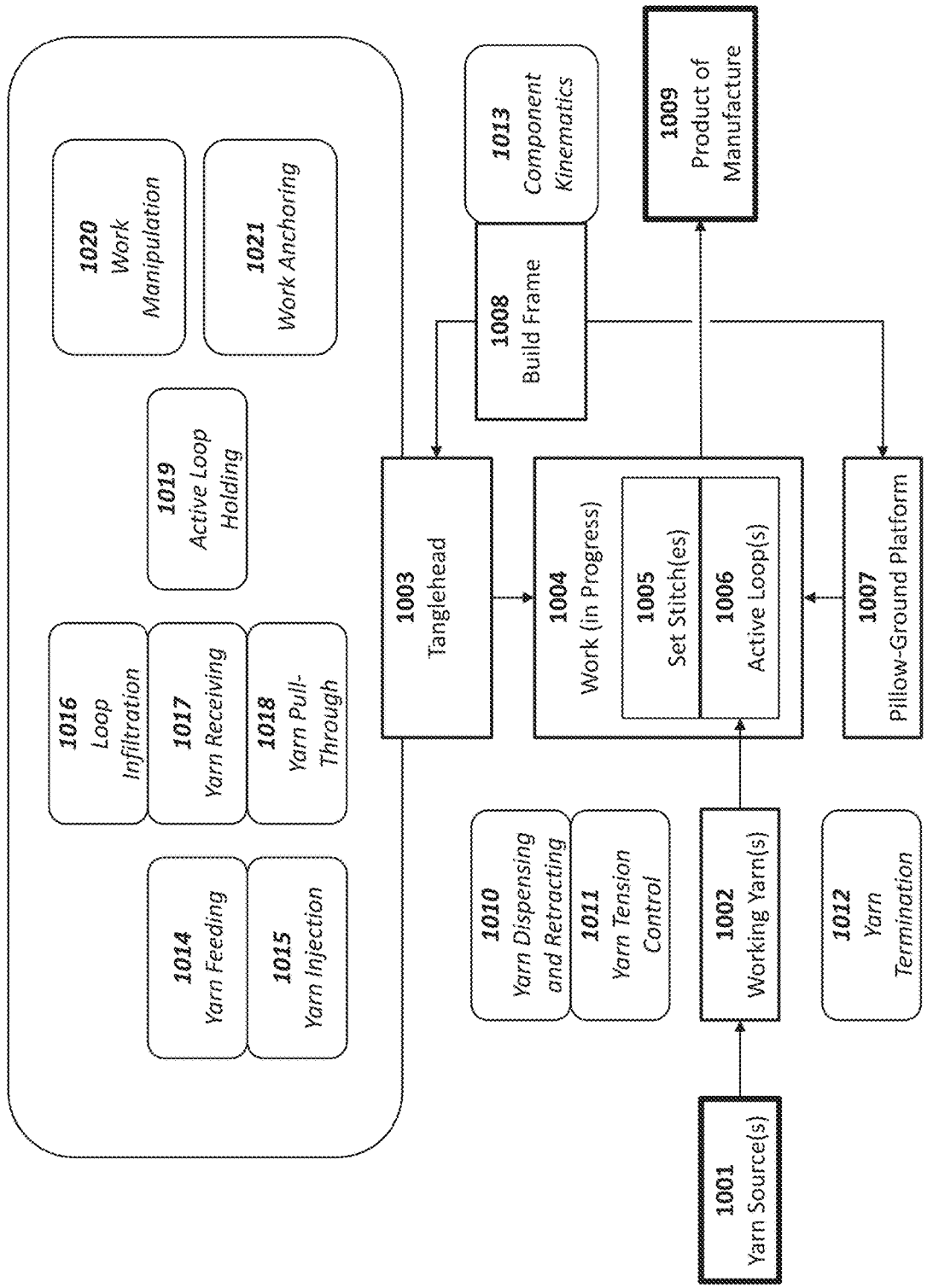
FIG. 10 is a process flow diagram depicting a stitch additive manufacturing process.

FIG. 10 presents an overview of a stitch additive manufacturing system, in accordance with an embodiment of the invention. The input into the system consists of one or more yarn source(s) 1001, which may be in the form of e.g. skeins, balls, rolls or other dispensable aggregations of yarn-like material. Issuing from the yarn source(s) 1001 is one of more lengths of working yarn 1002. The working yarn(s) 1002 are manipulated into set stiches 1005 and active loops 1006 via the processes described in detail above. This collection of set stiches and active loops is the intermediary product, which may be referred to as a "Work In-Progress" or "Work" 1004. Once the final desired configuration of set stiches has been formed, the Work 1004 is complete and becomes the output of the system, or the Product of Manufacture 1009.

One function of the system is Yarn Dispensing and Retracting 1010, which is the function of drawing or returning working yarn(s) 1002 from or to the yarn source(s) 1001. Another function of the system is Yarn Tension Control 1011, which is the function of controlling the tightness of the working yarn 1002 with respect to the work 1004, which provides control of stitch tightness. Yet another function of the system is Yarn Termination 1012, which is the function of cutting or otherwise disconnecting the working yarn or work from the yarn source 1001, to start a new series of stitches or to disconnect a completed product of manufacture. The system includes a function of Yarn Feeding 1014, which is the function of providing a length of working yarn for a pull-through. Another related function of the system is Yarn Injection 1015, which is the function of moving a length of working yarn into a stitch and optionally pushing the length of yarn through the stitch.

Yet another function of the system is Loop Infiltration 1016, which is the function of inserting a manipulation apparatus into a stitch. The system also includes a function of Yarn Receiving 1017, which is the function of taking within a manipulation apparatus a length of working yarn. Another function of the system is Yarn Pull-Through 1018, which is the function of drawing or traversing a length of working yarn through a loop section of a stitch, typically resulting in a new active loop. Still another function of the system is Active Loop Holding 1019, which is the function of holding or maintaining manipulation of active loop(s) 1006, while other functions are being performed, such that when needed the held active loop(s) 1006 may be pulled-through to construct the desired final collection of stitches. Yet another function of the system is Work Manipulation 1020, which is the function of physically handling by e.g. moving, rotating, pressing or gripping the work in-progress 1004. Another function of the system is Work Anchoring 1021, which is the function of physically or positionally constraining one or more stitches or parts of the work in-progress 1004, relative to other components of the system.

To help describe a general system, some components are defined. These components are associated with one or more functions of the SAM system. The 'Tanglehead' 1003 is defined as a component associated with the yarn and work manipulating functions 1014, 1015, 1016, 1017, 1018, 1019, 1020, and 1021, as defined above. The 'Pillow Ground Platform' 1007, is defined as a component associated with the work handling functions Work Manipulation 1020 and Work Anchoring 1021.

Another function of the system is Component Kinematics 1013, which is the function of controlling the position and orientation of various components of the system relative to each other, e.g. the work in-progress 1004 relative to the Tanglehead 1003 and its sub-components and/or the Pillow Ground Platform 1007. The Build Frame 1008 is defined as a structural component associated with the functions of spatially orienting the different components of the system.

Some of these functions may be optional in some embodiments of a system in accordance with the methods discussed in detail above. Moreover, the functions of the general system described above are further discussed below, and physical architectures including embodiments comprising apparatuses and methods are introduced.

Active Feeder-Passive Receiver System Architecture

Figure 11:
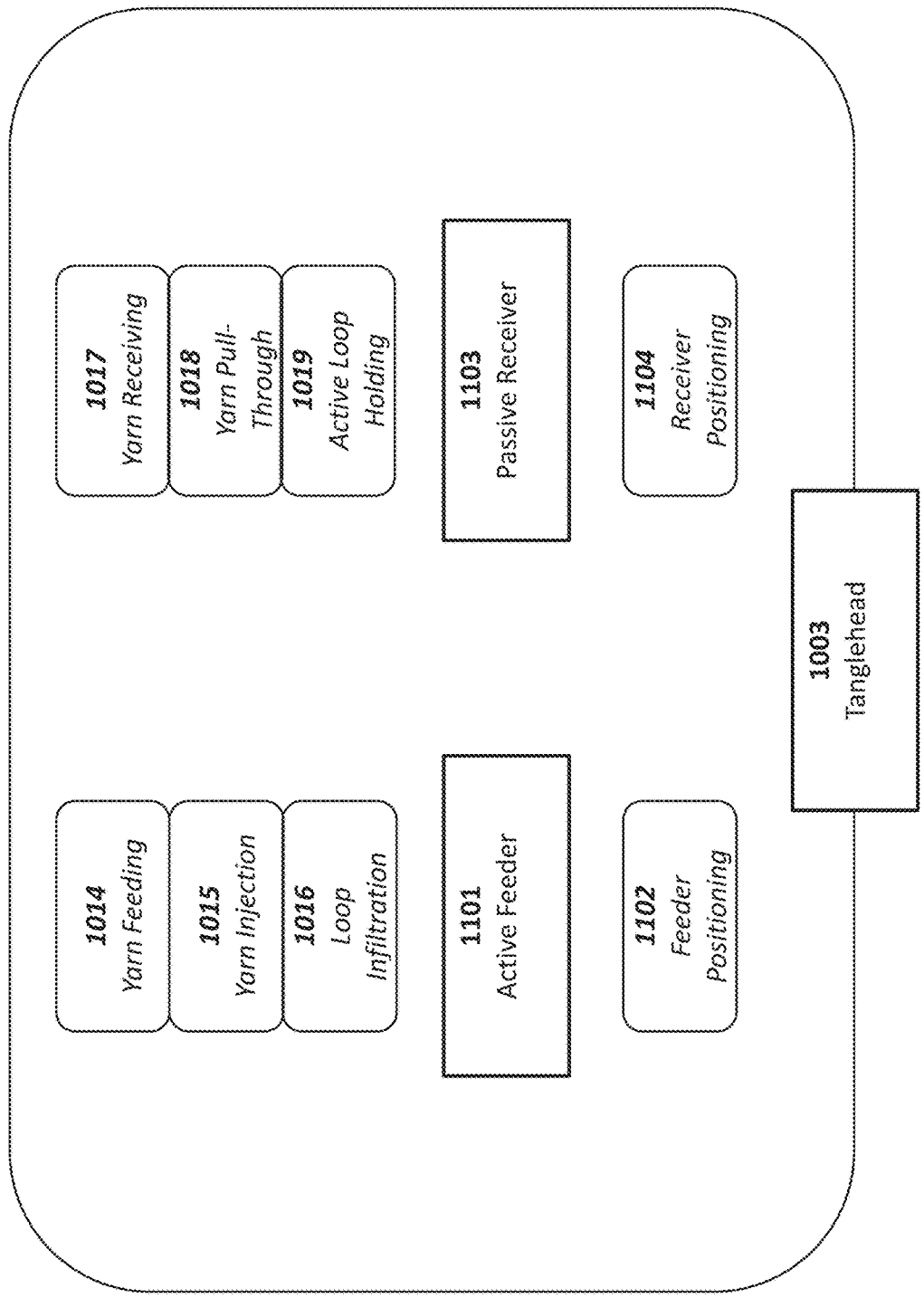
FIG. 11 is a general functional architecture of an active feeder-passive receiver type Tanglehead subsystem.

FIG. 11 depicts a general functional architecture of an Active Feeder-Passive Receiver type of Tanglehead subsystem, an embodiment of the systems described in detail above. A subcomponent 'Active Feeder' or 'Feeder' 1101 is defined and typically associated with the function Feeder Positioning 1102. The system depicted in FIG. 11 also includes the functions Yarn Feeding 1014, Yarn Injection 1015 and Loop Infiltration 1016. Another subcomponent 'Passive Receiver' or 'Receiver' 1103 is defined and typically associated with the function Receiver Positioning 1104, as well as the functions Yarn Receiving 1017, Yarn Pull-Through 1018 and Active Loop Holding 1019.

Figure 12B:
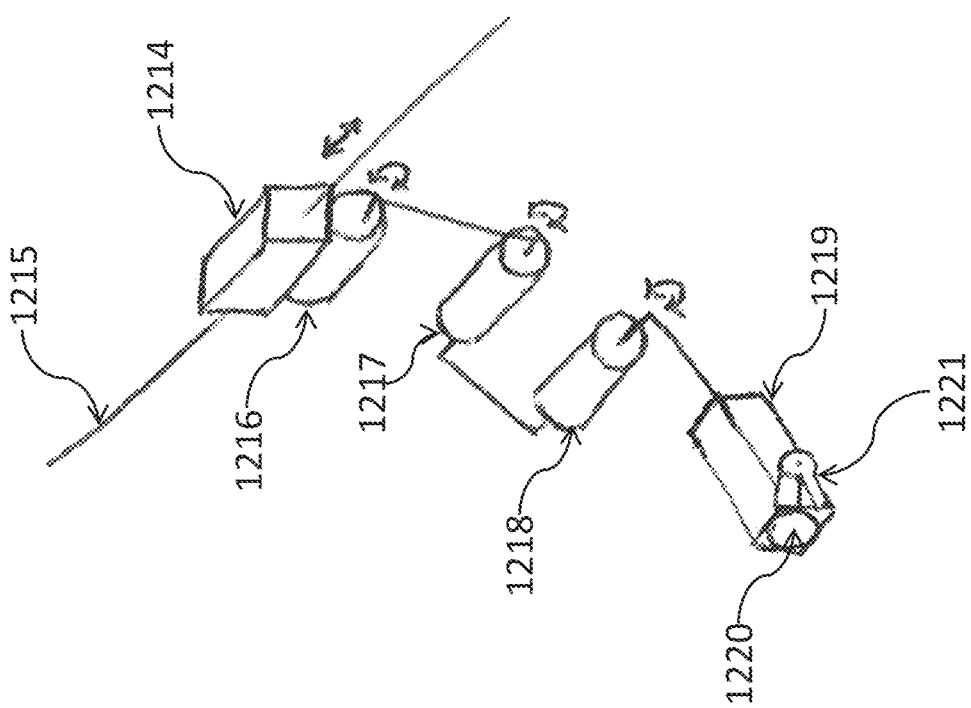
FIG. 12B depicts a passive receiver apparatus of a stitch additive manufacturing process.
Figure 12A:
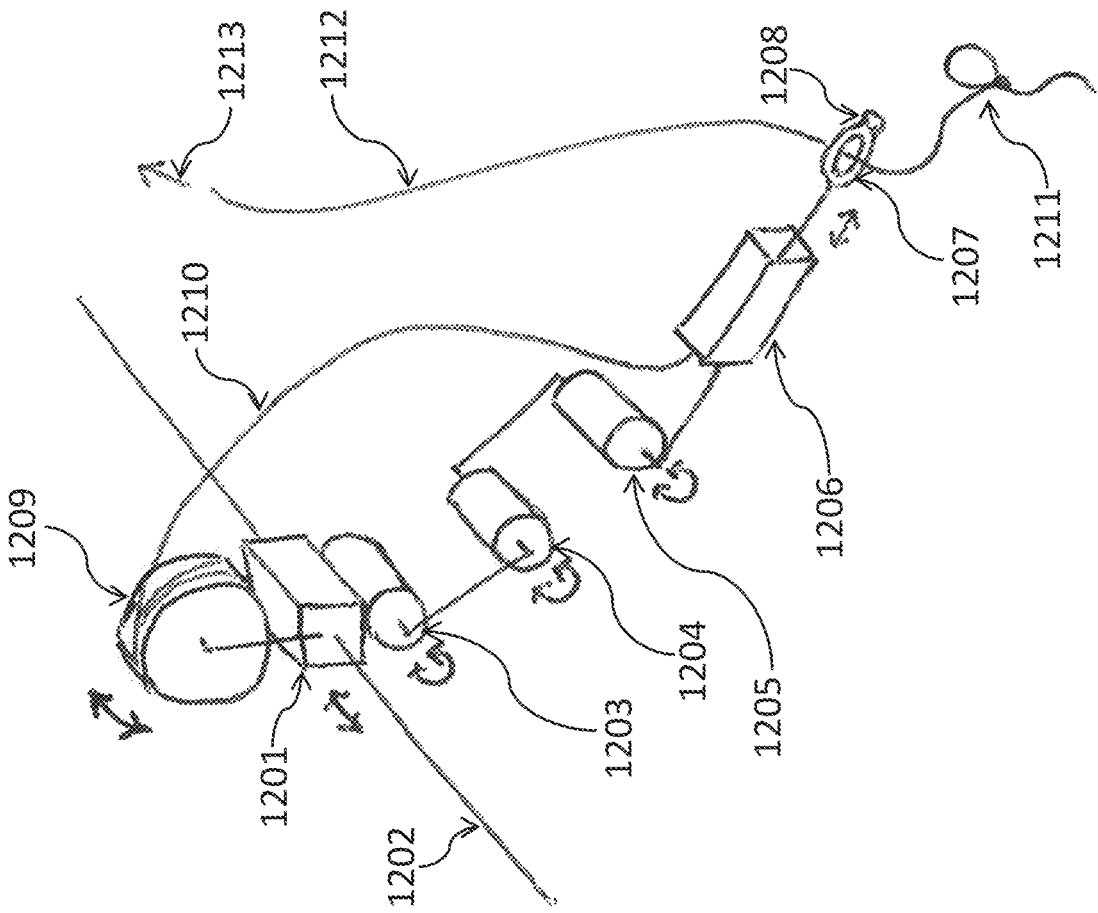
FIG. 12A depicts an active feeder apparatus of a stitch additive manufacturing process.

FIG. 12A depicts a simple schematic of an Active Feeder apparatus. The components that implement the Feeder Positioning function 1012 are shown in a kinematic chain diagram comprising: a slider 1201 that moves along an axis 1202, a rotational joint 1203 attached to the previous slider 1201, another rotational joint 1204 attached to the previous joint 1203, yet another rotational joint 1205 attached to the previous joint 1204, and an end effector 1206 i.e. the Feeder attached to the previous joint 1205. This kinematic chain may be attached to another kinematic chain.

FIG. 12A also depicts a 'Flying Eye' 1207, which may have a ferromagnetic knob 1208. An 'Eye Spool' 1209 winds and unwinds an 'Eye Draw-Wire' 1210 that passes through the Feeder 1206 and is attached to the Flying Eye 1207, enabling extension and retraction of the Flying Eye 1207. An example stitch 1211 is depicted, with the working yarn 1212 passing through the eye of the Flying Eye. The yarn is further connected to the yarn source 1213.

FIG. 12B depicts a simple schematic of a Passive Receiver apparatus. The components that implement the Receiver Positioning function 1014 are shown in a kinematic chain diagram comprising: a slider 1214 that moves along an axis 1215, a rotational joint 1216 attached to the previous slider 1214, another rotational joint 1217 attached to the previous joint 1216, yet another rotational joint 1218 attached to the previous joint 1217, and an end effector 1219, i.e. the Receiver attached to the previous joint 1218. The receiver further includes a receptacle 1220 and a mini-gripper 1221.

FIG. 13A depicts a top view detail of the Flying Eye 1207. The eye 1301 of the Flying Eye 1207 is depicted. Yarn-like material may freely pass through the eye 1301. The flying eye 1207 includes an endpoint 1302 which is knob-like, and which may be ferromagnetic or otherwise attractable to the Receptacle 1220. The flying eye 1207 includes eye draw-wire 1303, which enables extension and retraction of the Flying Eye.

FIG. 13B depicts a side view detail of the Flying Eye 1207. The yarn may travel toward the yard tensioner, as depicted by reference numeral 1304. The yarn may also travel toward the work-in-progress, as depicted by reference numeral 1305. The relative motion of the yarn means that the yarn may travel while the flying eye remains fixed, or the flying eye may travel along a fixed yarn, or a combination of these two motions.

FIG. 13C depicts an inner cross-section detail of the Passive Receiver 1219. The flying eye mates within receptacle cavity 1306. The cavity 1306 includes a restriction 1307 that may help latch the flying eye into the receptacle cavity 1306, such that a greater pulling force is needed to dislodge the flying eye. Also depicted is a solenoid 1308 that facilitates attraction and holding of the flying eye, particularly the knob of the flying eye, into the receptacle cavity. The passive receiver 1219 includes a shaft 1309.

FIG. 13D depicts an outer view of the Passive Receiver 1219, including mini-gripper 1310 positioned on one side of the shaft 1309 of the passive receiver. The mini-gripper 1310 enables the holding of a section of yarn-like material.

FIG. 13E depicts one embodiment of an Active Feeder 1206 to Flying Eye 1207 joint. The Eye Draw-Wire 1210 is attached to the Flying Eye and passes through the Active Feeder. There are recessed edges 1310 on the Flying Eye and/or the Active Feeder. Moreover, FIG. 13F depicts the flexing of the active-feeder-to-flying-eye joint as the eye draw-wire is further retracted, enabling more control of the flying eye orientation simply via rotation of the eye spool 1209 (to dispense or retract the draw-wire).

Figure 14B:
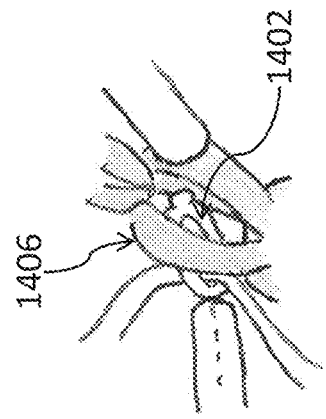
FIG. 14B depicts a step of using an apparatus of an active feeder-passive receiver subsystem.
Figure 14D:
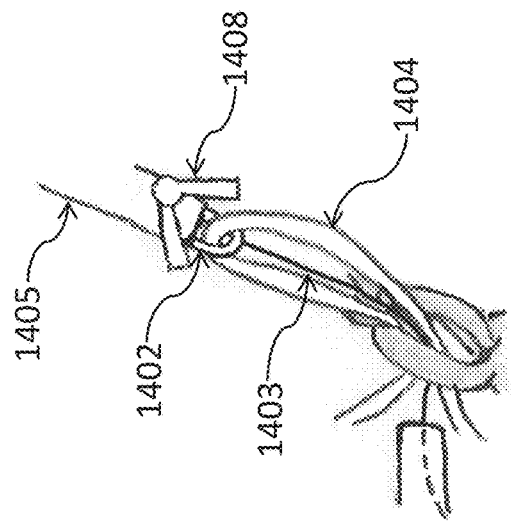
FIG. 14D depicts a step of using an apparatus of an active feeder-passive receiver subsystem.
Figure 14A:
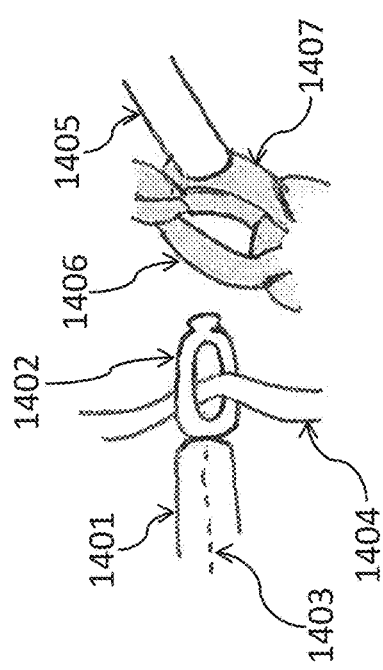
FIG. 14A depicts a step of using an apparatus of an active feeder-passive receiver subsystem.

FIG. 14A depicts an initial step of a general method utilizing the apparatus of an Active Feeder-Passive Receiver subsystem. The feeder shaft 1401 and the flying eye 1402 are positioned close to a stitch that is to be infiltrated (the target stitch). The eye draw-wire 1403 is retracted and a length of working yarn 1404 passes through the eye. Approximately concurrently, the receiver shaft 1405 is also positioned very close to the target stitch, approximately between the left loop 1406 and the right loop 1407 of the target stitch.

FIG. 14B depicts a subsequent step of said method. The active feeder is moved such that the flying eye 1402 begins to enter the target stitch, beginning to traverse the left loop 1406. During this process, the Loop Infiltration function 1016 is being performed.

Figure 14C:
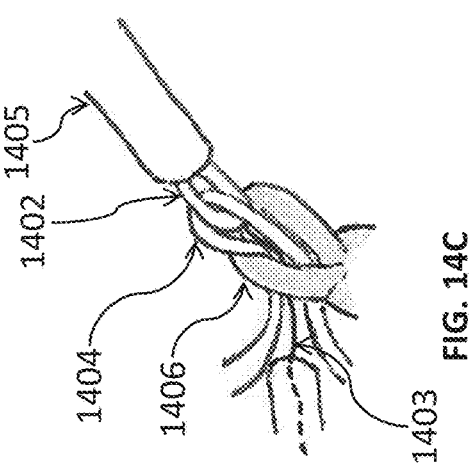
FIG. 14C depicts a step of using an apparatus of an active feeder-passive receiver subsystem.

FIG. 14C depicts another subsequent step of said method. The attraction between the flying eye 1402 and the receptacle of the passive receiver 1405 is activated by e.g. activating a solenoid within the passive receiver or by bringing the ferromagnetic knob of the flying eye close enough to the magnetic receptacle of the passive receiver. This attraction pulls and holds the flying eye 1402 into the receptacle of the passive receiver 1405. The eye draw-wire 1403 has been allowed to extend or slacken. Notice that a length of working yarn 1404 has been drawn through the target stitch under the left loop 1406. During this process, the Yarn Feeding 1014 and Yarn Receiving 1017 functions are being performed.

FIG. 14D depicts another subsequent step of said method. With the flying eye 1402 still held within the receptacle of the passive receiver 1405, by e.g. solenoid action, magnetic force or latching of the knob onto the receptacle constriction, the passive receiver 1405 is moved further from the target stitch, drawing out additional length of working yarn 1404 through the target stitch (forming a new Active Loop), as the eye draw-wire 1403 continues to extend in a slack state. During this process, the Yarn Pull-Through 1018 function is being performed. The mini-gripper 1408 is shown on the passive receiver in FIG. 14C. The mini-gripper is not shown in the previous figures for visual clarity as it is not yet utilized in the exemplary process.

Figure 14E:
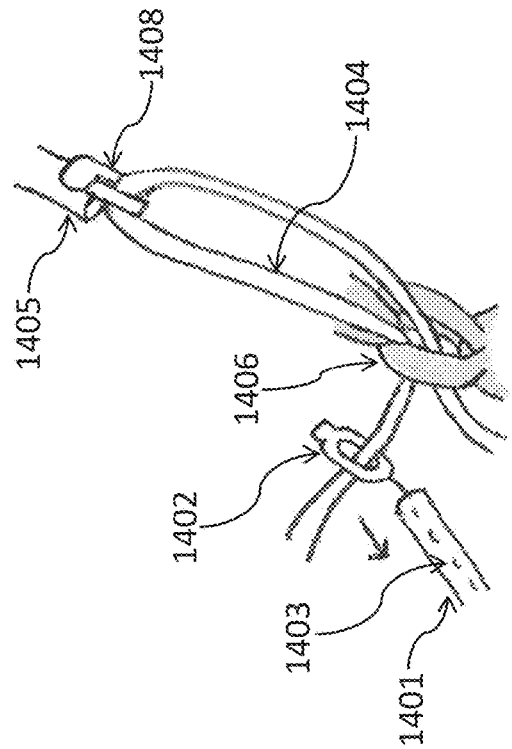
FIG. 14E depicts a step of using an apparatus of an active feeder-passive receiver subsystem.

FIG. 14E depicts another subsequent step of said method. The flying eye 1402 is now released from the receptacle of the passive receiver 1405, by e.g. cessation of solenoid action or a tugging impulse through the eye draw-wire. The flying eye 1402 is retracted by retracting the eye draw-wire 1403. The flying eye travels along the length of working yarn issuing from the yarn source, away from the passive receiver 1405. The mini-gripper 1408 is closed on a section of working yarn, holding the active loop in place while the flying eye is retracted. During this process, the Active Loop Holding 1019 function is being performed.

Figure 14F:
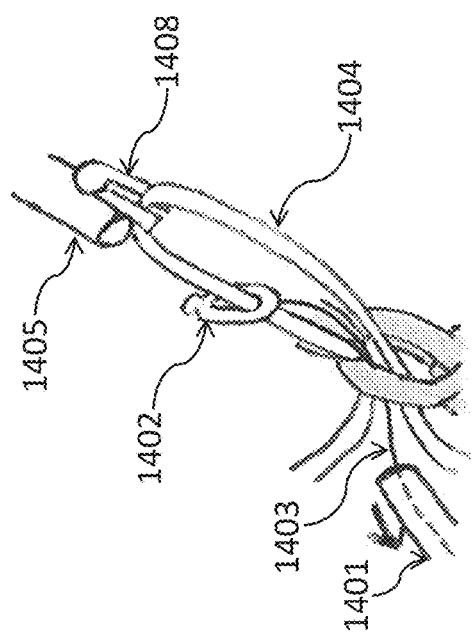
FIG. 14F depicts a step of using an apparatus of an active feeder-passive receiver subsystem.

FIG. 14F depicts another subsequent step of said method. The flying eye 1402 has now been fully retracted out of the target loop 1406, and is rejoining the active feeder shaft 1401, while the active loop was held in place by the closed mini-gripper 1408. Notice that the working yarn 1404 still passes through the flying eye 1402. During this process, the Active Loop Holding 1019 function is being performed.

Figure 14G:
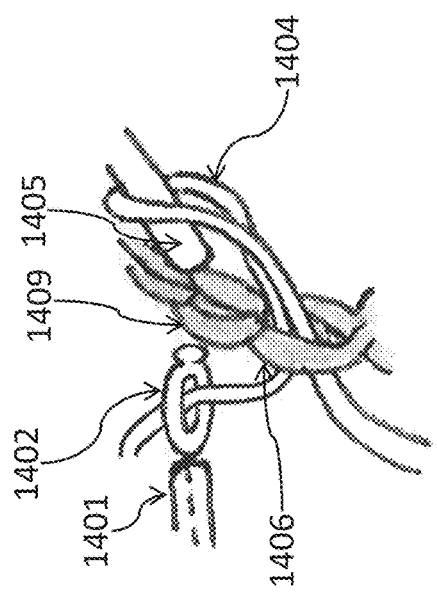
FIG. 14G depicts a step of using an apparatus of an active feeder-passive receiver subsystem.

FIG. 14G depicts another subsequent step of said method. A next target stitch 1409 is selected. The passive receiver 1405 is again brought very close to this next target stitch 1409. The active feeder 1401 and flying eye 1402 are also moved close to this next target stitch 1409. Notice that the previously formed active loop 1404 is still held on the shaft of the passive receiver 1405. Next, the procedure for loop infiltration and stitch formation described in the previous paragraphs are repeated as needed to construct the desired 3D structure.

It should be understood that the series of steps presented in the above-described method is an example embodiment. The general method can be applied to target any loop (e.g. left loop, right loop, bottom loop or other loop) on any stitch (adjacent or further separated) within a work in-progress. The use of attractive e.g. magnetic and/or latching forces between the flying eye and the receptacle of the passive receiver simplifies the problem of positioning the end effectors accurately enough for reliable stitch formation. Once the passive receiver is within the general exit of a target loop or stitch, the attractive forces serve to guide the flying eye through, despite of some bounded error in end effector positioning. Moreover, a smooth knob-like structure of the flying eye also eases loop infiltration and simplifies the problem of positioning the end effectors accurately. Once the smooth knob is within the general entry of a target loop or stitch, the knob can easily catch and slide through the entry.

Active Receiver-Passive Feeder Architecture

Figure 15:
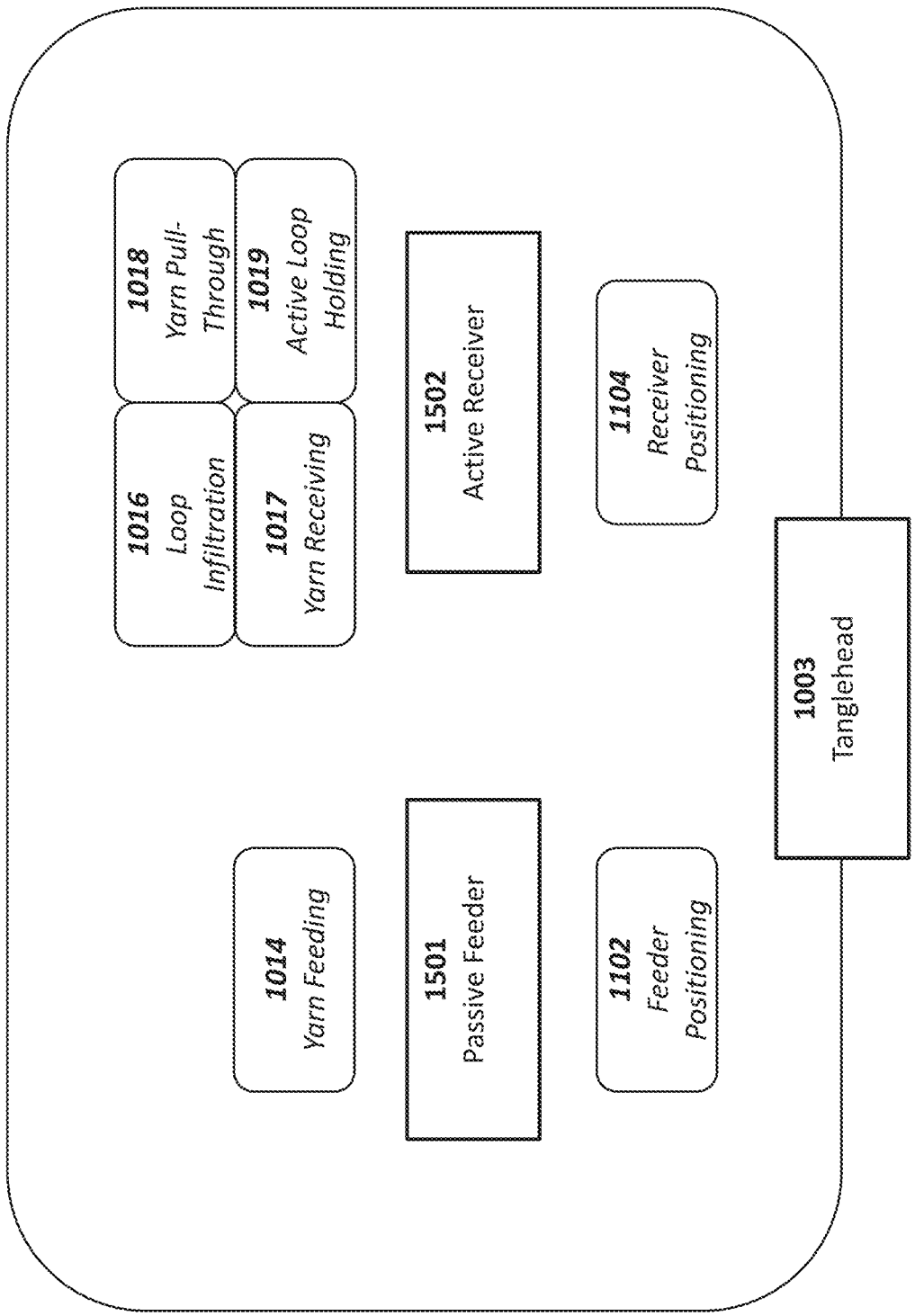
FIG. 15 is a diagram of a general functional architecture of a passive feeder-active receiver type Tanglehead subsystem.

An alternative, but related, method is depicted in FIG. 15, which depicts a general functional architecture of a Passive Feeder-Active Receiver type of Tanglehead subsystem, an embodiment of the systems described in detail above. A subcomponent 'Passive Feeder' or 'Feeder' 1501 is defined and typically associated with the function Feeder Positioning 1102 and also the function Yarn Feeding 1014. Another subcomponent 'Active Receiver' or 'Receiver' 1103 is defined and typically associated with the function Receiver Positioning 1104 and also the functions Loop Infiltration 1016, Yarn Receiving 1017, Yarn Pull-Through 1018 and Active Loop Holding 1019.

Figure 16B:
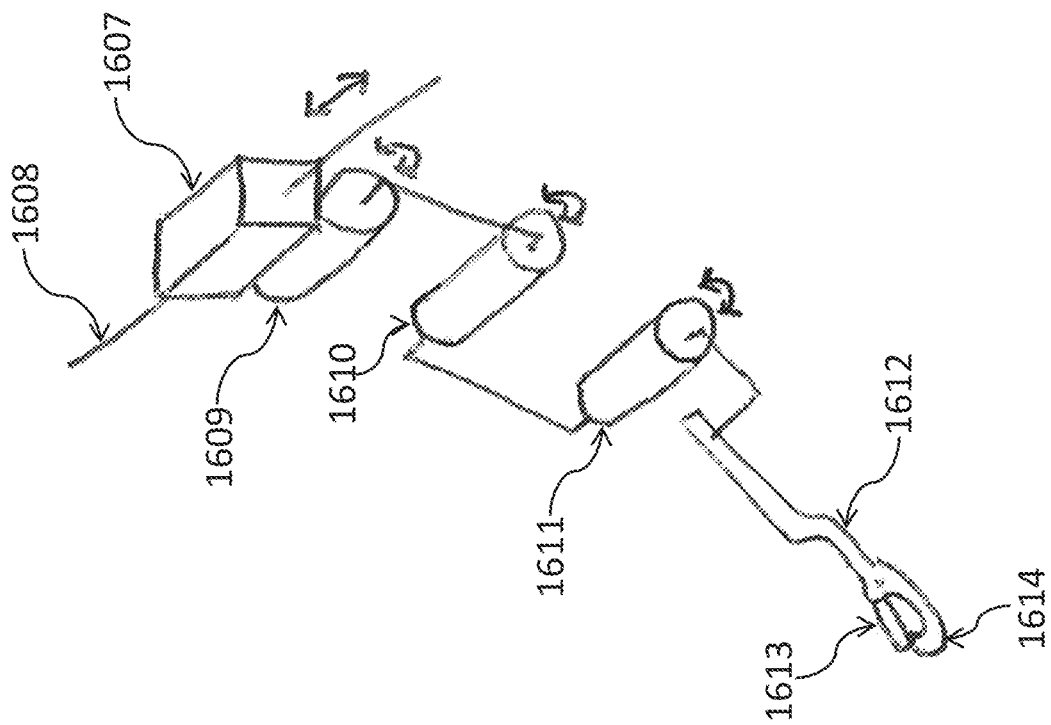
FIG. 16B depicts an active receiver apparatus of a stitch additive manufacturing process.
Figure 16A:
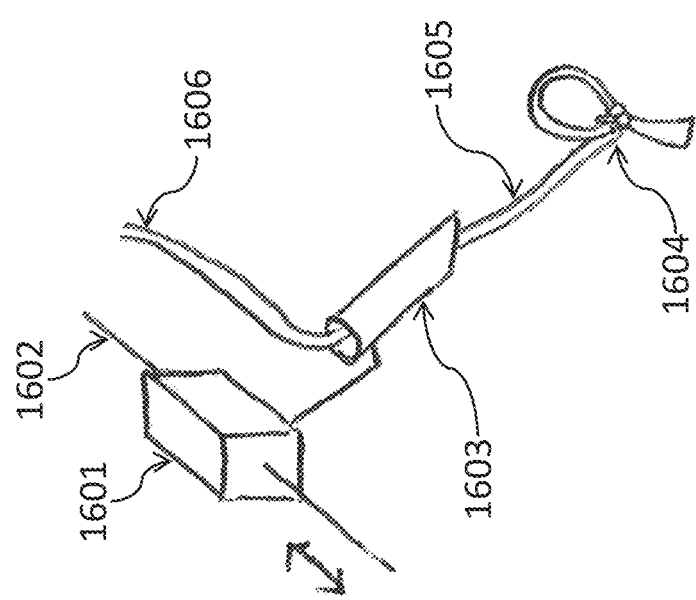
FIG. 16A depicts a passive feeder apparatus of a stitch additive manufacturing process.

FIG. 16A depicts a simple schematic of a Passive Feeder apparatus. The components that implement the Feeder Positioning function 1012 comprises a slider 1601 that moves along an axis 1602, and an end effector 1603 i.e. the Feeder attached to the previous slider 1601. This simple kinematic chain may be attached to another kinematic chain, and is one example embodiment to move the end effector. An example stitch 1604 is depicted, with the working yarn 1605 passing through the Feeder 1603. Towards one end 1606, the yarn is further connected to the yarn source.

FIG. 16B depicts a simple schematic of an Active Receiver apparatus. The components that implement the Receiver Positioning function 1014 are shown in a kinematic chain diagram comprising: a slider 1607 that moves along an axis 1608, a rotational joint 1609 attached to the previous slider 1607, another rotational joint 1610 attached to the previous joint 1609, yet another rotational joint 1611 attached to the previous joint 1610, and an end effector 1612 i.e. the Receiver attached to the previous joint 1611. This kinematic chain may be attached to another kinematic chain, and is one example embodiment to move the end effector. As depicted in FIG. 16B, the end effector 1612 is similar to a Latch Hook, with a Hook structure 1614 and a Latch structure 1613.

Figure 17B:
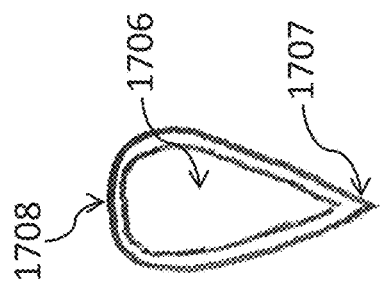
FIG. 17B depicts an embodiment of a passive feeder.
Figure 17D:
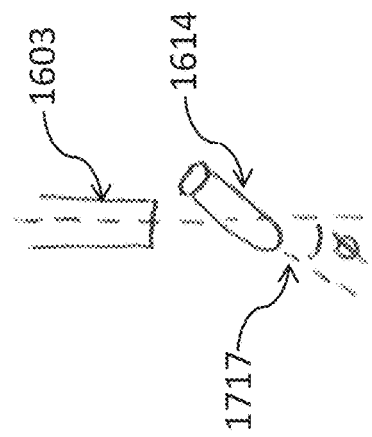
FIG. 17D depicts an embodiment of an active receiver.
Figure 17A:
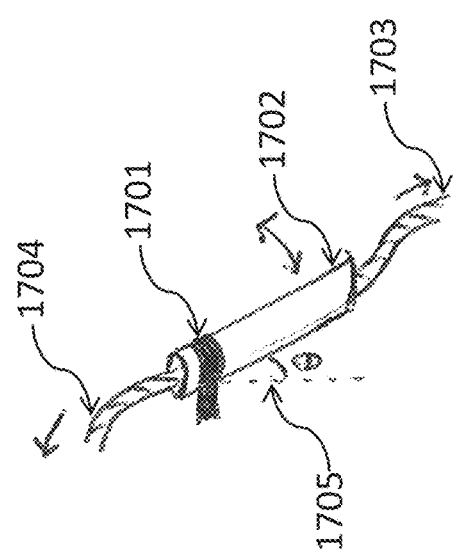
FIG. 17A depicts an embodiment of a passive feeder.

FIG. 17A depicts a side view detail of the Passive Feeder 1603. 1701 depicts an example of how the Feeder Tube 1702 may be held, e.g. by a collar connected to a rigid structure. The feeder tube 1702 may be made of flexible material e.g. PTFE, PEEK, TPU or other plastics, such that the tube structure may elastically flex when an external force is applied. The yarn may travel through the feeder tube toward the work-in-progress, as denoted by reference numeral 1703. Alternatively, the yarn may travel through the feeder tube toward the yarn tensioner, as denoted by reference numeral 1704. The feeder tube 1702 may be angled forward relative to the vertical axis by some angle theta, as denoted by reference numeral 1705. This forwards angling facilitates the Latch Hook catching and drawing the Feeder Tube.

FIG. 17B depicts a cross-section detail of the Feeder Tube 1702. The feeder tube 1702 includes cavity 1706 that may have a smooth inner surface such that the yarn-like build material may slide through with relatively low friction. The back side of the feeder rube 1702 may be tapered, as denoted by reference numeral 1707, to facilitate the Latch Hook catching and drawing or pulling on the Feeder Tube. The front side of the feeder tube 1702 may be smooth or rounded, as denoted by reference numeral 1708.

Figure 17C:
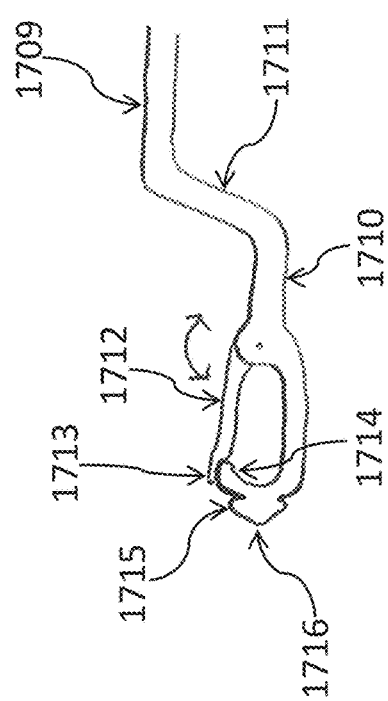
FIG. 17C depicts an embodiment of an active receiver.

FIG. 17C depicts a side view detail of the Active Receiver 1612. The active receiver shaft includes a first generally straight segment 1709 and a second generally straight segment 1710. Between the two segments 1709 and 1710 is a bend and displacement segment 1711. The two generally straight segments 1709 and 1710 may be parallel or at any angle relative to each other. A latch structure 1712 pivots between a closed and an open state, which may be passive (e.g. a loose latch that may be pushed open or close by contact with other surfaces) or active (e.g. a solenoid, drawstring or piezo-actuator controlled latch). A tip 1713 of the Latch 1712 is slightly displaced and rounded to facilitate opening and closing of the Latch through contact with the other surfaces. A hook-like structure 1714 toward the tip of the active receiver serves to catch, draw and hold yarn-like material or other structures. A smooth, knob-like structure 1715 toward the tip of the active receiver facilitates loop infiltration and simplifies the problem of positioning the end effector accurately—once the smooth knob is within the general entry of a target loop or stitch, the knob can more easily catch and slide through the entry. The active receiver tip may be tapered, as denoted by reference numeral 1716, with the tapering facilitating loop infiltration.

FIG. 17D depicts a simple schematic showing the Latch Hook structure 1614 being optionally set at some angle phi 1717, relative to the Feeder Tube structure 1603. This angling 1717 between the Latch Hook 1614 and the Feeder Tube 1603 facilitates the Latch Hook catching and pulling on the Feeder Tube.

Figure 18A:
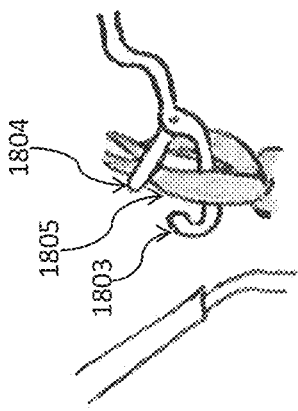
FIG. 18A depicts a step of manufacturing a 3D structure using the passive feeder-active receiver stitch additive manufacturing methods described herein.

FIG. 18A depicts an initial step of a general method utilizing the apparatus of a Passive Feeder-Active Receiver subsystem. A stitch is selected to be infiltrated (the target stitch). As depicted, 1805 is the left loop of the target stitch and 1806 is the right loop of the target stitch. The active receiver end (or latch hook) 1803 is brought close to the target stitch. The latch 1804 is depicted in the closed state. The latch 1804 can also be in the open or other intermediate state. The feeder tube 1801 is also brought closer to the target stitch.

Figure 18B:
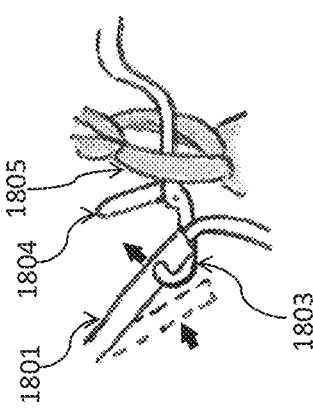
FIG. 18B depicts a step of manufacturing a 3D structure using the passive feeder-active receiver stitch additive manufacturing methods described herein.

FIG. 18B depicts a subsequent step of said method. The tip of the active receiver 1803 is pushed through the target stitch, underneath the left loop 1805. The left loop of the target stitch 1805 collides with the latch 1804, causing the latch to begin to open. During this process, the Loop Infiltration function 1016 is beginning to be performed.

Figure 18C:
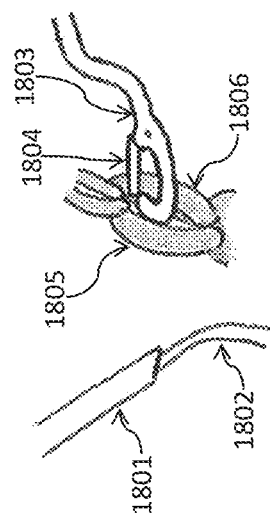
FIG. 18C depicts a step of manufacturing a 3D structure using the passive feeder-active receiver stitch additive manufacturing methods described herein.

FIG. 18C depicts another subsequent step of said method. The entire latch hook (1803 and 1804) has been pushed through the target stitch. Collision with the target stitch 1805 has caused the latch 1804 to be fully or widely opened. The hook 1803 of the active receiver is pushed past the feeder tube 1801. During this process, the Loop Infiltration function 1016 is being performed.

Figure 18D:
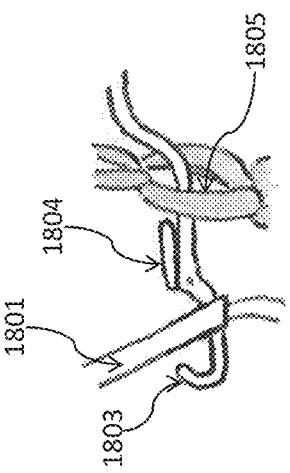
FIG. 18D depicts a step of manufacturing a 3D structure using the passive feeder-active receiver stitch additive manufacturing methods described herein.

FIG. 18D depicts another subsequent step of said method. The hook 1803 of the active receiver is drawn back, catching the flexible feeder tube 1801, which may flex as it is pulled by the hook 1803. The latch 1804 again collides with the target stitch 1805, causing the latch to begin to close.

Figure 18F:
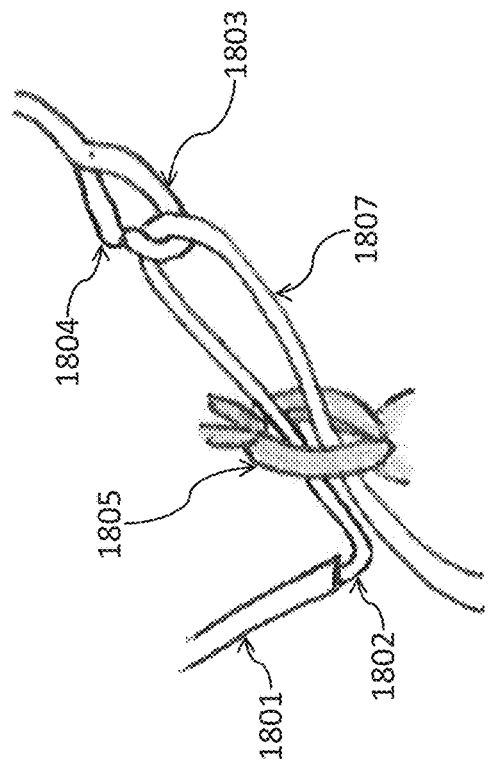
FIG. 18F depicts a step of manufacturing a 3D structure using the passive feeder-active receiver stitch additive manufacturing methods described herein.
Figure 18H:
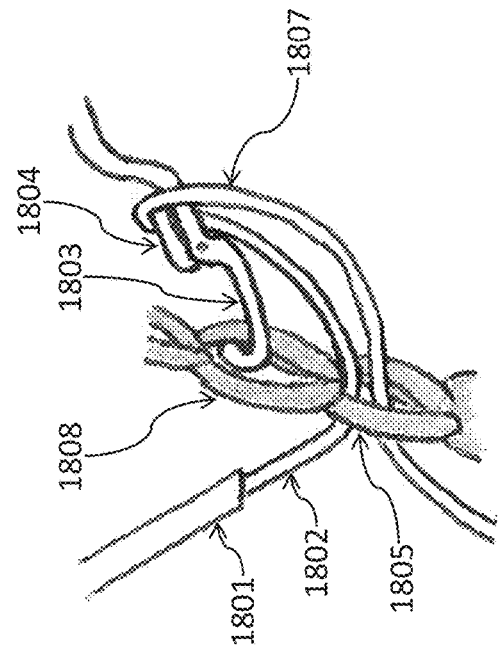
FIG. 18H depicts a step of manufacturing a 3D structure using the passive feeder-active receiver stitch additive manufacturing methods described herein.
Figure 18E:
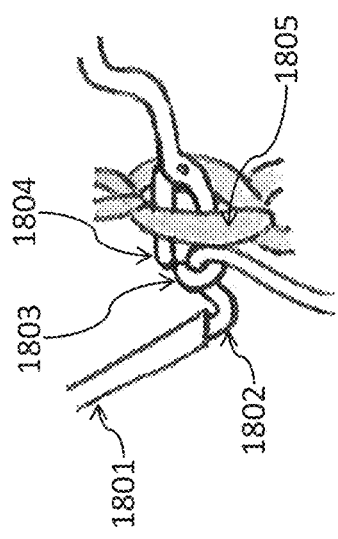
FIG. 18E depicts a step of manufacturing a 3D structure using the passive feeder-active receiver stitch additive manufacturing methods described herein.

FIG. 18E depicts another subsequent step of said method. The hook 1803 of the active receiver is drawn further back, beginning to pass through the target stitch. Collision with the left loop of the target stitch 1805 has caused the latch 1804 to be fully or nearly fully closed. As the hook 1803 was drawn back, the hook traveled down the flexible feed tube 1801 and caught the working yarn 1802. The working yarn 1802 is slack or dispensed in tandem with the drawback motion of the hook 1803, such that a section of yarn is now held within the closed latch hook of the active receiver 1803. During this process, the Yarn Feeding 1014 and Yarn Receiving 1017 functions are being performed.

FIG. 18F depicts another subsequent step of said method. The entire latch hook (1803 and 1804) has been pulled back through the target stitch 1805. A length of working yarn 1802 has been drawn out via the feeder tube 1801—this length forming a new active loop 1807 that is held within the closed latch hook (1803 and 1804). During this process, the Yarn Feeding 1014, Yarn Pull-Through 1018 and Active Loop Holding 1019 functions are being performed.

Figure 18G:
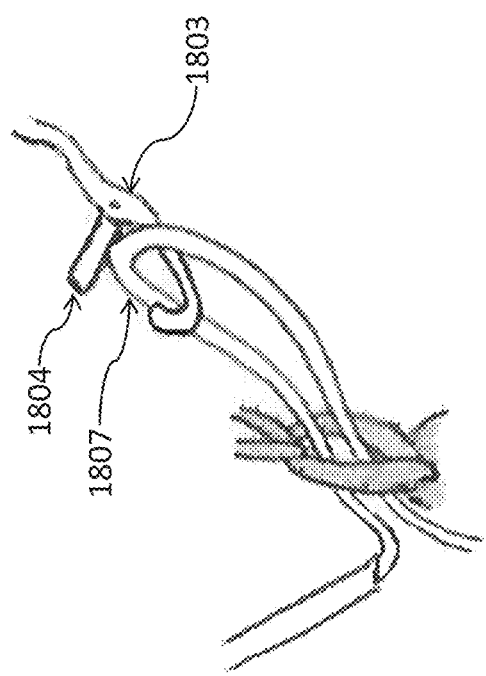
FIG. 18G depicts a step of manufacturing a 3D structure using the passive feeder-active receiver stitch additive manufacturing methods described herein.

FIG. 18G depicts another subsequent step of said method. The active feeder 1803 is beginning to be moved to a new position. The latch 1804 collides with the slack active loop 1807, causing the latch to begin to open.

FIG. 18H depicts another subsequent step of said method. A next target stitch is selected, with 1808 being the left loop of this next target stitch. The active receiver end 1803 is brought close to the next target stitch. The feeder tube 1801 is also brought closer to the next target stitch. The latch 1804 may now be fully open, partially open or still closed. Next, the procedure for loop infiltration and stitch formation described in the previous paragraphs are repeated as needed to construct the desired 3D structure.

Further exemplary illustration is given for the general method utilizing the apparatus of a Passive Feeder—Active Receiver subsystem. FIG. 18I depicts a subsequent step of said method. Following the previously described procedure for loop infiltration and pull-through in FIGS. 18A-18H, a new section of working yarn 1802 is captured in the active receiver 1803 that is now being drawn out of the next target stitch 1808. The previously formed active loop 1807 is still being held on the active receiver shaft.

Figure 18K:
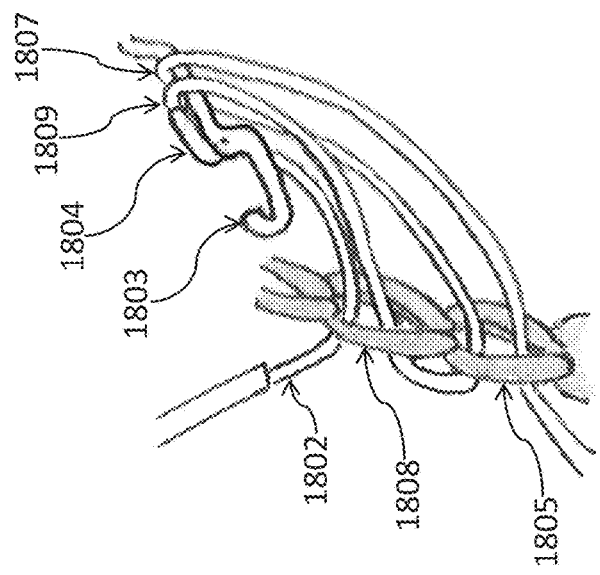
FIG. 18K depicts a step of manufacturing a 3D structure using the passive feeder-active receiver stitch additive manufacturing methods described herein.
Figure 18I:
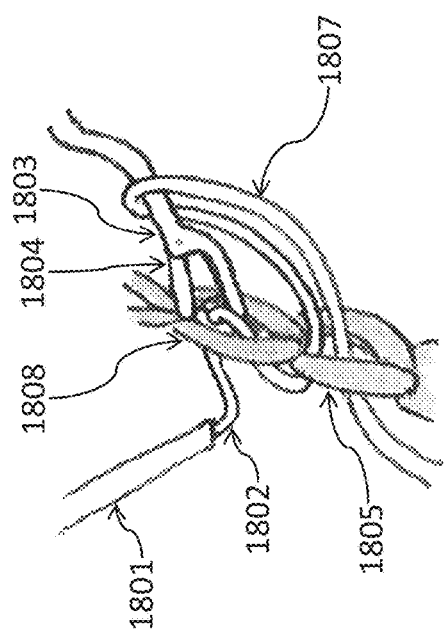
FIG. 18I depicts a step of manufacturing a 3D structure using the passive feeder-active receiver stitch additive manufacturing methods described herein.
Figure 18J:
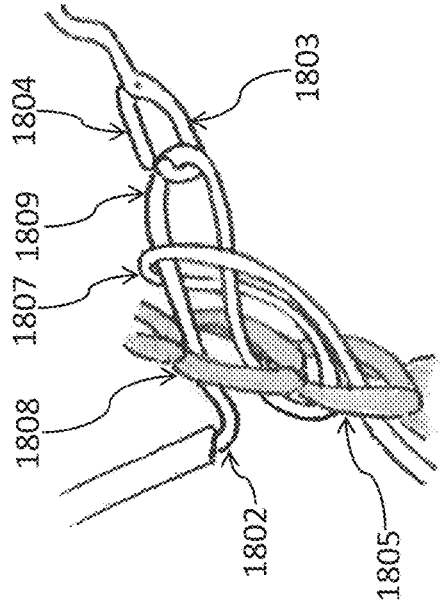
FIG. 18J depicts a step of manufacturing a 3D structure using the passive feeder-active receiver stitch additive manufacturing methods described herein.

FIG. 18J depicts one possible subsequent step of said method, when one or more active loops are previously held on the active receiver shaft. The latch hook (1803 and 1804) with the captive working yarn 1802 can be completely pulled through both the target stitch 1808 and the previously held active loop 1807. The previously held active loop 1807 has now become a set loop, and a new active loop 1809 is now held by the active receiver.

FIG. 18K depicts another possible subsequent step of said method, when one or more active loops are previously held on the active receiver shaft. The latch hook (1803 and 1804) is completely pulled through the target stitch 1808 but not through the previously held active loop 1807. A new active loop 1809 is formed. Both the previous active loop 1807 and the new active loop 1809 remain on the active receiver shaft. One or more of these active loops can be set in a subsequent pull-through, allowing formation of various stitches approximating e.g. single crochet, half double crochet, double crochet, triple crochet and other configurations of loops.

Pillow Ground Platform Architectures

To facilitate the methods for stitch formation previously described and to facilitate the Work Manipulation function 1020, a platform or 'ground platform' for the work in-progress to rest on may be utilized. This ground platform may furthermore be elastic, spongy, cushion-like or springy, locally deforming when pressure is applied and returning to its non-deformed state after pressure is removed, similar to a pillow. Such a component is defined as a 'Pillow Ground Platform' or 'Pillow Ground'.

Figure 19B:
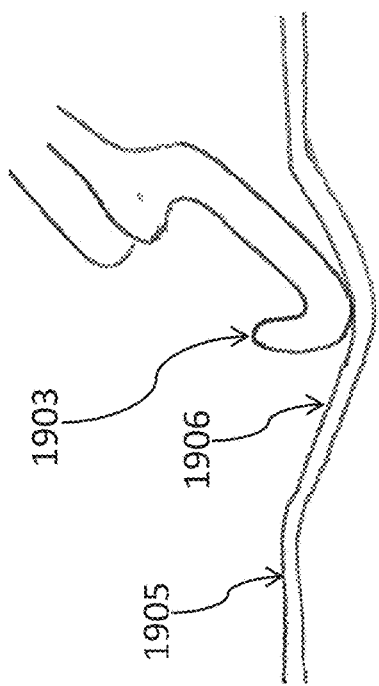
FIG. 19B depicts a pillow ground, in accordance with an embodiment of the present invention.
Figure 19A:
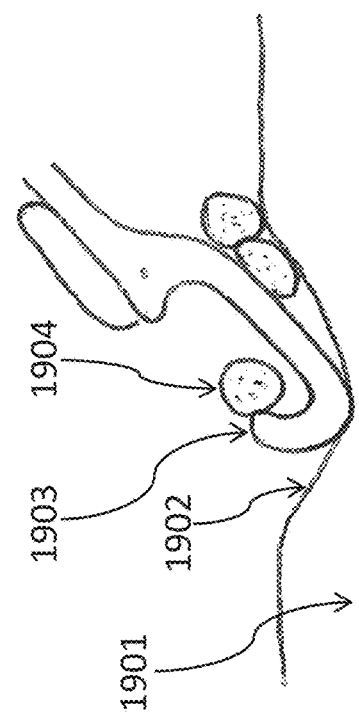
FIG. 19A depicts a pillow ground, in accordance with an embodiment of the present invention.

FIG. 19A depicts a simplified cross-section view of one embodiment of a pillow ground 1901 comprising a relatively thick layer of elastic or springy material e.g. cotton, polyester or other fibrous wool, or polyurethane or other spongy foam. Reference numeral 1904 denotes a simplified depiction of a cross-section of yarn e.g. in a stitch that is being infiltrated. Also shown in FIG. 19A is a depiction of an active receiver latch hook 1903. Reference numeral 1902 denotes the temporary local deformation of the pillow ground 1901, which facilitates the movement of the hook 1903 under the yarn 1904.

FIG. 19B depicts a simplified cross-section view of another embodiment of a pillow ground 1905 comprising a relatively thin layer or film of elastic material e.g. woven or knitted fabric, or PVC or other plastic sheet. Reference numeral 1906 denotes the temporary local deformation of the pillow ground 1905 when pressure is applied by an external body 1903.

Figure 19C:
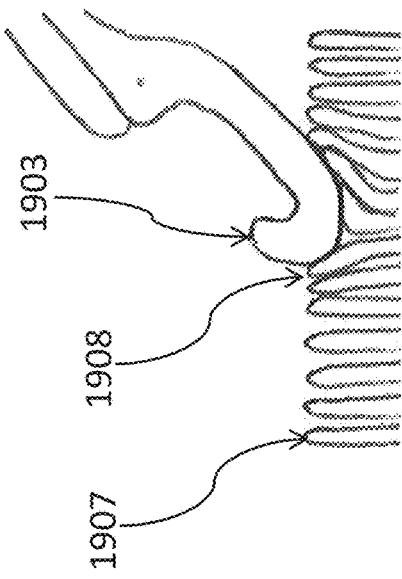
FIG. 19C depicts a pillow ground, in accordance with an embodiment of the present invention.

FIG. 19C depicts a simplified cross-section view of yet another embodiment of a pillow ground 1907 comprising a bed of columnar protrusions or lateral ribs of elastic or springy material e.g. rubber, silicone or polyurethane foam. Reference numeral 1908 denotes the temporary local deformation of the pillow ground 1907 when pressure is applied by an external body 1903.

Work Anchoring Architectures

Work Anchoring 1021 is the function of physically constraining one or more stitches or parts of a work in-progress, relative to other components of a SAM system. For example, the work in-progress may be affixed to the pillow ground such that the work in-progress is not displaced while a loop is being infiltrated by the passive receiver, or otherwise handled, and the work in-progress may be released when it is to be moved or when the product of manufacture is complete.

Figure 20A:
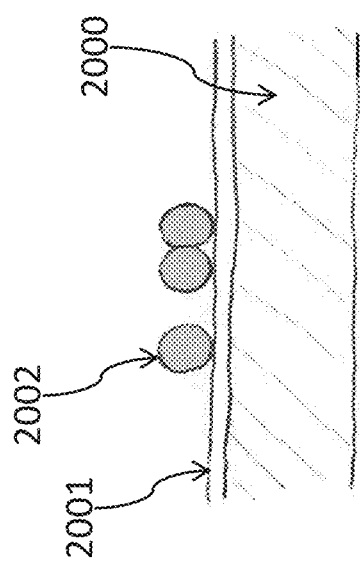
FIG. 20A depicts a work anchoring apparatus, in accordance with an embodiment of the present invention.

FIG. 20A depicts a simplified cross-section view of one embodiment of a work anchoring apparatus comprising an adhering layer, showing ground platform 2000. A layer of material 2001 temporarily adheres to a yarn-like material 2002 (depicted as a simplified cross-section) when brought into contact together, and then separated by a pulling force stronger that the adhering force between the layer and the yarn-like material. The adhering material 2001 may be e.g. a layer of micro-hooks (similar to a hook and loop fastener) or a sticky tape-like surface.

Figure 20B:
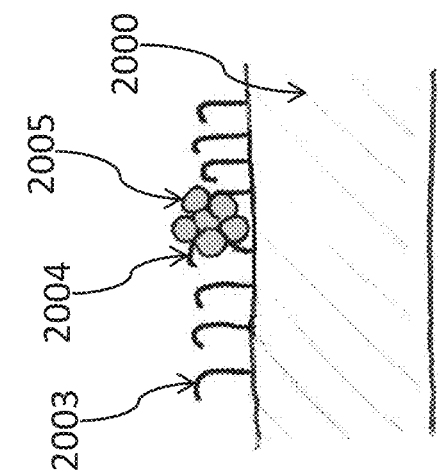
FIG. 20B depicts a work anchoring apparatus, in accordance with an embodiment of the present invention.
Figure 20C:
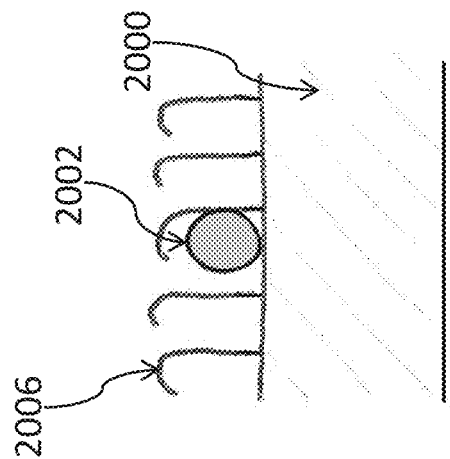
FIG. 20C depicts a work anchoring apparatus, in accordance with an embodiment of the present invention.

FIG. 20B depicts a simplified cross-section view of another embodiment of a work anchoring apparatus comprising elastic macro-hooks. Reference numeral 2003 denotes an example of an elastic macro-hook made of e.g. nylon or other plastic, or steel or other metal wire. Reference numeral 2004 denotes how the macro-hook may catch within the plies 2005 of a yarn-like material (depicted as a simplified cross-section of a six-ply yarn) to hold it in place. The yarn-like material may be released from the elastic hooks by pulling the yarn-like material with a force greater than the adhesive force between the array of hooks and the attached yarn(s). FIG. 20C depicts a simplified cross-section view of another embodiment of a work anchoring apparatus comprising elastic macro-hooks 2006 of hook size approximately that of the yarn 2002 cross-section.

FIG. 21A depicts a simplified cross-section view of yet another embodiment of a work anchoring apparatus comprising pin-like components, including a ground platform 2100 of e.g. cotton or other fibrous wool, or polyurethane or other spongy foam material, that can be repeatedly punctured without functional damage, and that can firmly hold the embedded pins. A pinhead 2101 compresses and holds in place the yarn-like material 2103 (depicted as a simplified cross section of a six-ply yarn) onto the ground platform 2100. The pinhead 2101 is attached to the needle structure 2102 that is embedded in the ground platform 2100. The pin-like component may be removed by pulling the pinhead with a force greater than the holding or frictional force between the needle and the embedding material. FIG. 21B depicts a simplified cross-section view of another embodiment of a work anchoring apparatus comprising pin-like components, where the yarn-like material 2104 is not punctured by the needle 2102, but is compressed and held in place by the pinhead 2101.

FIG. 21C depicts one example embodiment of a pin structure comprising a needle 2102 attached to a winged pinhead 2101 for added surface contact with the yarn(s) being compressed and held in place. The pinhead 2101 is optionally also grooved or recessed on the bottom side to facilitate trapping of the yarn(s) being compressed and held in place. FIG. 21D depicts another example embodiment of a pin structure comprising a needle 2102 attached to a winged pinhead 2101 that is asymmetric or one-sided.

FIG. 21E depicts another example embodiment of a pin structure comprising a pinhead 2101 attached to a needle with a kink 2102 that can facilitate trapping of the yarn(s) being compressed and held in place. FIG. 21F depicts another example embodiment of a pin structure comprising a pinhead 2101 attached to a two- or multi-pronged needle 2102 where the gap between prongs can facilitate trapping of the yarn(s) being compressed and held in place.

A pin-like component for work anchoring can also comprise a "pinhead" without a physical needle, where the temporary attachment between the pinhead and the ground platform is accomplished by other attractive means e.g. magnetic attraction between a magnetized (or ferroelectric) pinhead and a ferromagnetic (or magnetized) ground platform, a sticky tape-like surface or hook-and-loop type complementary surfaces.

FIG. 22A depicts a simplified diagram of another embodiment of a work anchoring apparatus comprising an array of small elastic "pincers". Reference numeral 2201 denotes an example of a small (with height on the order of a few yarn-like material cross-sections) elastic post (made of e.g. rubber, silicone, polyurethane or other elastic material) that is curved towards the horizontal close to its tip. Reference numeral 2202 denotes an example of a complementary elastic post that is mirror-imaged relative to the previous post 2201 such that the curved tips of both posts almost touch or are closer together than the cross-section of the yarn-like material. The posts 2201 and 2202 together form a "pincer" like structure. An array of these pincer-like structures are attached to a ground platform 2203. Reference numeral 2204 denotes how yarn-like material can be drawn through and held in the arc of the pincer-like structures. The work in-progress, or completed product may be released by pulling the yarn-like material with a force greater than the holding or elastic hook force between the array of pincers and the attached yarn(s).

FIG. 22B is a simplified diagram of another embodiment of a work anchoring apparatus comprising a wire grid. Reference numeral 2205 denotes an example of posts over which a wire-like component 2206 e.g. cotton, nylon, copper or other thin and flexible thread, is wound to construct a grid-like structure. Reference numeral 2207 denotes how yarn may be intertwined with the grid-like structure to form loops of a work in-progress. The work in-progress, or completed product may be released by unwinding the wire-like component 2206 from the posts 2205. Another set of wire-like components may be wound to form another grid orthogonal to the grid depicted in FIG. 22B, with this orthogonal grid placed above or below the grid depicted in FIG. 22B. The two orthogonal grids may together form a mesh.

FIG. 22C is a simplified diagram of another embodiment of a work anchoring apparatus comprising a mesh. An array of small elastic rods 2208 are aligned along a first axis, with the rods 2208 having a cross-section on the order of one yarn-like material cross-section or smaller, and being made of nylon, silicone, PTFE, steel wire or other elastic material. A second array of small elastic rods 2209 are aligned along a second orthogonal axis. The two arrays of orthogonal rods form a mesh-like structure within which yarn may be intertwined to form loops of a work in-progress. A holding bar 2210 may be removed to allow the elastic rods 2209 to bend. More holding bars 2210 may be employed on the orthogonal array of rods 2208 and 2209. With the holding bar(s) removed, the work in-progress or completed product may be released by pulling the yarn-like material with a force greater than the holding or elastic force between the mesh and the attached yarn(s).

Work Manipulation Architectures

During stitch formation and other processes described above, the work in-progress may be manipulated. The Work Manipulation function 1020 can be implemented by various embodiments of apparatuses and methods.

FIG. 23A depicts a simplified cross-section view of one embodiment of a work manipulation apparatus using a blunt end effector, including a ground platform 2300. Reference numeral 2301 denotes a simplified cross-section view of interlinked stitches comprising a work in-progress. Reference numeral 2302 denotes a blunt end effector with a columnar structure, here called a blunt 'Tusk'. The tusk may perform Work Manipulation 1020 by holding the work in-progress 2301 against the ground platform 2300. The tusk 2302 may also perform Work Manipulation 1020 by moving in any direction in any combination of the X, Y and/or Z axes, resulting in the movement (by e.g. pushing, pulling or dragging) of the work in-progress 2301 in a like direction. FIG. 23B depicts how Work Manipulation 1020 may also be performed by folding or warping the work in-progress 2301 via movement of the tusk 2302 against the work in-progress. The tusk 2302 may also be tilted, panned or rotated around any axis to accomplish the desired work manipulation.

FIG. 23C depicts an embodiment of a blunt tusk with a rounded or knobbed tip 2303. FIG. 23D depicts an embodiment of a blunt tusk with a broadened tip 2304. FIG. 23E depicts an embodiment of a blunt tusk with a grooved or textured tip 2303. The tip of the tusk may also be composed of rubbery material e.g. rubber or silicone, that has a higher coefficient of friction with the yarn-like material to facilitate work manipulation.

FIG. 24A depicts a simplified cross-section view of another embodiment of a work manipulation apparatus using a tapered end effector, including a ground platform 2300. Reference numeral 2301 depicts a simplified the cross-section view of interlinked stitches comprising a work in-progress. Reference numeral 2401 depicts a tapered end effector with a columnar structure, here called a tapered 'Tusk'. The tapered tusk tip 2401 can be introduced (partially or completely traversing) in between the loops of the stitches of the work in-progress 2301. Movement of the tapered tusk 2401 in contact with the work in-progress 2301 results in movement, warping, folding or other manipulation of the work.

FIG. 24B depicts an embodiment of a tapered tusk with a sharpened tip 2402. FIG. 24C depicts an embodiment of a tapered tusk with a blunter or smoother tip 2403. FIG. 24D depicts an embodiment of a tapered tusk with a knobbed tip 2404. The tip of the tusk may also be composed of rubbery material e.g. rubber or silicone, that has a higher coefficient of friction with the yarn-like material to facilitate work manipulation.

Figure 25C:
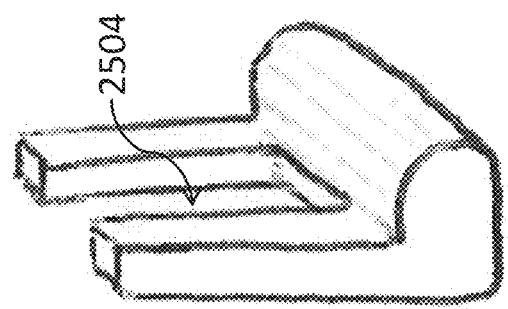
FIG. 25C depicts a ledge tusk, in accordance with an embodiment of the present invention.
Figure 25B:
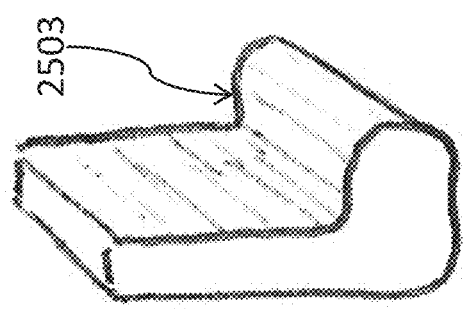
FIG. 25B depicts a ledge tusk, in accordance with an embodiment of the present invention.
Figure 25A:
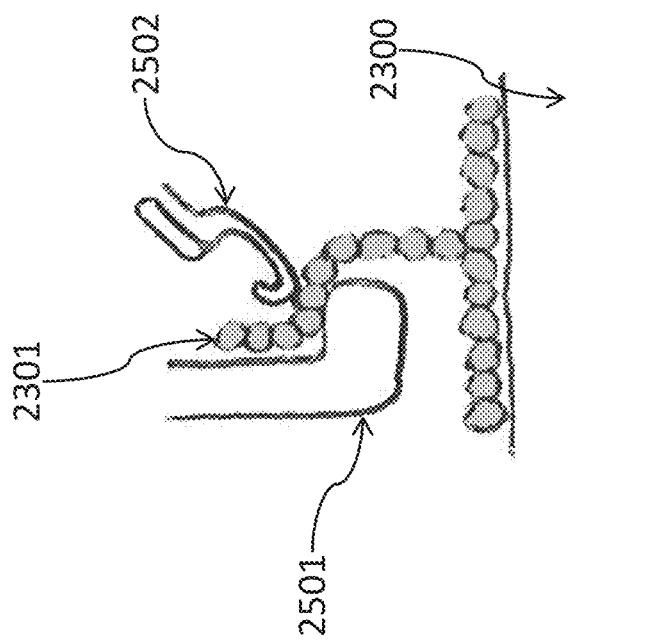
FIG. 25A depicts a cross-sectional view of an embodiment of a work manipulation apparatus using an end effector with a ledge.

FIG. 25A depicts a simplified cross-section view of another embodiment of a work manipulation apparatus using an end effector with a ledge, including a ground platform 2300. Reference numeral 2301 denotes a simplified the cross-sectional view of interlinked stitches comprising a work in-progress. End effector 2501 includes an angled or kinked tip forming a ledge-like structure, here called a ledge 'Tusk'. Reference numeral 2502 denotes an example of another end effector e.g. an active receiver that may be used to push the work in-progress against the ledge of the work manipulator 2501. The ledge 2501 allows the holding of a portion (or the whole) of the work in-progress 2301 at a height above the ground platform 2300 or above other portions of the work in-progress, to facilitate stitch formation for manufacturing an arbitrary 3D structure.

FIG. 25B depicts one embodiment of a ledge tusk with a broad ledge 2503. FIG. 25C depicts another embodiment of a ledge tusk with a gap 2504 in the vertical column of the tusk, allowing movement of another end effector or parts of the work in-progress through the gap 2504.

Figure 26B:
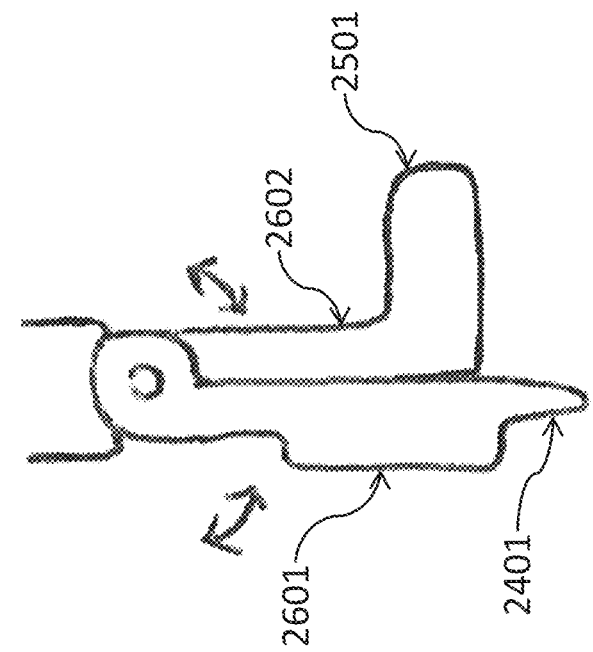
FIG. 26B depicts a combination embodiment of a work manipulation apparatus.
Figure 26A:
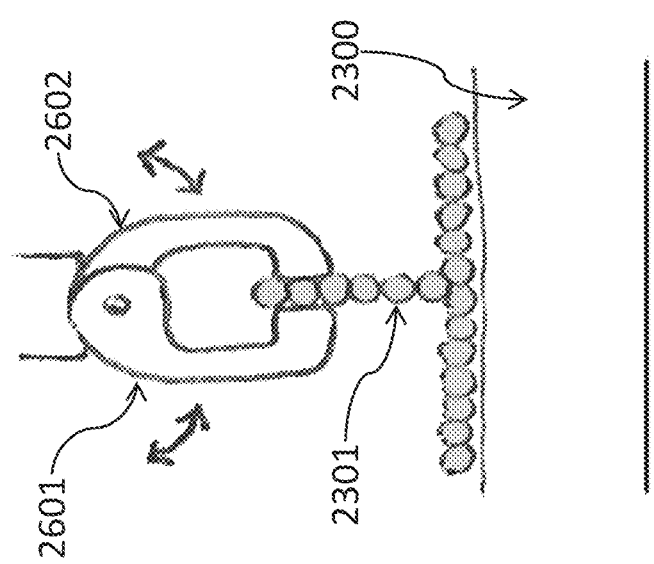
FIG. 26A depicts a work manipulation apparatus with a gripper.

FIG. 26A depicts a simplified cross-section view of another embodiment of a work manipulation apparatus using a gripper, including a ground platform 2300. Reference numeral 2301 denotes a simplified cross-sectional view of interlinked stitches comprising a work in-progress. Reference numeral 2601 denotes one 'claw' of the 'gripper' that may be moved into an open or closed position. Reference numeral 2602 denotes a complementary 'claw' that may be moved into an open or closed position. The reference numerals 2601 and 2602 constitute the gripper, and may both be mobile or only one claw may open and close. The claws of the gripper may pinch onto a portion of the work in-progress 2301 to move, warp, fold or otherwise manipulate the work. The gripper may also be used to retain and reposition a work anchoring component such as a pin-like component exemplified in FIG. 21A.

The different embodiments of work manipulation apparatuses here presented may be combined in different permutations. FIG. 26B depicts an example of a combinatorial embodiment of a work manipulation apparatus, having a gripper structure with two motile claws 2601 and 2602, also having a ledge structure 2501 attached to the right claw 2602, and also having a tapered tusk structure 2401 attached to the left claw 2601.

Component Kinematics Architectures

The apparatuses and methods of the system involve motion and positioning of the components of the system relative to each other. For example, during stitch formation an active receiver may be moved through a target stitch of a work-in-progress, to capture a passive feeder that has also been moved close to the work. The dynamic positioning and orienting of components of the system relative to each other is defined as the Component Kinematics function 1013. The degrees of freedom, range of motion and other allowable spatial interactions between components is defined by the mechanical design of the system, which can be described by a kinematic architecture.

Figure 27:
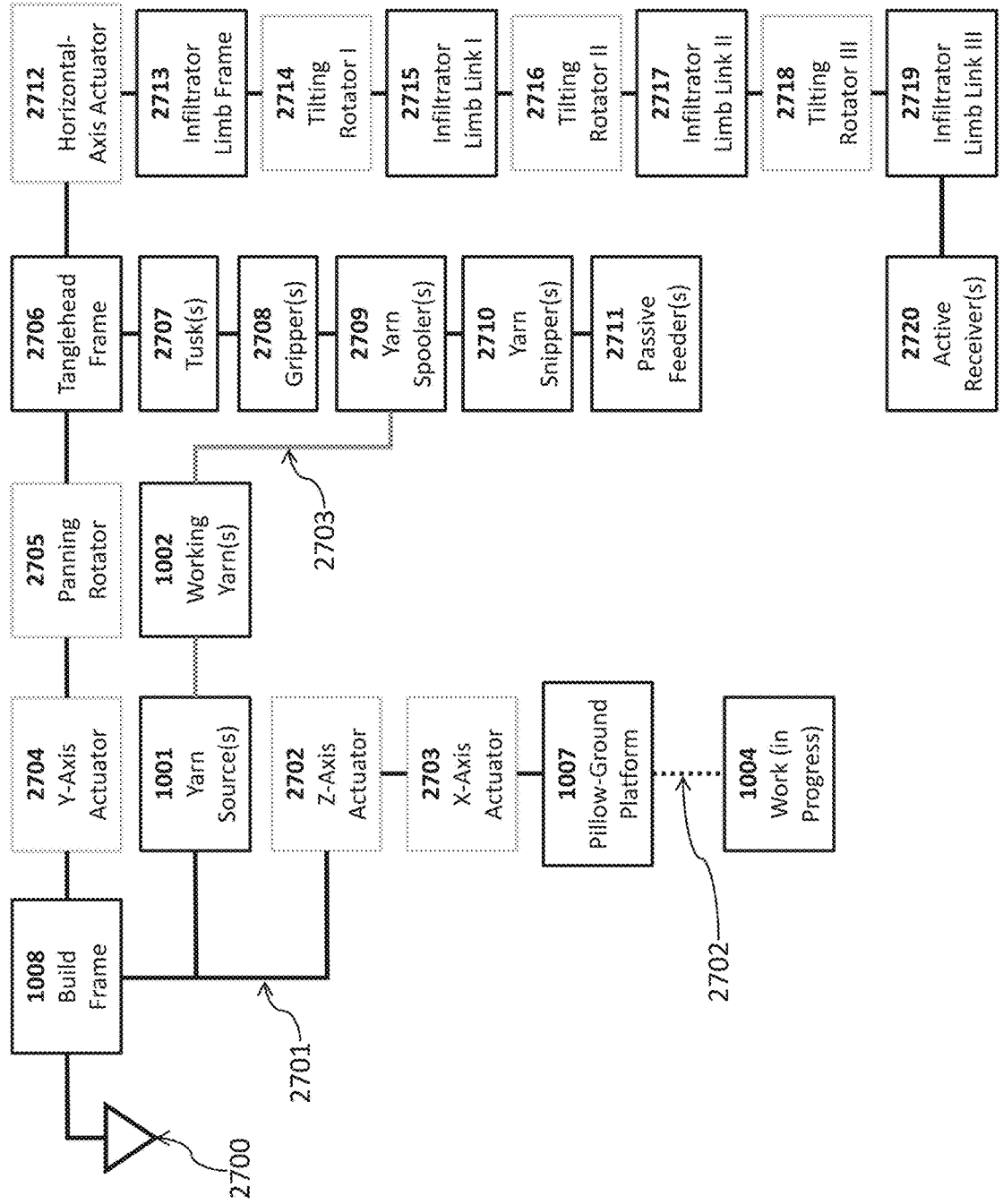
FIG. 27 is a diagram of the kinematic topology of one embodiment of a SAM kinematic architecture.

FIG. 27 depicts the kinematic topology of one embodiment of a kinematic architecture as used in the system described in the sections above. Reference numeral 2700 denotes the ground reference or the inertial frame of reference. Reference numeral 2701 denotes a rigid link-components connected by a rigid link have a rigid body relationship to each other. Reference numeral 2702 denotes a conditionally rigid or contact link, e.g. the work in-progress 1004 may be resting on top of the pillow ground platform 1007 and may move with the platform, or may not move with the platform if the work 1004 is held in place by another manipulator. Reference numeral 2703 denotes a yarn attachment, depicting the yarn source(s) 1001 issuing working yarn(s) 1002 that is dispensed or retracted by the yarn spooler(s) 2709.

The kinematic topology in FIG. 27 can be understood by analyzing the links between actuators, joints and components which can form chains and sub-chains. The degrees of freedom, range of motion and other allowable spatial interactions between any two components can be identified by traversing the series of links connecting the two reference components.

For example, in FIG. 27, in one chain, the Inertial Reference 2700 is rigidly linked to the Build Frame 1008, which is then rigidly linked to a z-axis Actuator 2702 (which moves any attached downlink components along a first vertical axis) which is in turn rigidly linked to an x-axis Actuator 2703 (which moves any attached downlink components along a second horizontal axis). The x-axis actuator 2703 is then rigidly linked to the Pillow Ground Platform 1007. Comparing the two components 'inertial reference 2700' and 'pillow ground platform 1007', it is identified that the ground platform 1007 has two degrees of freedom relative to the reference frame 2700, and can relatively move in the X- and Z-directions.

As depicted in FIG. 27, in another chain, the inertial reference 2700 is rigidly linked the Build Frame 1008, which is then rigidly linked to a y-Axis Actuator 2704 (which moves any attached downlink components along a third orthogonal horizontal axis), which is in turn rigidly linked to a Panning Rotator 2705 (which rotates any attached downlink components about the first vertical axis). The panning rotator 2705 is then rigidly linked to a Tanglehead Frame 2706. As defined, the Tanglehead Frame 2706 has two degrees of freedom relative to the inertial reference 2700, and can relatively move in the y-direction and rotate about the z-axis. The Tanglehead Frame 2706 then branches into two separate kinematic chains—the components on these kinematic chains may have additional degrees of freedom and motion dimensions, compounded with the kinematics of the Tanglehead Frame 2706.

Also depicted in FIG. 27, in one kinematic chain branching from the Tanglehead Frame 2706, the Tanglehead Frame 2706 is rigidly linked to one or more Tusk(s) 2707, which is then rigidly linked to one or more Gripper(s) 2708. The one or more gripper(s) 2708 is then rigidly linked to one or more Yarn Spooler(s) 2709, which is in turn rigidly linked to one or more Yarn Snipper(s) 2710, with the yarn snipper(s) 2710 being rigidly linked to one or more Passive Feeder(s) 2711. All of the components on the kinematic chain are rigidly linked, and thus all these components share the kinematics of the Tanglehead Frame 2706 and move as one rigid body. These components may have sub-components that move independently, for example, the grippers may have motile claws that open and close, the snippers may have blades or cutting edges that open and close to cut or terminate a section of yarn, and the spoolers may have gears that rotate.

Still referring to FIG. 27, in another kinematic chain branching from the Tanglehead Frame 2706, the Tanglehead Frame 2706 is rigidly linked to a Horizontal-Axis Actuator 2712 (which moves any attached downlink components along a varying horizontal axis). Since this Horizontal-Axis Actuator 2712 is downlinked from the Tanglehead Frame 2706, the orientation of this linear actuator will vary with the changing orientation of the Tanglehead Frame 2706. The horizontal-axis actuator 2712 is then rigidly linked to an Infiltrator Limb Frame 2713, which is in turn rigidly linked to a Tilting Rotator I 2714 (which rotates any attached downlink components about a varying horizontal axis). Tilting Rotator I 2714 is then rigidly linked to an Infiltrator Limb Link I 2715, which is then rigidly linked to another Tilting Rotator II 2716 (which rotates any attached downlink components about another varying horizontal axis). Similarly, Tilting rotator II 2716 is then rigidly linked to another Infiltrator Limb Link II 2717, which is then rigidly linked to another Tilting Rotator III 2718 (which rotates any attached downlink components about another varying horizontal axis). Tilting rotator III 2718 is then rigidly linked to another Infiltrator Limb Link III 2719, which is then rigidly linked to one or more Active Receiver(s) 2720. Some axes are described as 'varying' because the reference actuator is being dynamically repositioned by other uplinked actuators.

Tracing the previously described kinematic links, there are eight degrees of freedom between the Active Receiver(s) 2720 and the Work In-Progress 1004, and four degrees of freedom between the Active Receiver(s) 2720 and the Passive Feeder(s) 2711, in the embodiment of a kinematic architecture depicted in FIG. 27.

Figure 28:
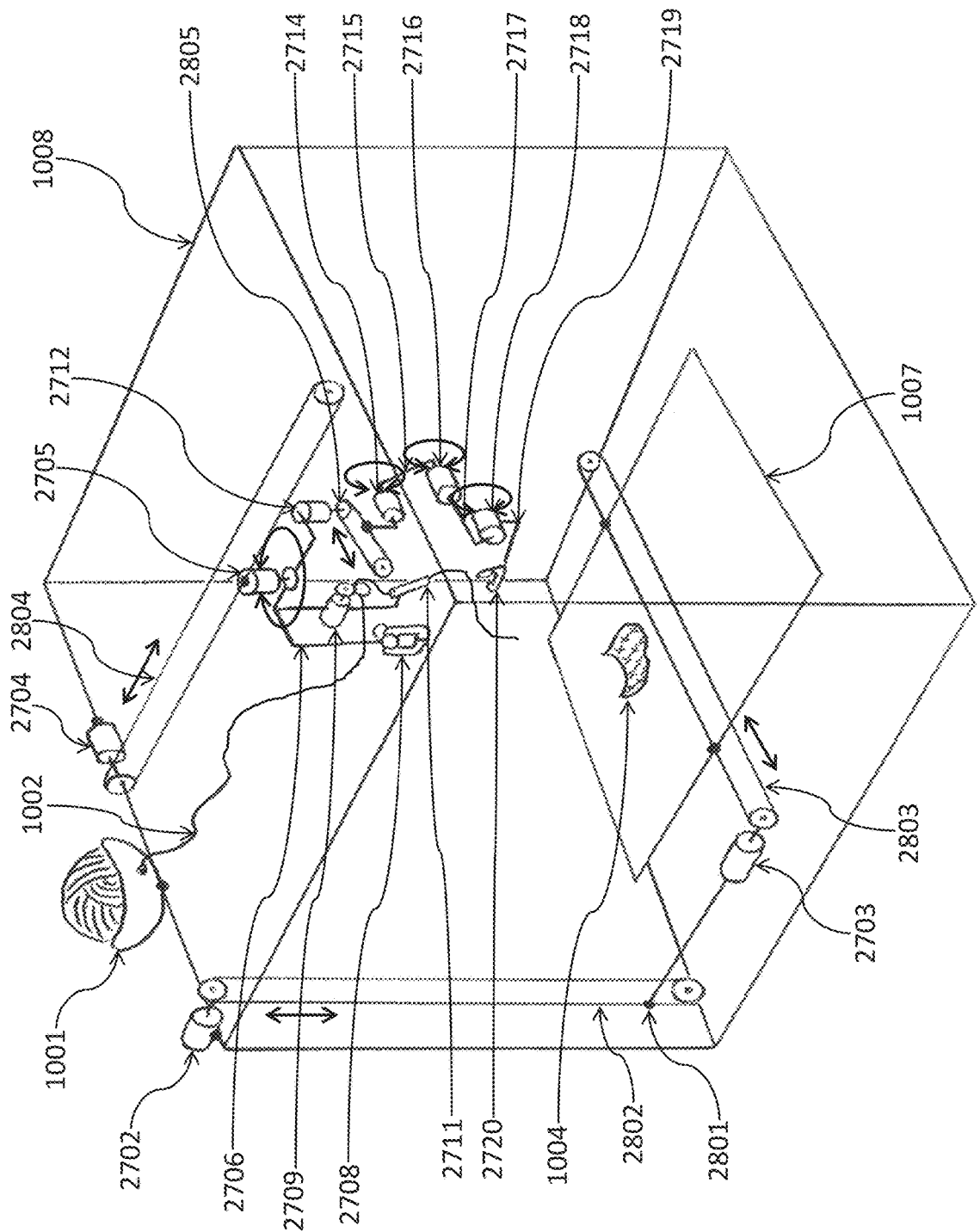
FIG. 28 is a simple schematic of a SAM kinematic architecture corresponding to the kinematic topology depicted in FIG. 27.

FIG. 28 is a simple schematic of a kinematic architecture corresponding to the kinematic topology depicted in FIG. 27. Reference numeral 1008 depicts an example Build Frame as a cuboid structure that is stationary relative to the inertial frame of reference. On this Build Frame 1008 a number of exemplary actuating components are disposed, with the function of translating and/or orienting parts of the apparatus in 3D space during manufacturing operations. (A number of non-limiting, exemplary linear actuating systems are depicted, each comprising an actuator and a pulley belt system: the actuator moves a belt along the pulley system—any component attached to the belt will linearly translate as the belt is moved by the actuator. An example of a belt may be a loop of material held sufficiently taut between two roller ends, such that rotating or driving a first roller end causes the entire belt to move along the pulley system, and the second roller end to also rotate as a result. The loop of material comprising the belt may be very narrow—much narrower than the overall apparatus, or very wide—as wide as or wider than the overall apparatus. The belt loop material may be rubber, nylon, Teflon, fabric, a chain link, or any other sufficiently flexible material.) As depicted in FIG. 28, Z-Axis Actuator 2702 is fixed to the Build Frame 1008 and drives the vertically translating pulley belt 2802. A dot symbol 2801 denotes a rigid attachment between two components. Here an X-Axis Actuator 2703 is rigidly attached to the vertically moving pulley belt 2802 as denoted by the dot symbol 2801, and thus the x-axis actuator 2703 will move vertically as the vertical pulley belt 2802 is driven. Also depicted in FIG. 28, the X-Axis Actuator 2703 drives the horizontally moving pulley belt 2803. The Pillow Ground Platform 1007 is attached to the horizontally moving pulley belt 2803, such that the platform 1007 will move horizontally as the horizontal pulley belt 2803 is driven. A Work In-Progress 1004 rests on top of the Pillow Ground Platform 1007.

As depicted in FIG. 28, the Build Frame 1008 is rigidly linked to a Y-Axis Actuator 2704 which drives a horizontally moving pulley belt 2804. Attached to the horizontally moving pulley belt 2804 is a Panning Rotator 2705 that rotates a Tanglehead Frame 2706 (depicted as a wireframe) about a vertical axis. Attached to the rotating Tanglehead Frame 2706 is an example of a Gripper 2708. Also attached to the rotating Tanglehead Frame 2706 is an example of a Spooler 2709 and a Passive Feeder 2711.

Also attached to the rotating Tanglehead Frame 2706 is a Horizontal-Axis Actuator 2712, which drives a horizontally moving pulley belt 2805 that changes position and orientation together with the Tanglehead Frame 2706 to which it is mounted. Attached to the horizontally moving pulley belt 2805 is a Tilting Rotator I 2714. Attached to the Tilting Rotator I 2714 is an Infiltrator Limb Link I 2715, which is then attached to another Tilting Rotator II 2716. Tilting rotator II 2716 is then attached to another Infiltrator Limb Link II 2717, which is then attached to another Tilting Rotator III 2718. Tilting rotator III 2718 is then attached to another Infiltrator Limb Link III 2719, which is then attached to an example of an Active Receiver 2720.

Also depicted in FIG. 28, an example of a Yarn Source 1001 is rigidly attached to the Build Frame 1008. Issuing from the Yarn Source 1001 is a length of Working Yarn 1002, which is then connected to the Spooler 2709, which further dispenses the working yarn to the Passive Feeder 2711.

The pulley systems depicted in FIG. 28 comprise one embodiment of a linear actuator system. Other embodiments include e.g. linear screws, hydraulic actuators, electroactive polymers, piezoelectric actuators, delta actuator mechanisms, cable or parallel actuators, telescoping systems or other mechanisms. The driving actuators and rotators in various embodiments may also be, for example, servo motors, stepper motors, DC motors, AC motors or other mechanical drivers.

FIGS. 27 and 28 introduce one embodiment of a kinematic architecture that can be utilized in the system described in the sections above. Numerous variations of a kinematic architecture can be defined by permuting the placement and sequence of actuators and components, while achieving the same or some other desired configuration of degrees of freedom and dimensions of movement, as can be analyzed using the kinematic topology diagram introduced. For example, the Pillow Ground Platform 1007 can be rigidly linked to the Build Frame 1008, and the Z-Axis Actuator 2702 and the X-Axis Actuator 2703 can be moved onto the kinematic chain that includes the Y-Axis Actuator 2704 and the Panning Actuator 2705. Such a variation will still possess eight degrees of freedom between the Active Receiver(s) 2720 and the Work In-Progress 1004, and four degrees of freedom between the Active Receiver(s) 2720 and the Passive Feeder(s) 2711.

Apparatus Improvements via Mechanical and Linkage Design

The systems described above represent improvements in the efficiency, speed, and accuracy of 3D printed structures from yarn-like materials, regardless of whether the 3D structure is created by hand, by machine via manual inputs, or by machine via automated inputs. Moreover, the systems described above provide alternative input materials that improve over the resource-consuming and limited selection of materials typically used in additive manufacturing systems. However, the apparatuses of a system for efficient Stitch Additive Manufacturing (SAM) may be further improved. For example, the degrees of freedom of a kinematic chain may be reduced while preserving an effective tool path, maintaining the functionality of a physical architecture while reducing the number of actuators needed, potentially resulting in lower cost, lower power consumption, lower weight and other efficiencies. Furthermore, mechanisms can be designed where a single or smaller number of continuous or semi-continuous rotating inputs produce an effective tool path, enabling a single or smaller number of drive inputs e.g. motors with fast continuous rotation to increase the throughput of a SAM system. A few mechanical and linkage design improvements are introduced in this disclosure.

General Tool Path

Figure 29A:
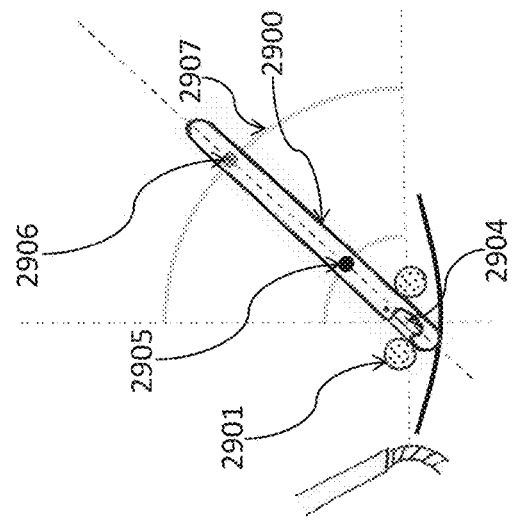
FIG. 29A is a cross-sectional view of a component of the SAM apparatus in a stage of motion.

FIG. 29A depicts a simplified cross-section view of part of a general SAM apparatus. Reference numeral 2900 denotes an example of a SAM tool, e.g. an active receiver, an active feeder or a work manipulation apparatus. Reference numeral 2901 denotes a simplified cross-section of a target stitch (depicting a left and a right loop as two circles) of yarn-like material comprising an example work in-progress. The work-in-progress rests on a pillow ground platform 2902. A length of working yarn 2903 issues from a feeder. Reference numeral 2904 denotes an abstract point in space at the center of the target stitch. Reference numeral 2905 denotes a defined point "Point A" attached to the rigid body of the SAM tool 2900. Reference numeral 2906 denotes another defined point "Point B" attached to the rigid body of the SAM tool 2900.

Figure 29B:
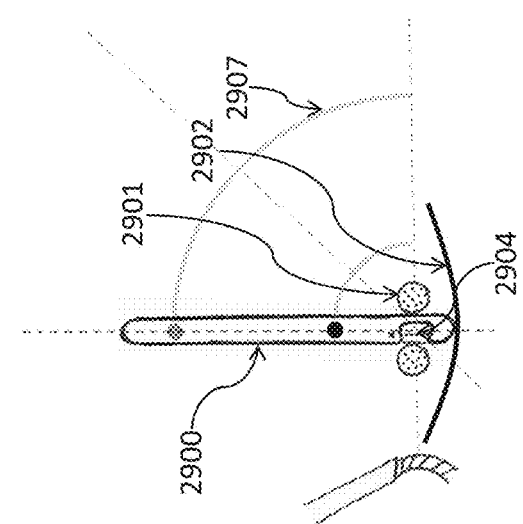
FIG. 29B is a cross-sectional view of a component of the SAM apparatus in a stage of motion.

FIG. 29B depicts a first subsequent motion of the general SAM apparatus. The SAM tool 2900 performs loop infiltration by moving vertically, into and between the loops of the target stitch 2901. The SAM tool 2900 may also compress into the pillow ground platform 2902. Notice that the two points (Point A 2905 and Point B 2906) attached to the rigid body of the SAM tool lie on a straight line passing through the center point 2904 of the target stitch.

Figure 29C:
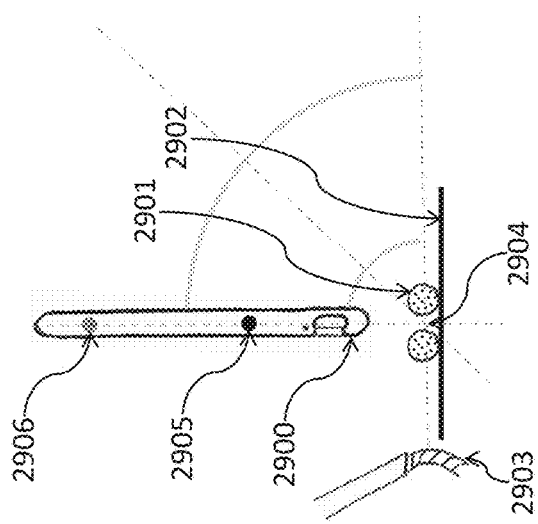
FIG. 29C is a cross-sectional view of a component of the SAM apparatus in a stage of motion.

FIG. 29C depicts a second subsequent motion of the general SAM apparatus. The SAM tool 2900 is rotated about the center point 2904 of the target stitch, potentially further displacing the loops of the target stitch 2901 and the pillow ground platform 2902. Notice that the two points (Point A 2905 and Point B 2906) attached to the rigid body of the SAM tool lie on another straight line passing through the center point 2904 of the target stitch.

Figure 29D:
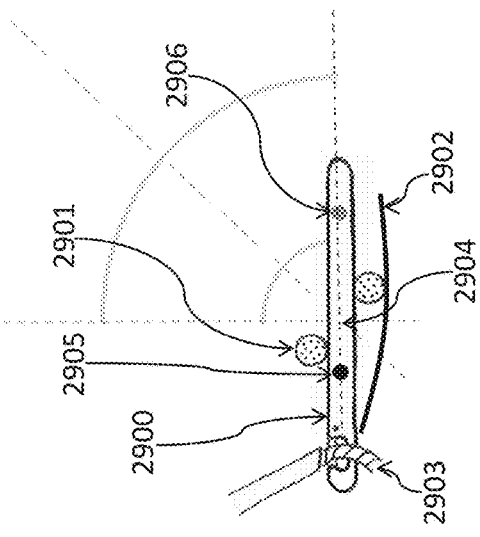
FIG. 29D is a cross-sectional view of a component of the SAM apparatus in a stage of motion.

FIG. 29D depicts a third subsequent motion of the general SAM apparatus. The SAM tool 2900 is further rotated about the center point 2904 of the target stitch, potentially further displacing the loops of the target stitch 2901 and the pillow ground platform 2902. Notice that the two points (Point A 2905 and Point B 2906) attached to the rigid body of the SAM tool lie on yet another straight line passing through the center point 2904 of the target stitch.

Figure 29E:
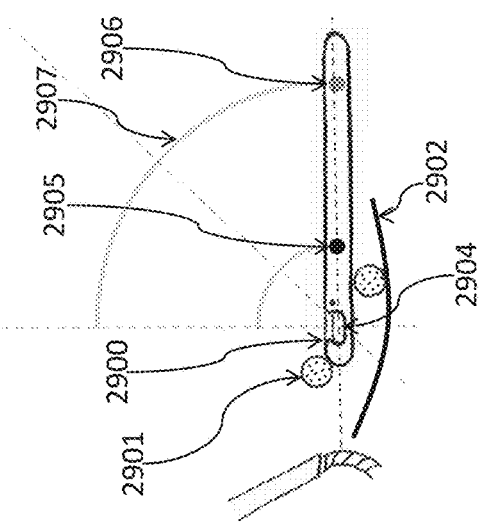
FIG. 29E is a cross-sectional view of a component of the SAM apparatus in a stage of motion.

FIG. 29E depicts a fourth subsequent motion of the general SAM apparatus. The SAM tool 2900 is pushed horizontally through the target stitch 2901 for the tool to receive the working yarn 2903 from the feeder. Notice that the two points (Point A 2905 and Point B 2906) attached to the rigid body of the SAM tool again lie on a straight line passing through the center point 2904 of the target stitch.

Following FIG. 29E, the SAM tool may generally retrace the paths depicted in FIG. 29D, FIG. 29C, FIG. 29B, and then FIG. 29A, with the working yarn 2903 held in the SAM tool 2900, performing e.g. yarn receiving, yarn pull-through and stitch formation.

Virtual Pivot Architectures

For the SAM tool 2900 to traverse the general tool path at the various defined orientations in FIGS. 29A-D, an actuating system with four degrees of freedom (DOF) is typically required: one DOF to position Point A 2905 horizontally; one DOF to position Point A 2905 vertically; one DOF to position Point B 2906 horizontally; and one DOF to position Point B 2906 vertically.

The required degrees of freedom of the actuating system can be reduced by designing a 'Virtual Pivot Mechanism' that constrains any two points (physical or abstract points) attached to the rigid body (on the body or floating rigidly-constrained points) of the SAM tool—e.g. Point A 2905 and Point B 2906—to always lie on a line passing through a center point (e.g., virtual pivot point 2904).

Figure 30B:
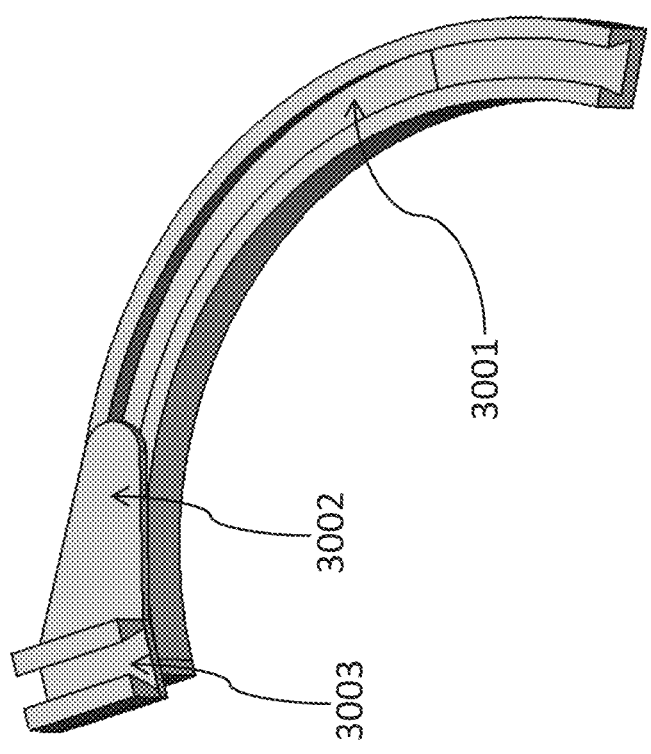
FIG. 30B depicts an embodiment of a virtual pivot mechanism, in accordance with an embodiment of the present invention.
Figure 30C:
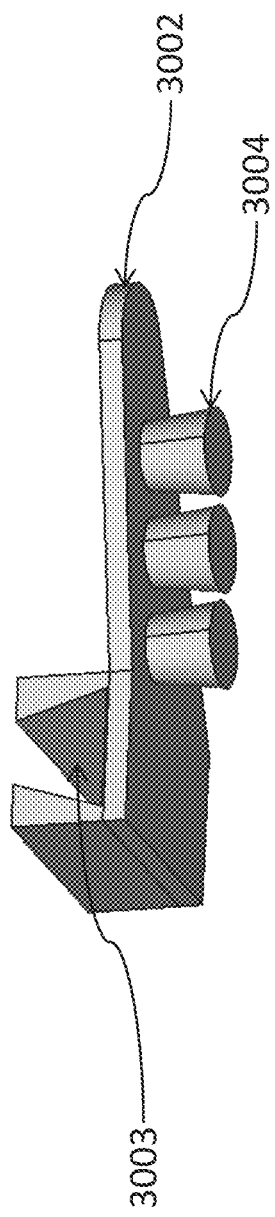
FIG. 30C depicts an embodiment of a virtual pivot mechanism, in accordance with an embodiment of the present invention.
Figure 30A:
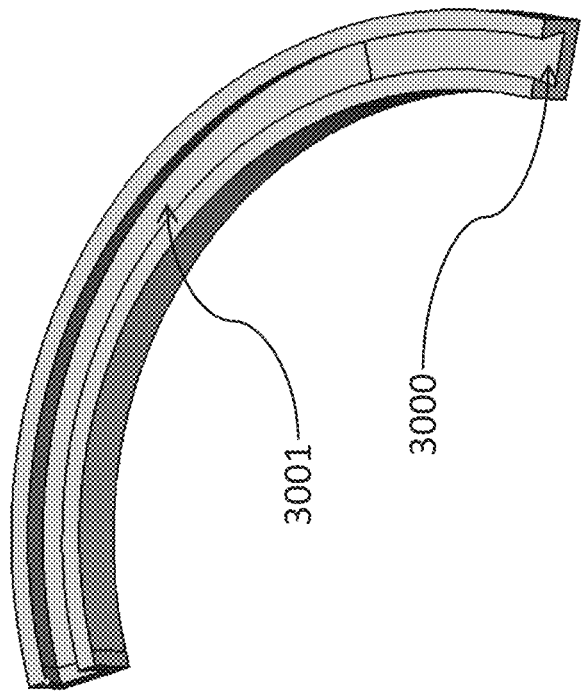
FIG. 30A depicts an embodiment of a virtual pivot mechanism, in accordance with an embodiment of the present invention.

FIG. 30A depicts one example embodiment of a Virtual Pivot Mechanism having a groove structure 3000 that follows a section of a circular arc 3001. Further depicted in FIG. 30B, travelling along the circular arc 3001 is a carriage structure 3002. Attached to the carriage structure 3002 is a straight groove channel 3003, though which a SAM tool may slide while being held. This Virtual Pivot Mechanism is designed such that the straight groove channel 3003 always points along a line passing through the Virtual Pivot point (located at the center point of the circular arc of 3001) of this mechanism. FIG. 30C depicts the exemplary carriage structure 3002 in more detail, including a straight groove channel 3003. Reference numeral 3004 denotes examples of knobs attached to the carriage 3002 that travel in the circular arc groove 3001.

Figure 31A:
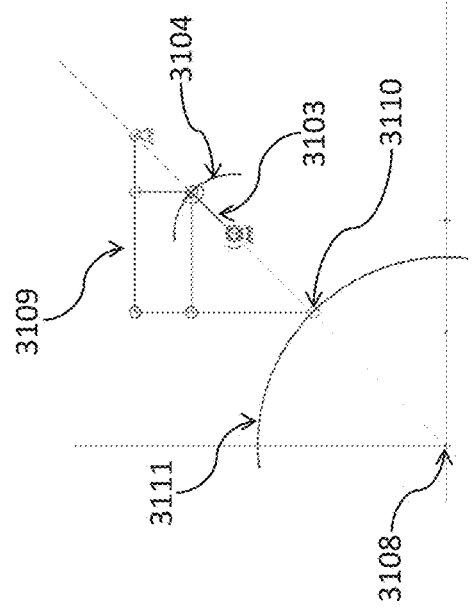
FIG. 31A depicts an alternative embodiment of a virtual pivot mechanism, in accordance with an embodiment of the present invention.

FIG. 31A is a simplified schematic of a first pantograph driven by a circular arc and producing another circular arc. Reference numeral 3100 is a symbol (a circle with triangle) that denotes a grounded or stationary joint. Reference numeral 3101 denotes a free joint connecting two or more links. Reference numeral 3102 denotes a symbol for a rigid link connecting two joints. An input limb or input rocker 3103 drives the mechanism. Reference numeral 3104 denotes a trace of the circular-arc path of the tip of the input rocker 3103. A collection of links and joints comprising a first pantograph is denoted by reference numeral 3105. The pantograph mechanism 3105 includes an output point or tip 3106. Reference numeral 3107 denotes a trace of the circular arc produced by the output point 3106 as the pantograph 3105 is driven by the input rocker 3103. The output circular arc 3107 includes a center point 3108.

Figure 31B:
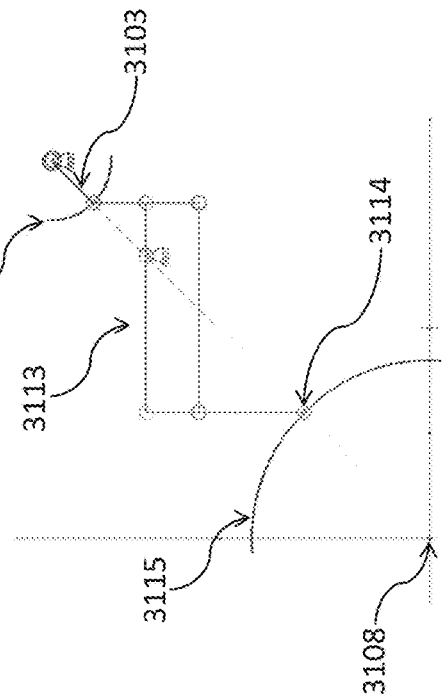
FIG. 31B depicts an alternative embodiment of a virtual pivot mechanism, in accordance with an embodiment of the present invention.

FIG. 31B is a simplified schematic of a second pantograph driven by a circular arc and producing another circular arc. The same input rocker 3103 that follows the same input circular arc 3104 drives a second pantograph 3109 with a larger magnification factor about the same center point 3108. The second pantograph mechanism 3109 includes an output point 3110. Reference numeral 3111 denotes a trace of the larger circular arc produced by the output point 3110 as the pantograph 3109 is driven by the same input rocker 3103. The larger output circular arc 3111 includes a center point 3108.

Figure 31C:
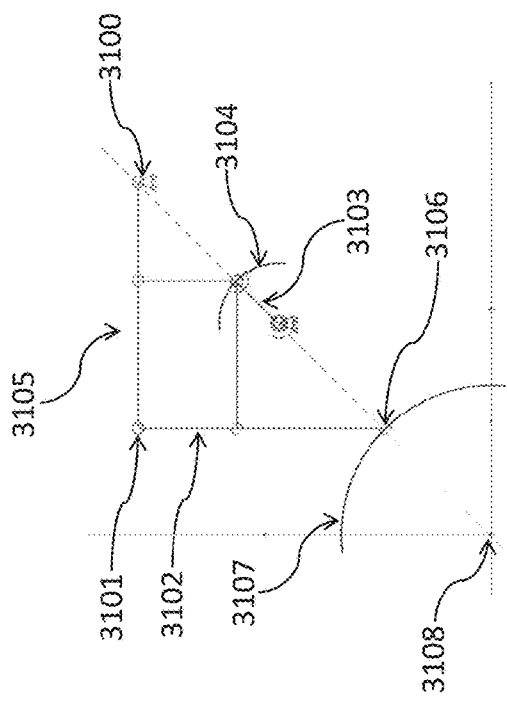
FIG. 31C depicts an alternative embodiment of a virtual pivot mechanism, in accordance with an embodiment of the present invention.

FIG. 31C is a simplified schematic of the first pantograph 3105 and second pantograph 3109 physically overlaid. Both pantographs are driven by the same input rocker 3103 that follows the input circular arc 3104. The output points 3106 and 3110 of the two pantographs move in tandem along two concentric circular arcs 3107 and 3107, such that the two points 3106 and 3110 always lie on a line passing through the center (virtual pivot point) 3108. Two physically overlaid pantographs with differing magnification factors about a common center point, driven by the same input rocker along a circular arc, here constitutes another embodiment of a virtual pivot mechanism.

Figure 31D:
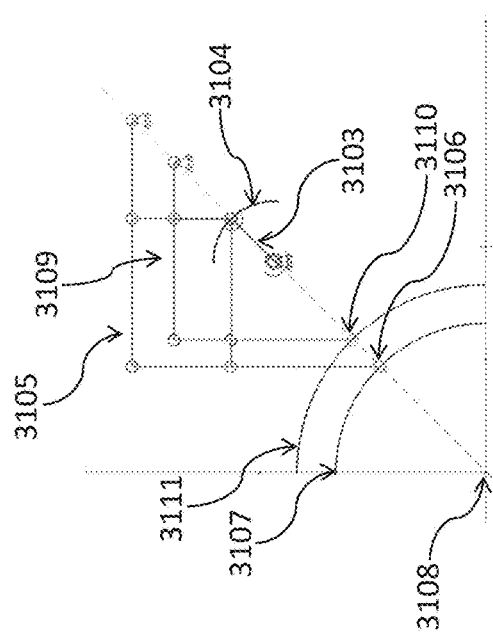
FIG. 31D depicts an alternative embodiment of a virtual pivot mechanism, in accordance with an embodiment of the present invention.

FIG. 31D is a simplified schematic of an eidograph as an alternative to a pantograph in a virtual pivot mechanism embodiment, including the input rocker 3103. Reference numeral 3112 denotes a trace of a circular-arc path of the tip of the input rocker 3103. A collection of links and joints 3113 comprise a first eidograph, which includes an output point 3114. Reference numeral 3115 denotes a trace of the circular arc produced by the output point 3114 as the eidograph 3113 is driven by the input rocker 3103. The output circular arc 3115 includes a center point 3108. In a similar manner, two physically overlaid eidographs with differing magnification factors about a common center point, driven by the same input rocker along a circular arc, constitutes yet another embodiment of a virtual pivot mechanism.

As an alternative to using two pantographs, two eidographs (or one of each mechanism) or other circular path mechanisms, only one circular path mechanism can be used to constrain one point e.g. Point B on the rigid body of a SAM tool—while other means (e.g. two linear actuators) can be used to position another point e.g. Point A on the rigid body of the SAM tool, such that Point A and Point B are controlled to always or sometimes lie on a line passing through a virtual pivot point.

Figure 32B:
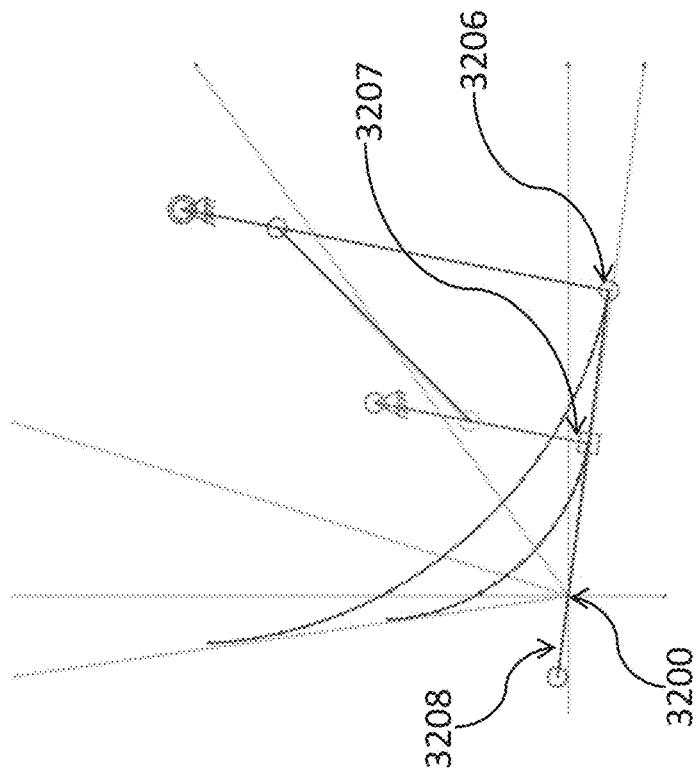
FIG. 32B depicts an alternative embodiment of a virtual pivot mechanism, in accordance with an embodiment of the present invention.
Figure 32A:
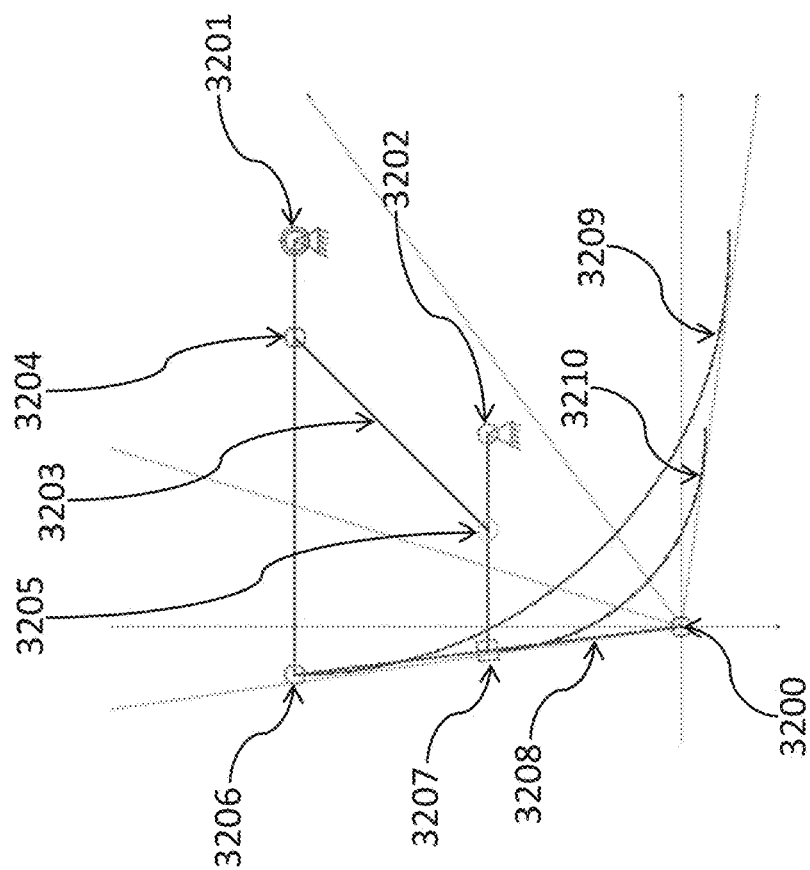
FIG. 32A depicts an alternative embodiment of a virtual pivot mechanism, in accordance with an embodiment of the present invention.

FIG. 32A is a simplified schematic of another embodiment of a virtual pivot mechanism, including a first grounded or stationary joint 3201 and a second grounded or stationary joint 3202. A rigid link 3203 includes a first end joint 3204 and a second end joint 3205 always at fixed and equal distances to the respective first and second grounded points 3201 and 3202. Reference numeral 3206 denotes an end joint on a rigid link that connects the first grounded joint 3201 and the joint 3204. Reference numeral 3207 denotes a slider end on a rigid link that connects the second grounded joint 3202 and the joint 3205. A rigid link 3208 connects to the end joint 3206 and passes through the slider end 3207. Reference numeral 3200 denotes the virtual pivot point of this virtual pivot mechanism. Reference numeral 3209 denotes a first circular arc traced by the point 3206. Reference numeral 3210 denotes a second circular arc traced by the point 3207. The two points 3206 and 3207 always lie on a line passing through the center point 3200. FIG. 32B is a simplified schematic of the same virtual pivot mechanism embodiment in another point of its motion path. The points 3206 and 3207 have swung downwards as constrained by the mechanism. Notice that the points 3206 and 3207, together with the rigid link 3208, continue to lie on a line passing through the center point 3200.

One or both of the end points 3206 and/or 3207 may be sliders. The two points 3206 and 3207 are constrained by the linkage design to lie on a line passing through the virtual pivot point. Any straight rigid object e.g. a SAM tool jointed to or sliding through the two points 3206 and 3207 will likewise be constrained to lie on a line passing through the virtual pivot point.

The Virtual Pivot Mechanisms here introduced may be active mechanisms being driven by an actuator e.g. via an input rocker, or may be passive mechanisms, where the linkage design constrains two or more points to lie on a line passing through a virtual pivot point, but does not provide an input force or has only a passive input link. Such a passive virtual pivot mechanism may be attached to another actuator or other source of motion.

Striding Architectures

Building on the discussion of general tool paths depicted in FIGS. 29A-D, FIG. 33A depicts a composite of a general path of a SAM tool 2900. Reference numeral 2905 denotes a defined point "Point A" attached to the rigid body of the SAM tool 2900. Reference numeral 3301a denotes a first travel path of the Point A of the SAM tool. Reference numeral 3302a denotes a second subsequent travel path of the Point A of the SAM tool. Reference numeral 3302b denotes a third subsequent travel path of the Point A of the SAM tool. Reference numeral 3301b denotes a fourth subsequent travel path of the Point A of the SAM tool, returning to the starting position. Reference numeral 3303 is the maximum excursion of the Point A along the closed path between reference numerals 3301a-3302a-3302b-3301b.

Notice that the general closed path 3301a-3302a-3302b-3301b is in the shape of a partial semicircle (including a partial arc and a linear chord). For the Point A of the SAM tool to traverse the general closed path in FIG. 33A, an actuating system with two degrees of freedom (DOF) is typically required: one DOF to position Point A 2905 horizontally, and one DOF to position Point A 2905 vertically.

The required degrees of freedom of the actuating system can be reduced to 1 by designing a 'Striding Mechanism' that constrains a point (physical or abstract point) attached to the rigid body (on the body or a floating rigidly-constrained point) of the SAM tool, to always lie on a path approximating a semicircle (including an arc and a linear chord).

FIG. 33B is a simplified schematic of one embodiment of a Striding Mechanism in a first position, including a first grounded joint 3304, a second grounded joint 3305, and a third grounded joint 3306. A first rigid link 3307 connects to the first grounded joint 3304. A second rigid link 3308 connects to the second grounded joint 3305. A third rigid link 3309 connects to the third grounded joint 3306. A fourth rigid link 3310 connects the first and second rigid links 3307 and 3308. A fifth rigid link 3311 connects to the third and fourth rigid links 3309 and 3310. The fifth rigid link 3311 includes an output or coupling point 3312. This collection of links and joints constitutes a single degree-of-freedom linkage. Reference numeral 3313 denotes the path of the output or coupling point 3312 along the linkage's single degree-of-freedom. The output path 3313 approximates a semicircle centered on a virtual point 3300.

FIG. 33C is a simplified schematic of the same embodiment of a Striding Mechanism in a second position. The rigid link 3307, which can also be the input link or input rocker, has swung to a second position. The output point 3312 of this single degree-of-freedom linkage has correspondingly traversed along the path 3313 approximating a semicircle.

FIG. 34A is a simplified schematic of one embodiment of a Striding Mechanism with example dimensions. These example dimensions may be uniformly scaled to result in a larger or smaller embodiment of a Striding Mechanism, including an input link or input rocker 3307. Reference numeral 3401 denotes a trace of the circular-arc path of the tip of the input rocker 3307. Reference numeral 3312 denotes the output point or coupling point on the Striding Mechanism that traces a path 3402 which approximates an ideal semicircle 3403.

Notice in FIG. 34A that there are deviations of the output point path 3402 from the ideal semicircle 3403. These deviations may be designed for various purposes. For example, the deviation denoted by 3404a indicates that the SAM tool is closer to the target point (e.g. center of a target stitch) than an ideal tool path (e.g. as depicted in FIGS. 29A-D), meaning that the SAM tool is designed to be pushed deeper into the target stitch at a starting position in its tool path. As another example, the deviation denoted by 3404b indicates that the SAM tool is closer to the target point (e.g. center of a target stitch) than an ideal tool path (e.g. as depicted in FIGS. 29A-D) when the tool is close to or at a horizontal position, meaning that the SAM tool is designed to be pushed further horizontally into the target stitch at another position in its tool path. In general, the output point path 3402 can be tweaked to deviate into the ideal semicircle 3403 resulting in a tool path with more inward positioning of the SAM tool along its path, or to deviate outside of the ideal semicircle 3403 resulting in a tool path with more outward positioning of the SAM tool along its path.

The mechanism introduced in FIGS. 33B, 33C and 34A depicts one embodiment of a striding mechanism with a single degree-of-freedom. The rigid links of a striding mechanism can be replaced by, for example, linear actuators that can dynamically change the length of the rigid links, or the ground or anchor points can be dynamically repositioned-resulting in a striding mechanism with more degrees of freedom, where the output point can trace a dynamically modified or deviated path. FIG. 34B is a simplified schematic of a striding mechanism with additional example degrees of freedom. For example, a first linear actuator 3405 is added to dynamically adjust the length of the rigid link 3307. As the length of the rigid link 3307 increases, the resting position of the output point 3312 deviates along the trace 3408. A second linear actuator 3406 is added to dynamically adjust the length of the rigid link 3308. As the length of the rigid link 3308 increases, the resting position of the output point 3312 deviates along the trace 3409. A third linear actuator 3409 is added to dynamically adjust the length of the rigid link 3309. As the length of the rigid link 3309 increases, the resting position of the output point 3312 deviates along the trace 3410. These dynamic adjustments may be useful as dynamic corrections for deviations in build material or conditions, or to fine-tune the motion of a SAM tool during operation, while maintaining a fast tool motion along a general e.g. striding or virtual pivoting path.

Figure 35B:
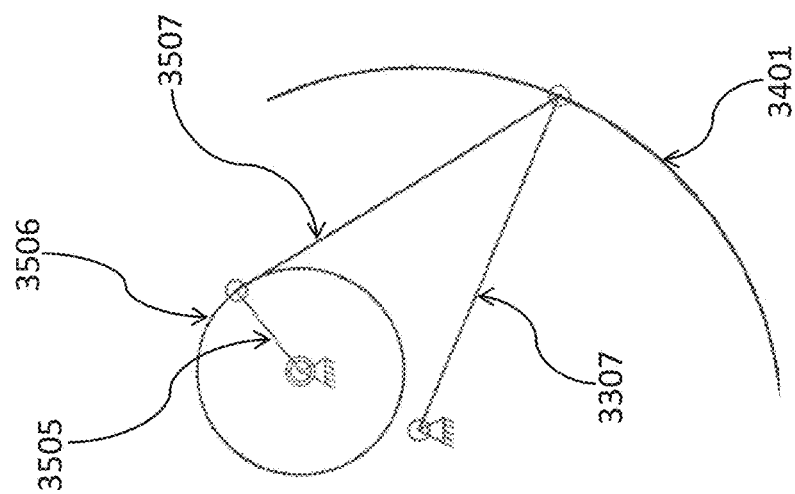
FIG. 35B depicts a continuously rotating input crank driving a back-and-forth rocker.
Figure 35A:
FIG. 35A depicts a striding mechanism with various output points.

FIG. 35A is a simplified schematic depicting a striding mechanism with various output points, including an input link or input rocker 3307. Reference numeral 3401 denotes a trace of the circular-arc path of the tip of the input rocker 3307. Reference numeral 3501 denotes an example of an output point on the fifth rigid link 3311. Reference numeral 3502 denotes an example of the path traced by the output point 3501 that approximates a semicircle. Another example of an output point 3503 is disposed on the fifth rigid link 3311. Reference numeral 3504 denotes an example of the path traced by the output point 3503 that approximates a semicircle. Other example output points and traced output paths are depicted, illustrating that by modifying the dimensions or positions of the links, joints and/or output points, different semicircle-approximating output paths can be obtained using the same input path 3401.

The linkages previously introduced generally have an input link or input rocker that moves back-and-forth along part of a circular arc. An actuator e.g. stepper motor, servo motor, DC motor or other driver can be used to impel the input rocker back-and-forth along part of a circular arc. The speed, efficiency and/or throughput of a linkage system can be increased if the actuator can be driven in a full circle (without change of direction of rotation), taking advantage of the high revolutions-per-minute (RPM) of many conventional motor types operating in continuous rotation. FIG. 35B is a simplified schematic of a continuously rotating input crank 3505 driving a back-and-forth rocker 3307. The continuously rotating input link 3505 moves at a constant or varying angular velocity along the circular path 3506. A link 3507 typically of greater or equal length to the links 3505 and 3307 connects the links 3505 and 3307. The result of this exemplary crank-rocker configuration is that the continuously rotating input 3505 produces a back-and-forth rocking motion of the rigid link 3307, which can in turn be input into the previously introduced mechanisms that receive a rocking input.

Figure 36A:
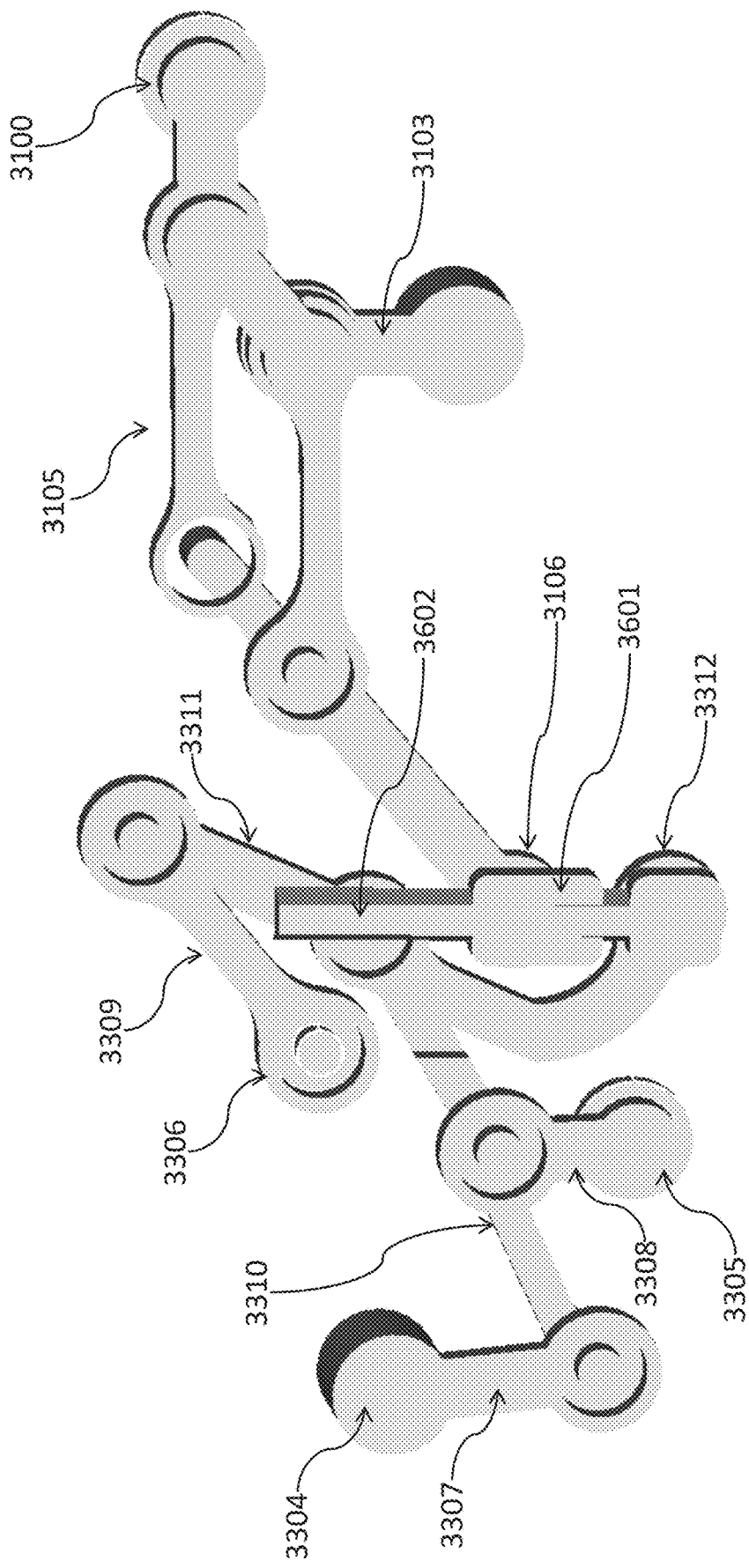
FIG. 36A depicts an embodiment of a combined virtual pivot and striding mechanism, in accordance with an embodiment of the present invention.

The different virtual pivot and striding mechanism embodiments can be combined in various permutations to produce combinatorial embodiments of apparatuses that guide a SAM tool along a desired path with reduced degrees-of-freedom. FIG. 36A depicts one example combination of a virtual pivot and a striding mechanism, including a striding mechanism (on the left side of FIG. 36A) of the embodiment previously introduced in FIG. 33B with identical labeling. A virtual pivot mechanism comprising a pantograph is depicted on the right side of FIG. 36A, as previously introduced in FIG. 31A with identical labeling. The striding mechanism and pantograph mechanism are linked together. A rotating joint 3601 is attached to and rotating about the end point of the pantograph 3106. The rotating joint 3601 also has a linear sliding groove. A rigid linear link 3602 attaches to and rotates about the end point of the striding mechanism 3312. The rigid linear link 3602 is also attached to and slides through the linear sliding groove of the rotating joint 3601. The rigid linear link 3602 can furthermore be attached to a SAM tool e.g. an active receiver, an active feeder or a work manipulation apparatus. As the first input rocker 3307 rotates, the striding output point 3312 moves along an approximate-semicircle path. The second input rocker 3103 moves in tandem, positioning the virtual pivot output point 3106 along a circular path centered on a virtual pivot. The combined constrained motion of the end points 3312 and 3106 results in a desired tool path of the link 3602, similar to the path depicted in FIGS. 29A-D.

Figure 36B:
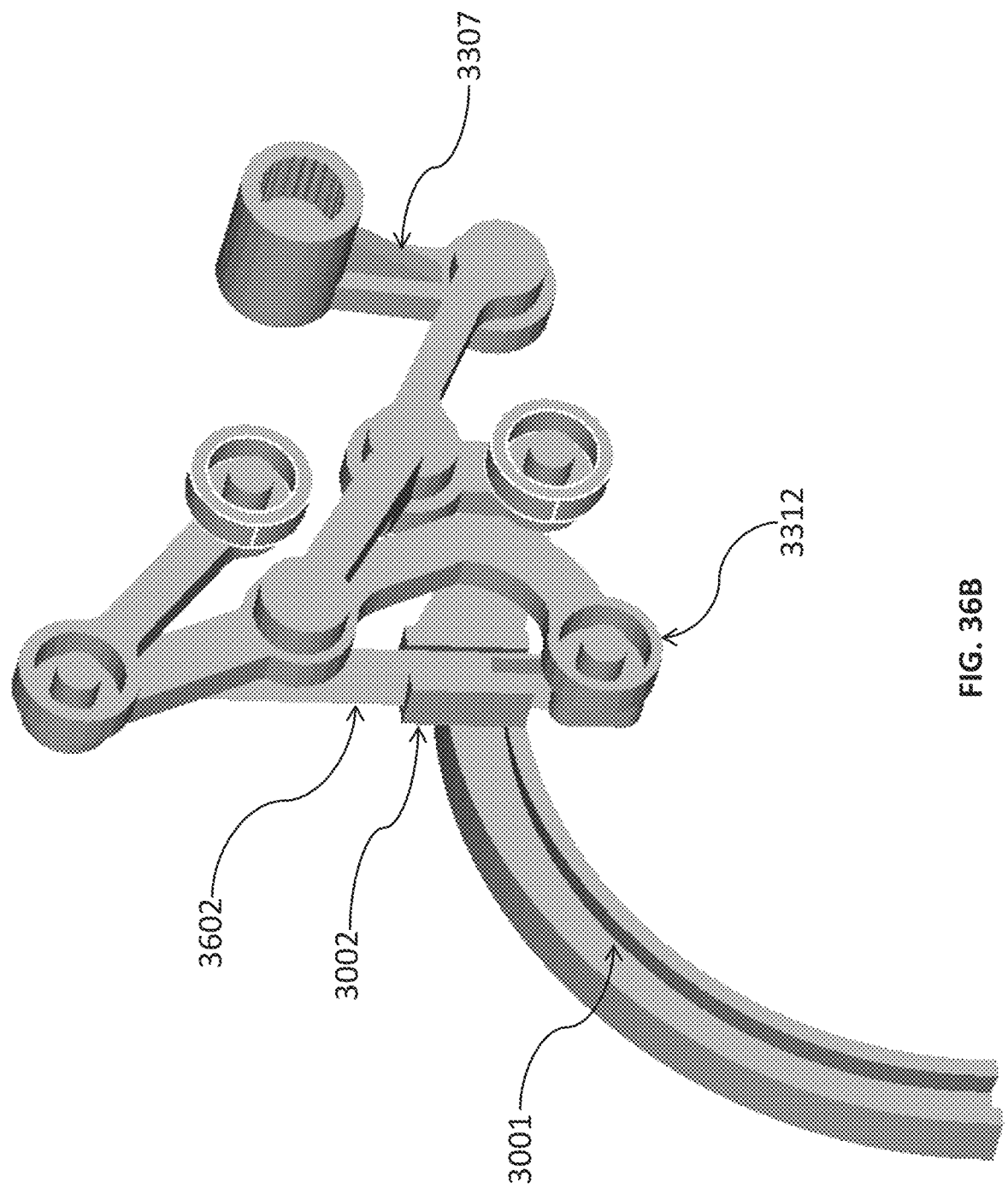
FIG. 36B depicts an embodiment of a combined virtual pivot and striding mechanism, in accordance with an embodiment of the present invention.

FIG. 36B depicts another example combination of a virtual pivot and a striding mechanism. Towards the right is the same striding mechanism of the embodiment previously introduced in FIG. 33B but viewed from the reverse side relative to FIG. 36A. Towards the left of FIG. 36B is a virtual pivot mechanism comprising an arced groove structure as previously introduced in FIG. 30A with identical labeling. The striding mechanism and arced groove mechanism are linked together. 3602 is a rigid linear link that is attached to and rotates about the end point of the striding mechanism 3312. The rigid linear link 3602 is also attached to and slides through the straight groove channel of the carriage 3002 of the arced groove mechanism. The rigid linear link 3602 can furthermore be attached to a SAM tool e.g. an active receiver, an active feeder or a work manipulation apparatus. As the first input rocker 3307 rotates, the striding output point 3312 moves along an approximate-semicircle path. Meanwhile, the rigid linear link 3602 is constrained by the passive virtual pivot mechanism to always be pointed towards or lying on a line passing through a virtual pivot point. The combined constrained motion of the end point 3312 and the carriage 3002 along the circular arc 3001 results in a desired tool path of the link 3602, similar to the path depicted in FIGS. 29A-D.

The striding mechanisms introduced in this disclosure trace an output path that approximates part of a semicircle. Further embodiments of a striding mechanism can incorporate variants of other leg mechanisms that also trace an output path that approximates part of a semicircle e.g. Klann linkages, Jansen linkages, Chebyshev plantigrade mechanisms or other walking mechanisms.

Retracting Gripper Architectures

The use of a work manipulator such as a gripper may typically involve the closing of the gripper, compounded with vertical or other translational movement of the gripper, to transport or displace the gripped object. For such a multi-action actuating system, two degrees-of-freedom (DOF) are typically required: one DOF to open/close the gripper, and one DOF to raise, lower or otherwise translate the gripper. The required degrees of freedom of the actuating system can be reduced to one by designing a 'Retracting Gripper Mechanism' that has "Open", "Closed Extended" and "Closed Retracted" states. In a Retracting Gripper Mechanism, a single DOF input drives two output points that are constrained along complementary paths that are initially separated, draw close together, then move parallel with each other FIG. 37A is a simplified schematic of an embodiment of a Retracting Gripper Mechanism in an Open state, including a first fixed or anchored joint 3701 and an input link or input rocker 3702a. Reference numeral 3703 denotes the path traced by the input rocker. The mechanism also includes a second fixed or anchored joint 3704. A rigid link 3705 connects to the second anchored joint. An output link or a 'claw' of the retracting gripper mechanism 3706a connects to the input link 3701 and the rigid link 3705. Reference numeral 3707a denotes the path traced by the tip of the output link 3706a.

A gripper mechanism can have two opposing 'claws'. The above described collection of links and joints are mirrored along the diagonal for a second 'claw' linkage: the input link of the mirrored linkage 3702b; the output link of the mirrored linkage 3706b; and the path 3707b traced by the mirrored output link 3706b. Notice that the two output links or 'claws' 3706a and 3706b trace out complementary paths 3707a and 3707b that are initially separated, draw close together, then move parallel with each other. In FIG. 37A, the retracting gripper mechanism is depicted in an Open state, with the output links 3706a and 3706b separated by a distance.

FIG. 37B is a simplified schematic of the same embodiment of a Retracting Gripper Mechanism in a Closed Extended state. The input link 3702a has swung along the path 3703 to another position. Controlled by the same or a different actuator, the mirrored input link 3702b has also swung in tandem. The resulting motion of the output links 3706a and 3706b along the constrained paths 3707a and 3707b brings the tips of the output links closer together, "closing" the retracting gripper and enabling the holding of an object.

FIG. 37C is a simplified schematic of the same embodiment of a Retracting Gripper Mechanism in a Closed Retracted state. The input link 3702a has further swung along the path 3703 to a further position. Controlled by the same or a different actuator, the mirrored input link 3702b has also swung in tandem. The resulting motion of the output links 3706a and 3706b along the constrained paths 3707a and 3707b maintains the tips of the output links at a nearly constant distance while bringing the tips closer to the center of the linkage. The retracting gripper mechanism is maintained "closed" while the tips are retracted. The three states discussed (Open, Closed Extended, Closed Retracted) can be freely transitioned by actuating the single degree-of-freedom input links 3702a and 3702b. The two input links move in tandem and can be driven by only a single actuator and using e.g. a gear or pulley system.

FIG. 37D is a simplified schematic of one 'claw' linkage of the retracting gripper mechanism in FIG. 37A with identical labeling, depicting example dimensions. The mirrored claw linkage can be a mirror image of FIG. 37D. These dimensions may be adjusted to tweak the paths e.g. 3707a and 3707b of the output links.

Figure 37E:
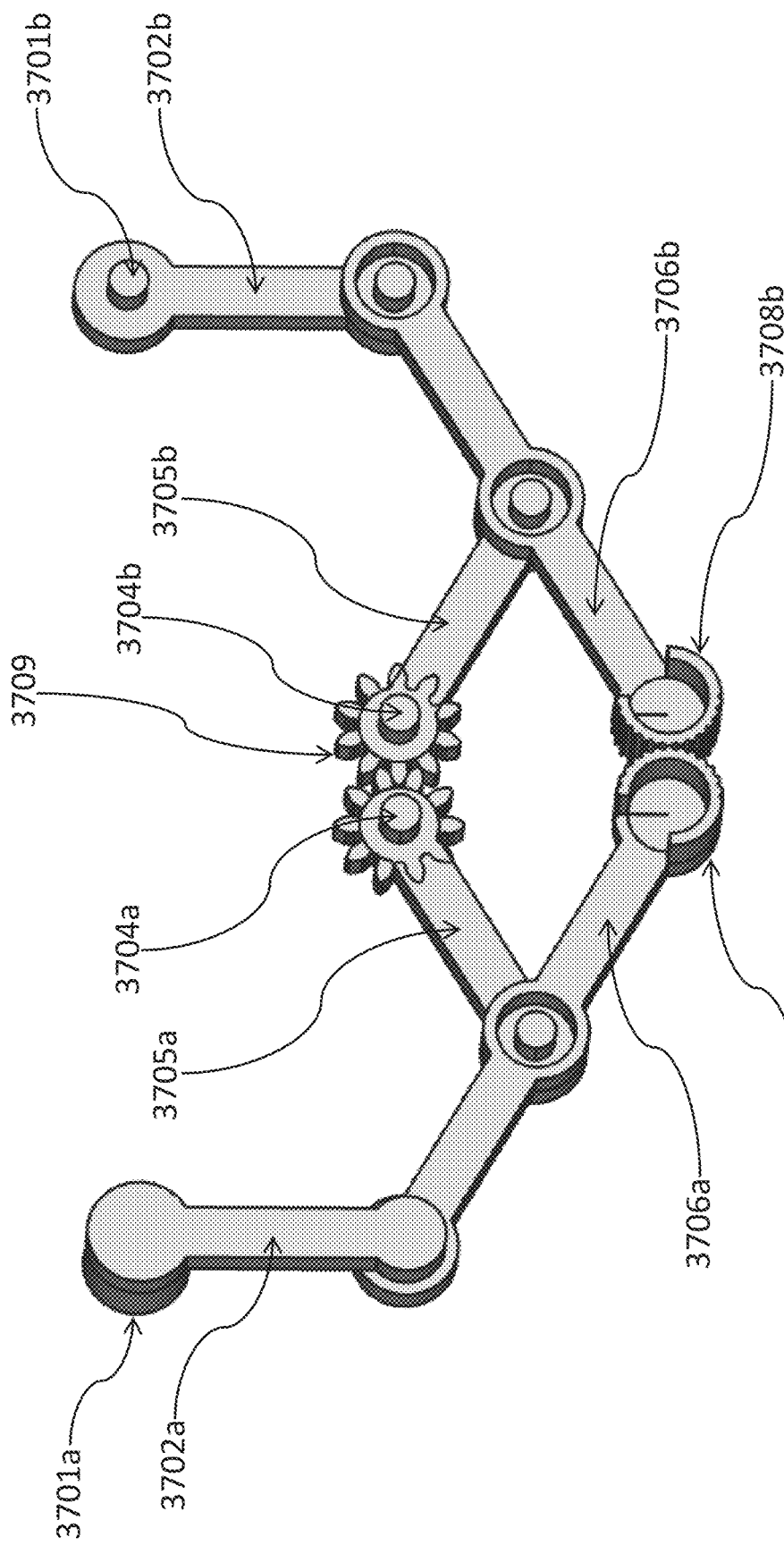
FIG. 37E depicts an embodiment of a retracting gripper mechanism.

FIG. 37E depicts an embodiment of a retracting gripper mechanism similar to that in FIG. 37A, including a first fixed or anchored joint 3701a; an input link or input rocker 3702a; and a second fixed or anchored joint 3704a. A rigid link 3705a connects to the second anchored joint 3704a. An output link or a 'claw' of the retracting gripper mechanism 3706a includes a tip 3708a, which is rounded and grooved to facilitate gripping. The above described collection of links and joints constitute one 'claw' linkage and is mirrored vertically for a second 'claw' linkage on the right side of FIG. 37E. The mirrored elements are labeled with a 'b' suffix. The mirrored link 3702b in this embodiment is a passive link. The anchored joints 3704a and 3704b are connected by a gear system 3709, such that input is only given at the link 3702a to drive the retracting gripper mechanism.

FIG. 38A depicts another embodiment of a retracting gripper mechanism involving dovetailing tips, in an Open position. The tips of the gripper 3802a and 3802b are designed to dovetail, and are fixed to links that rotate about the joints 3801a and 3801b. FIG. 38B depicts this same embodiment of a retracting gripper mechanism in a Closed Extended position. The links have rotated upwards and the tips of the gripper 3802a and 3802b have dovetailed to a closed position. The links may continue to rotate upwards with the tips 3802a and 3802b kept together, towards a Closed Retracted state.

FIG. 38C depicts another embodiment of a retracting gripper mechanism involving contracting tips, in a Closed Extended position. The tips of the gripper 3804a and 3804b can contract (e.g. via a compressing spring element 3805) when pressed, and are attached to links that rotate about the joints 3803a and 3803b. FIG. 38D depicts this same embodiment of a retracting gripper mechanism in a Closed Retracted position. The links have rotated upwards and the tips of the gripper 3804a and 3804b have compressed together-remaining in contact but are now closer (or retracted) to the center of the mechanism.

FIG. 38E depicts another embodiment of a retracting gripper mechanism involving flexible links, in an Open position. The tips of the gripper 3807a and 3807b are attached to flexible links 3806a and 3806b. A drawstring element 3809 is attached (at example attachment points 3808a and 3808b) to the flexible links 3806a and 3806b. FIG. 38F depicts this same embodiment of a retracting gripper mechanism in a Closed Retracted position. The drawstring element 3809 is pulled inwards, causing the flexible links 3806a and 3806b to bend inward and upwards, bringing the tips of the retracting gripper mechanism together in a closed position, and retracted towards the center of the mechanism.

Detailed Embodiment of an Apparatus of a Stitch Additive Manufacturing System

Figure 39C:
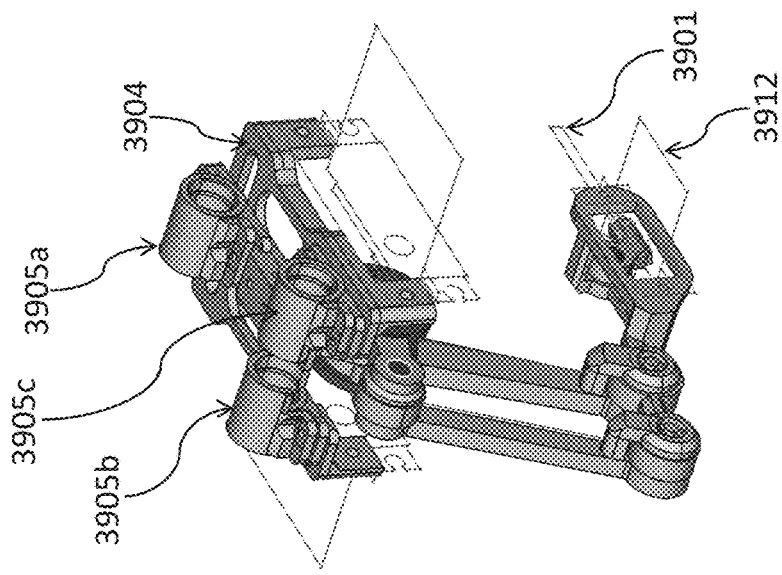
FIG. 39C depicts an infiltrator limb, in accordance with an embodiment of the present invention.
Figure 39B:
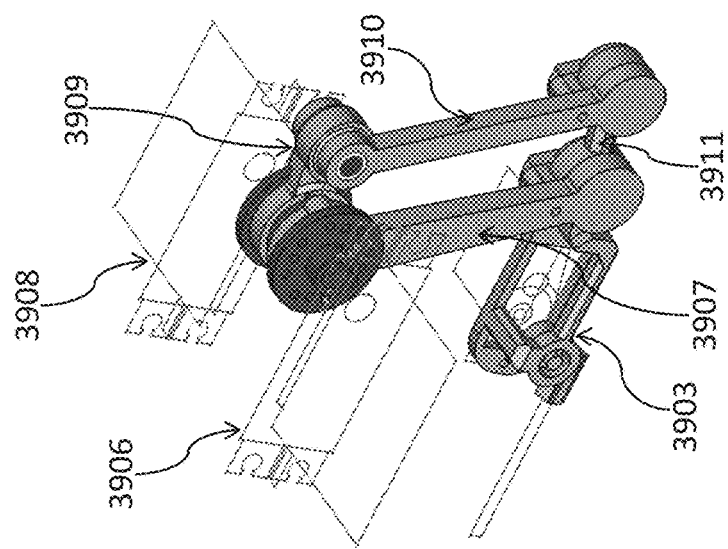
FIG. 39B depicts an infiltrator limb, in accordance with an embodiment of the present invention.
Figure 39A:
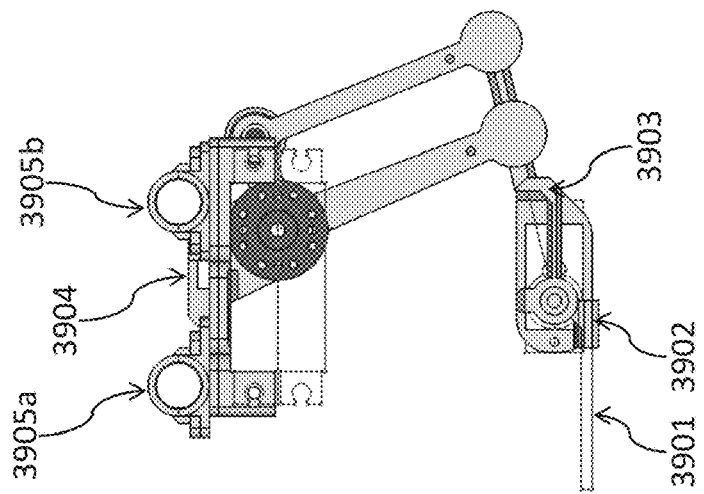
FIG. 39A depicts an infiltrator limb, in accordance with an embodiment of the present invention.

FIG. 39A is a side profile view of an embodiment of an Infiltrator Limb, corresponding to the kinematic diagrams in FIG. 16B and FIG. 28. An end effector 3901, such as an active receiver latch hook, is attached to a rotating socket called "Infiltrator Limb Link III" 3902, which is in turn attached to a bracket called "Infiltrator Limb Link I" 3903. The infiltrator limb includes a base frame 3904, with slider sockets 3905a and 3905b being attached to the base frame 3904, enabling translation of the entire Infiltrator Limb structure along an axis.

FIG. 39B is another view of the same embodiment of an Infiltrator Limb, corresponding to the kinematic diagrams in FIG. 16B and FIG. 28. Reference numeral 3906 denotes a first rotating actuator or "tilting rotator" connected to "Infiltrator Limb Link I" 3907. A second tilting rotator 3908 is connected to a link 3909, which is in turn connected to a link 3910, which is in turn connected to a link 3911, which is part of the Infiltrator Limb Link II 3903 rigid body. The links 3907, 3909, 3910 and 3911 form a parallelogram linkage, which allows 2-DOF positioning of Infiltrator Limb Link II 3903 while keeping the actuators 3906 and 3908 at the base of the structure 3904.

FIG. 39C is a yet another view of the same embodiment of an Infiltrator Limb, corresponding to the kinematic diagrams in FIG. 16B and FIG. 28. The tilting rotator 3912 actuates the Infiltrator Limb Link III 3902 that is attached to the end effector 3901. Slider sockets 3905a, 3905b and 3905c are attached to the base frame 3904, enabling translation of the entire Infiltrator Limb structure along an axis.

Passive Feeder(s) and Spooler(s)

Figure 40C:
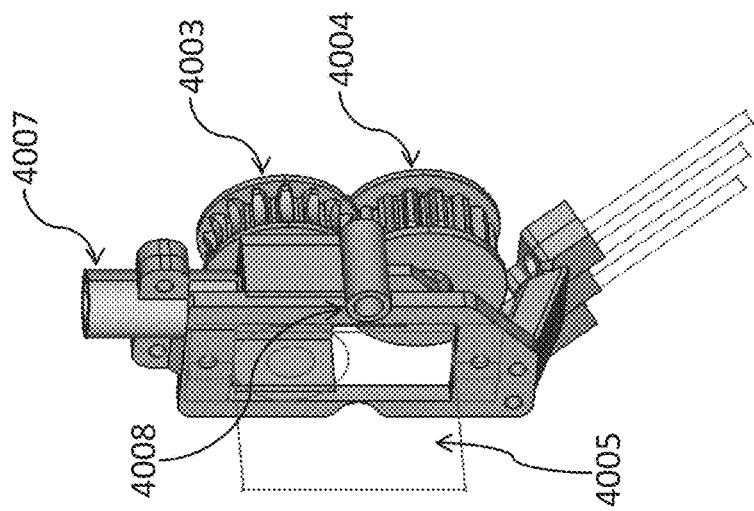
FIG. 40C depicts an embodiment of a passive feeder and spooler, in accordance with an embodiment of the present invention.
Figure 40B:
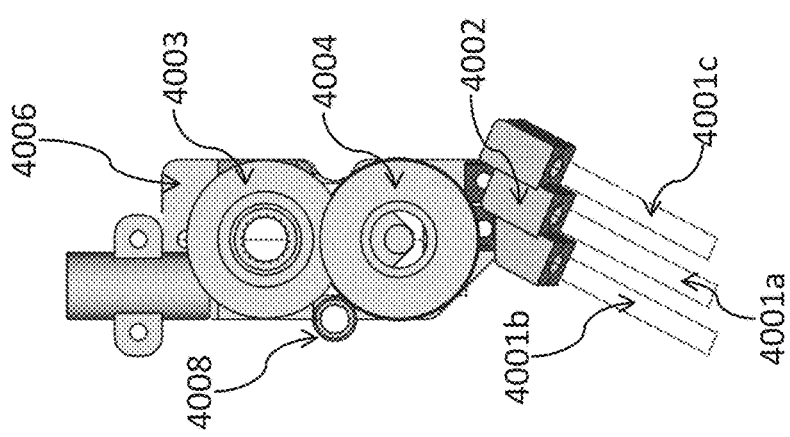
FIG. 40B depicts an embodiment of a passive feeder and spooler, in accordance with an embodiment of the present invention.
Figure 40A:
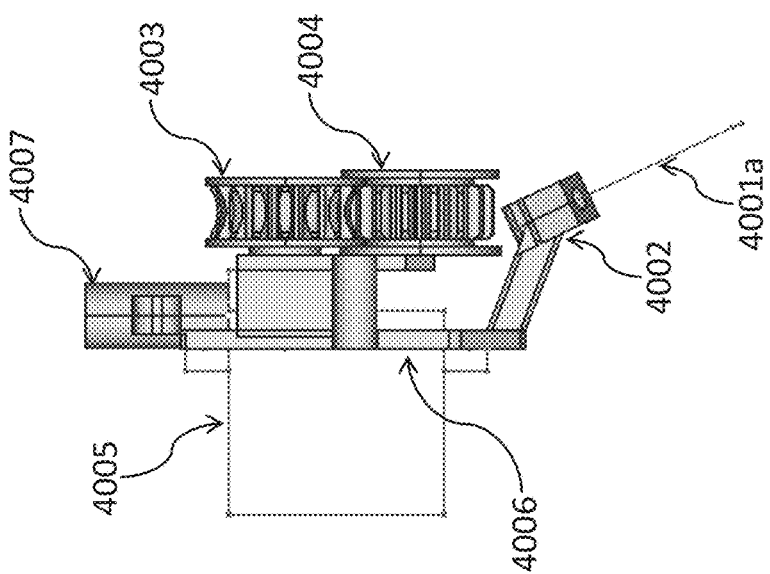
FIG. 40A depicts an embodiment of a passive feeder and spooler, in accordance with an embodiment of the present invention.

FIG. 40A is a side profile view of an embodiment of (three) Passive Feeders and a Spooler, including a flexible feeder tube 4001a, which is angled with respect to the vertical. A rigid bracket 4002 holds the feeder tube 4001a. The spooler includes a first wheel 4003 and a second wheel 4004. The first wheel 4003 of the Spooler is driven by a rotary actuator 4005. The Passive Feeder and Spooler components are attached to a rigid bracket 4006 which has a socket 4007 for connecting to other components of the SAM apparatus.

FIG. 40B is a front profile view of the same embodiment of (three) Passive Feeders and a Spooler. Flexible feeders 4001a, 4001b, and 4001c are embodiments of flexible feeder tubes, each of which is angled with respect to the vertical, with a rigid bracket 4002 holding the feeder tubes. A channel 4008 is disposed within the bracket 4006, through which yarn may be supplied to the Spooler wheels 4003 and 4004.

FIG. 40C is another view of the same embodiment of (three) Passive Feeders and a Spooler, showing the channel 4008 through the bracket 4006, through which yarn may be supplied to the Spooler wheels 4003 and 4004. The spooler wheels 4003 and 4004 are geared and grooved to capture the yarn, which is dispensed or retracted by driving the rotary actuator 4005 attached to the wheel 4003.

Gripper-Ledge-Tusk(s)

Figure 41B:
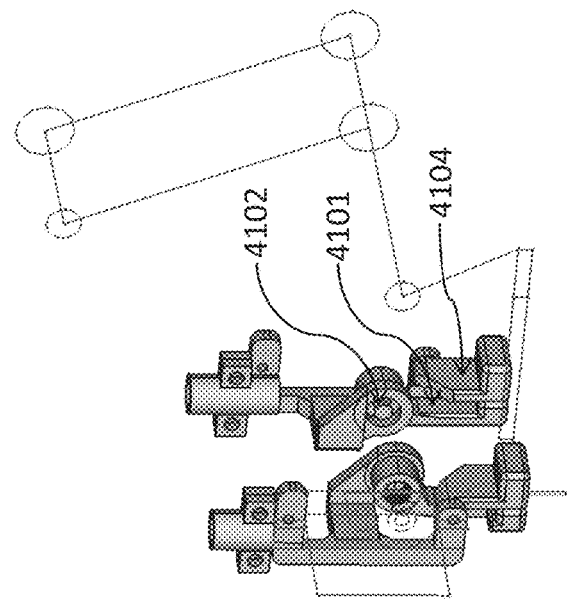
FIG. 41B depicts an embodiment of a gripper-ledge-tusk SAM mechanism, in accordance with an embodiment of the present invention.
Figure 41C:
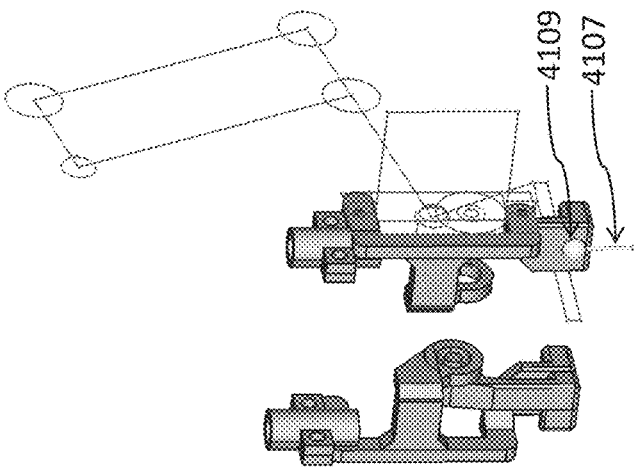
FIG. 41C depicts an embodiment of a gripper-ledge-tusk SAM mechanism, in accordance with an embodiment of the present invention.
Figure 41A:
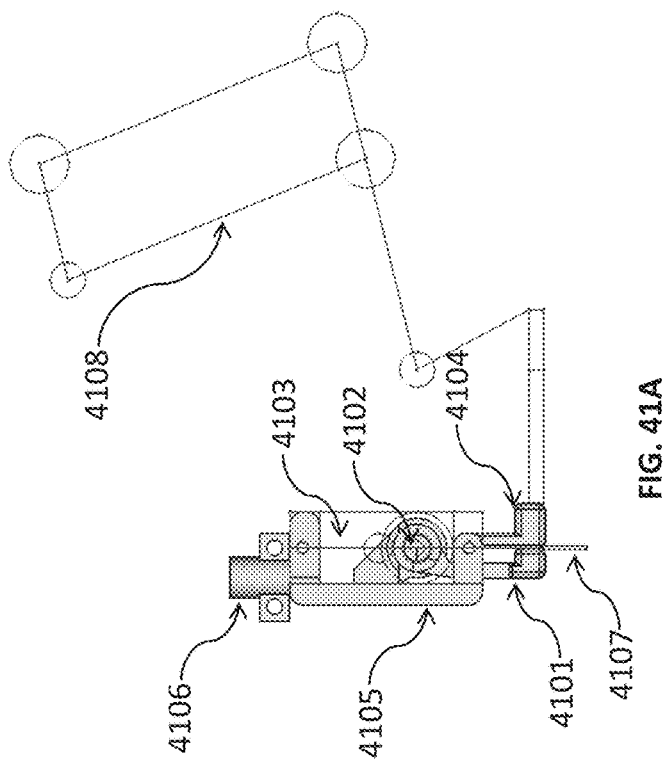
FIG. 41A depicts an embodiment of a gripper-ledge-tusk SAM mechanism, in accordance with an embodiment of the present invention.

FIG. 41A is a side profile view of an embodiment of a Gripper-Ledge-Tusk. A motile 'claw' 4101 of the Gripper rotates about a pivot 4102. An actuator 4103 opens and closes that motile claw 4101. A stationary tusk 4104, with a Ledge facing rightwards, (herein called a Ledge-Tusk) is fixed to the rigid bracket 4105. A socket 4106 connects the bracket 4105 to other parts of the SAM apparatus. The Gripper is depicted holding a Pin 4107. The overall infiltrator limb is denoted by reference numeral 4108.

FIG. 41B is another view of the same embodiment of a two Gripper-Ledge-Tusks. In this view, two Gripper-Ledge-Tusks are depicted, the tusks being the mirror images of each other. FIG. 41C is yet another view of the same embodiment of a two Gripper-Ledge-Tusks. In this view, the motile claw of the right Gripper-Ledge-Tusk is made invisible, revealing a cavity 4109 that fits the head of the held Pin 4107.

Tanglehead

Figure 42C:
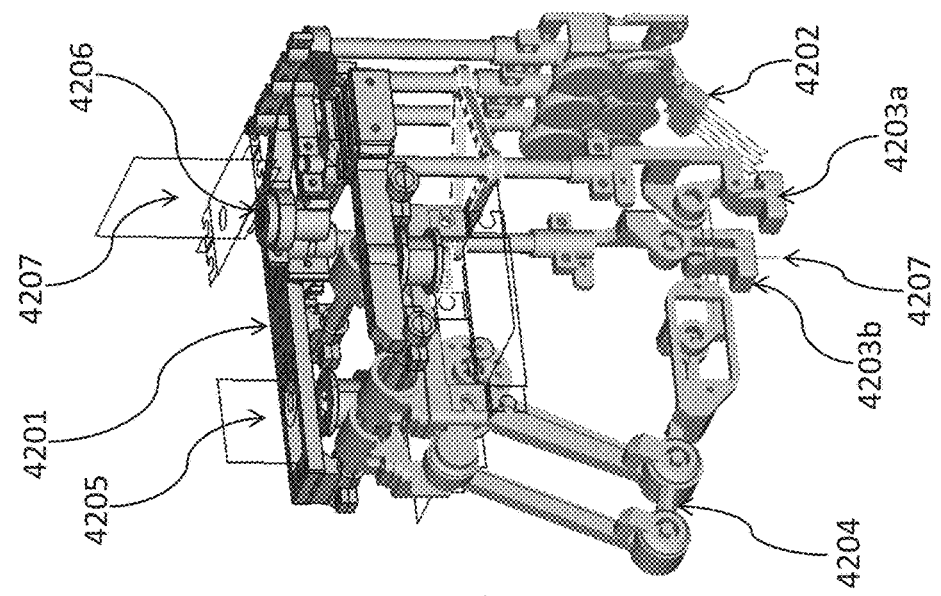
FIG. 42C depicts an embodiment of a Tanglehead, in accordance with an embodiment of the present invention.
Figure 42B:
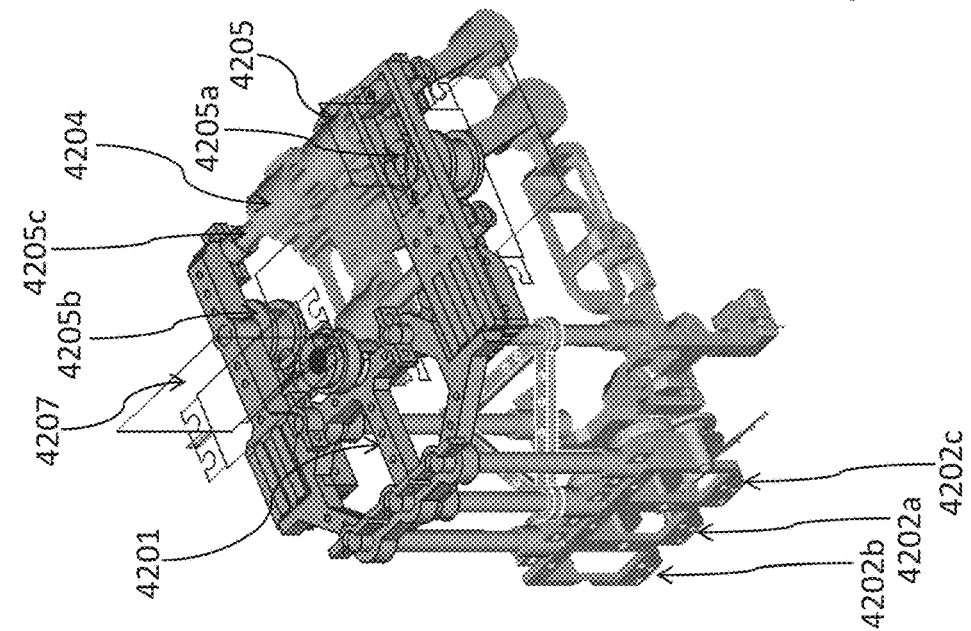
FIG. 42B depicts an embodiment of a Tanglehead, in accordance with an embodiment of the present invention.
Figure 42A:
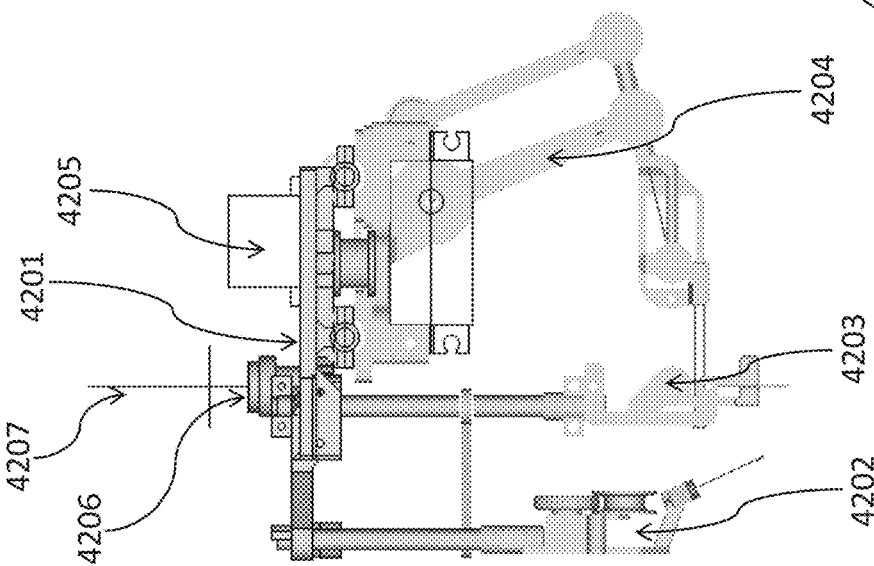
FIG. 42A depicts an embodiment of a Tanglehead, in accordance with an embodiment of the present invention.

FIG. 42A is a side profile view of an embodiment of a Tanglehead corresponding to FIG. 28. 4201 is the rigid Tanglehead Frame. Attached to the Tanglehead Frame 4201 is a Passive Feeder-Spooler 4202 (as introduced in FIGS. 40A-E). Also attached to the Tanglehead Frame 4201 are two Gripper-Ledge-Tusks 4203 (as introduced in FIGS. 41A-D). Also attached to the Tanglehead Frame 4201 is an Infiltrator Limb 4204 (as introduced in FIGS. 39A-D). The Infiltrator Limb 4204 can translate horizontally relative to the Tanglehead Frame 4201, via a pulley system driven by a horizontal-axis actuator 4205. The Tanglehead Frame and attached components rotate about a pivot 4206 as driven by a rotary actuator 4207.

FIG. 42B is another view of the same embodiment of a Tanglehead corresponding to FIG. 28. Three Spoolers 4202a, 4202b and 4202c are depicted attached to the Tanglehead Frame 4201. The pulley system is visible: note one driven end 4205a and one idle end 4205b of the pulley system driven by the horizontal-axis actuator 4205. The Infiltrator Limb Frame 4204 slides along rails 4205c as driven by the pulley system. The pulley belts are not depicted in FIG. 42B.

FIG. 42C is yet another view of the same embodiment of a Tanglehead corresponding to FIG. 28. Two Gripper-Ledge-Tusks 4203a and 4203b are visible, with the tusk 4203b holding a Pin 4207. The three Spoolers feed three Feeder Tubes, which are attached to a single modular bracket 4202 that is attached to one Spooler. The Spoolers and Feeder Tubes are modular—one or more modules may be attached to a Tanglehead Frame.

Figure 42D:
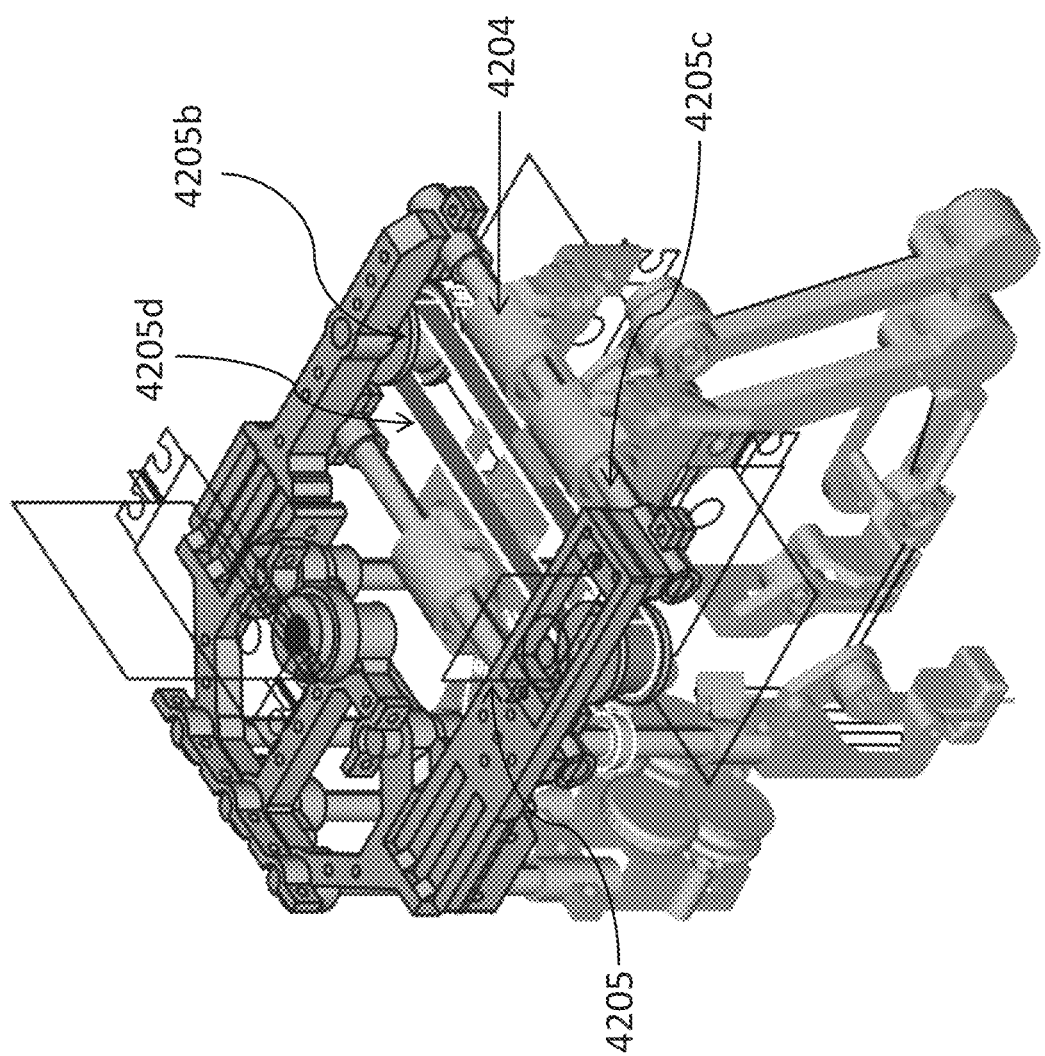
FIG. 42D depicts the apparatus of FIG. 42A.

FIG. 42D is still another view of the same embodiment of a Tanglehead corresponding to FIG. 28. This figure shows the horizontal-axis actuator 4205 (in wire-frame relief) which drives the pulley belt 4205d that is also attached to the idle pulley end 4205b. The pulley system moves the Infiltrator Limb 4204 that slides along the rails 4205c.

Build Frame

FIG. 43A is a side profile view of an embodiment of a Build Frame with attached components corresponding to FIG. 28. Reference numeral 4301 denotes the structure of the Build Frame. As shown in FIG. 43A, the build frame 4301 includes a Tanglehead 4302 (as introduced in FIGS. 42A-E). An x-axis actuator 4303a is attached to one end of a 'pillow ground platform,' with the other end of the pillow ground platform denoted by reference numeral 4303b. The pillow ground platform includes truss structure 4303. The 'z-axis actuator' 4304a raises and lowers the pillow ground platform structure 4303c, which slides along the vertical rails 4304b.

FIG. 43B is another view of the same embodiment of a Build Frame with attached components corresponding to FIG. 28. Visible is the driven end of the pillow ground platform 4303a and also the idle end of the pillow ground platform 4303b. The ends of the pillow ground platform 4303a and 4303b are rollers that form part of a conveyor belt system. The wide belt that wraps around the two rollers 4303a and 4303b is not shown here. The z-axis actuator 4304a raises and lowers the pillow ground platform structure 4303c, which slides along the vertical rails 4304b. 4305a is a 'y-axis actuator' that drives a pulley system that moves the Tanglehead 4302, which slides along the horizontal rails 4305b.

Figure 43C:
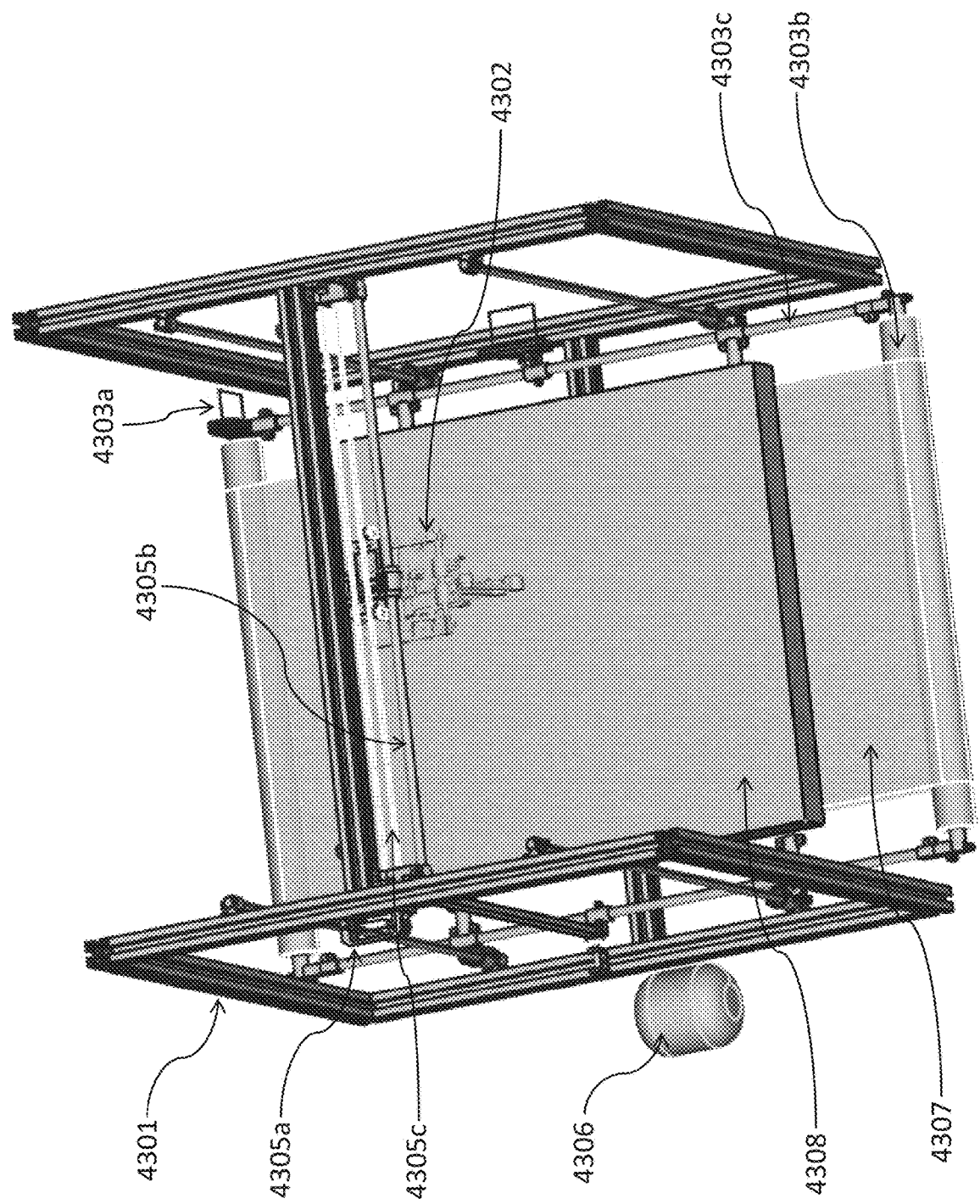
FIG. 43C depicts the apparatus of FIG. 43A.

FIG. 43C is yet another view of the same embodiment of a Build Frame with attached components corresponding to FIG. 28. Attached to the Build Frame 4301 is a y-axis actuator 4305a that drives a pulley belt 4305c that moves the Tanglehead 4302, which slides along the horizontal rails 4305b. An x-axis actuator 4303a is attached to the driven end of the pillow ground platform. The idle end of the pillow ground platform is denoted by reference numeral 4303b. Rollers 4303a (active roller driven by a motor) and 4303b (idle roller) are attached to the ends of the pillow ground platform structure 4303c, with the rollers 4303a and 4303b forming part of a conveyor belt system. Reference numeral 4307 denotes a wide fabric conveyor belt that wraps around the two rollers 4303a and 4303b. A foam piece 4308 functions as the pillow ground, resting on top of the conveyor belt 4307. The yarn source is denoted by reference numeral 4306.

Figure 43D:
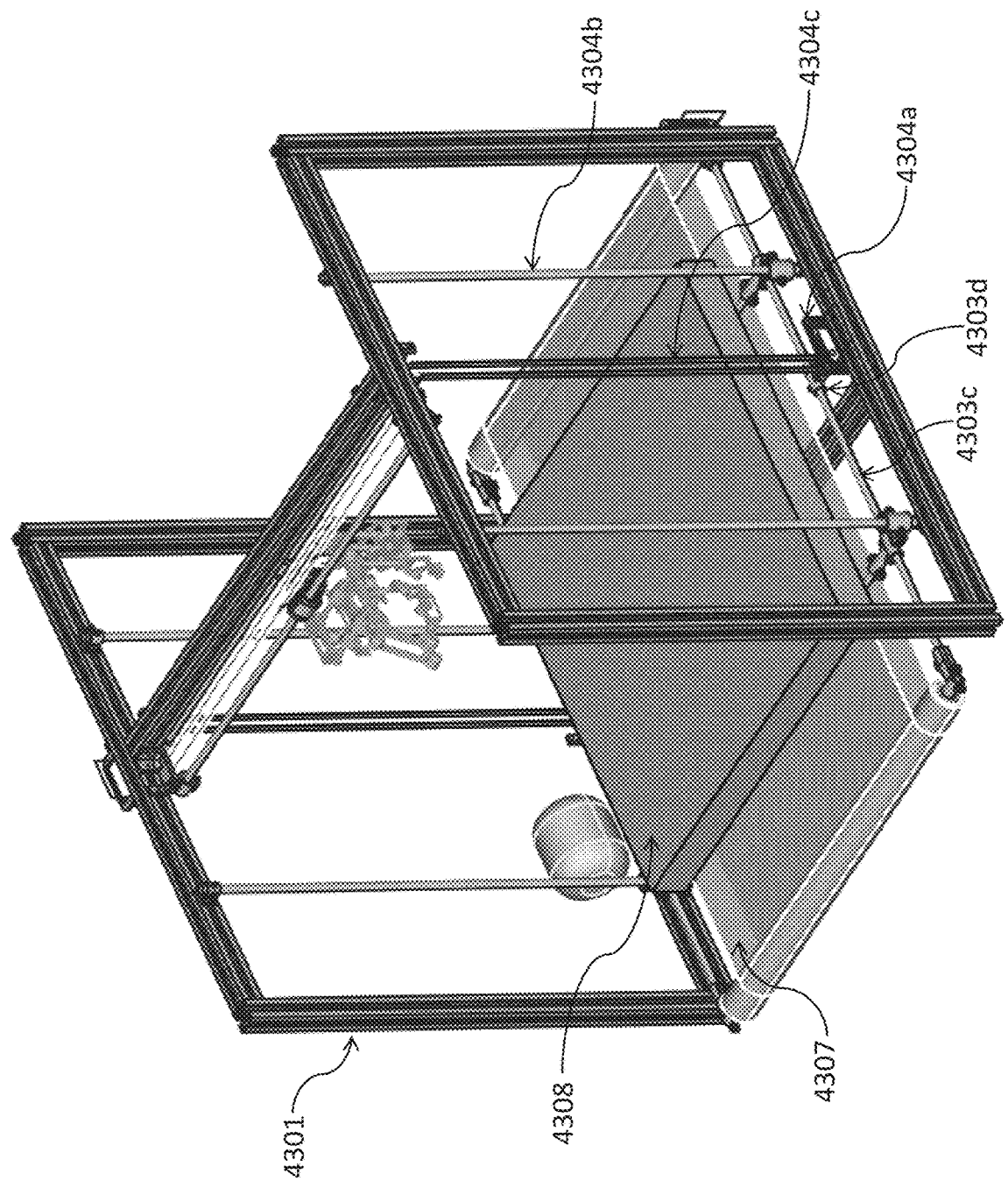
FIG. 43D depicts the apparatus of FIG. 43A.

FIG. 43D is still another view of the same embodiment of a Build Frame with attached components corresponding to FIG. 28. Attached to the Build Frame 4301 is a z-axis actuator 4304a that drives a vertical pulley belt 4304c. The pillow ground platform structure 4303c is attached via a bracket 4303d to the vertical pulley belt 4304c. The pillow ground platform structure 4303c slides along the vertical rails 4304b. A foam piece 4308 rests on the x-axis conveyor belt 4307 of the pillow ground platform.

Yarn-Like Input Materials and Pre-and-Post Manufacturing Processes

Stitch Additive Manufacturing (SAM) can produce arbitrary 3D structures using yarn-like build material of many different embodiments. Non-limiting examples are here discussed. Some embodiments of a yarn-like build material may comprise one or more plies of natural fiber (e.g. cotton, wool, or silk), synthetic fibers (e.g. nylon, polyester or acrylic), metal fibers or wires (e.g. steel wool, copper wire), ceramic or mineral fibers (e.g. aluminum silicate or polycrystalline wool) or any other filament-format material (e.g. carbon fiber, carbon nanotube fiber, silicone, rubber) or any blend of different fibers and/or plies—resulting in products of manufacture with different physical qualities.

Other embodiments of a yarn-like build material may comprise one or more electrically conductive plies of e.g. metal wires, conductive polymers or carbon nanotube fibers, or blends of conductive material and other structural materials. Moreover, the yarn-like build material may comprise one or more plies of edible ingredients in filament format e.g. wheat, rice, buckwheat or other foods commonly or uncommonly formed into strands. Food ingredients not commonly in filament- or yarn-like format may be processed into a yarn-like format by e.g. pulverizing the ingredient and introducing a binding agent e.g. gluten or other protein, and extruding into a filament-like format suitable for SAM. In other embodiments, food ingredients not commonly in filament- or yarn-like format may also be processed into a yarn-like format by e.g. encasing the ingredient in long, thin and hollow tubes of cellulose or other edible casing. In other embodiments, food ingredients not commonly in filament- or yarn-like format may also be processed into a yarn-like format by e.g. dispersing the ingredient (pulverized, granulated or otherwise dispersible) into strands of edible material e.g. wheat, rice, collagen, or cellulose.

Still other embodiments of a yarn-like build material may comprise one or more plies of biocompatible materials (e.g. biocompatible nylon, hydroxyapatite, collagen, polylactic acid (PLA), or polyethylene terephthalate (PETE)) suitable for interaction with or situation in human or other biological bodies.

A SAM product of manufacture may incorporate one or more different types of yarn-like material, each with different physical, electrical or other properties as desired in the final 3D structure. The different types of yarn-like material may be incorporated into the final 3D structure as a blend of different yarns in alternating, interleaving or mixed stitches, or as a stitch pattern having specifically designed traces for yarns of different materials, to combine or synergize different qualities e.g. color, texture, electrical conductivity, thermal insulation, pliability and/or breathability. The different types of yarn-like material may also be incorporated into the final 3D structure such as to form functional sub-components e.g. electrically or thermally conductive traces, shells, hulls, wiring pads, sockets, handles, or other specialized or separate sub-components.

Yarn-like build materials and the utilizing SAM apparatuses may be scaled very small, very large, or to any physically feasible size-yarn-like material of any scale that is or can be temporarily made sufficiently flexible and with sufficient tensile integrity to be formed into stitch-like structures may be utilized in an appropriately scaled SAM system Pre-Processing FIG. 44 is a simple diagram depicting how yarn-like materials may be pre-processed as it enters a SAM apparatus. As yarn is drawn from the Yarn Source 1001, the yarn may pass through a Pre-Treatment component 4501 (e.g. a pre-treatment chamber) that selectively pre-processes each incremental section of Treated Working Yarn 4502, that is then drawn into the other components of the SAM Apparatus 4503. One example of pre-processing is dynamic coloring of the yarn-like material. A Pre-Treatment 4501 chamber with one or more nozzles that dispense ink or other coloring agents can selectively color each section of yarn that is then drawn into a spooler or other parts of a SAM apparatus 4503. This dynamic coloring may also be used to mark lengths of yarn for fiducial tracking or other purposes.

In other embodiments, yarn-like material pre-processing (e.g. by passing the yarn drawn from the yarn source into a pre-treatment chamber before the yarn is drawn into a spooler or other parts of a SAM apparatus) may be used to modify other properties of selected sections of yarn, e.g. application or coating of electrically, thermally or magnetically conductive or insulating or biocompatible material to selected sections of yarn, or application of hardening or softening agents to selected sections of yarn.

In still other embodiments, yarn-like material Pre-Treatment 4501 may involve temporarily softening or increasing the pliability and/or flexibility of a length of working yarn by e.g. local heating or application of softening agents as the yarn passes through a pre-treatment component, chamber or nozzle, to increase the workability of the yarn for SAM processes e.g. pull-through and stitch formation.

Post-Processing

FIG. 44 also depicts how a Product of Manufacture 1009 constructed of the Treated Working Yarn 4502 (or untreated working yarn) may be post-processed after exiting a SAM apparatus. In some embodiments, Post-Treatment 4504 may involve local (on select parts of the finished product) or global (on the whole finished product) application of agents or materials that alter the color (e.g. inks, dyes), electrical (e.g. carbon-nanotube impregnation), strength (e.g. resin or epoxy) or other physical qualities of the Product of Manufacture 1009.

In other embodiments, Post-Treatment 4504 may involve using the SAM Product of Manufacture 1009 as a preform in a 3D composite, matrix composite or hybrid composite product. A Product of Manufacture 1009 may be constructed of interlinked yarns of various materials (e.g. thermoplastics, thermosets, metals, ceramic or mineral wools) and serve as a preform structure into which resin, epoxy, polymers, fiberglass, metals or other matrix materials may be introduced, resulting in a final product with select physical qualities.

In yet other embodiments, Post-Treatment 4504 may involve curing, annealing or exposing the Product of Manufacture 1009 to modifying agents. The Product of Manufacture may be constructed of yarn-like material with an initial set of physical qualities e.g. flexibility, softness, color, transparency, porosity, conductivity or other property. Local (on select parts of the finished product) or global (on the whole finished product) curing or annealing via e.g. ultraviolet (UV) or other wavelength range of light exposure, heating, chemical (e.g. HF, or other etchants) exposure, plasma exposure, ultrasound or other treatment, may be used to alter the physical qualities of the Product of Manufacture 1009. Post-treatment, the Product of Manufacture may exhibit a different set of local or global physical qualities e.g. increased or reduced flexibility, strength, toughness, changed color, opaqueness, porosity, conductivity or other property.

In other embodiments, Post-Treatment 4504 may involve locally or globally altering the structure or surface finish of the Product of Manufacture 1009. The structure of a Product of Manufacture may be modified by fusing sections of the yarn-like build material together by application of heat above the melting point of the yarn-like material, application of a dissolvent e.g. isopropanol or acetone, or specific radiation e.g. UV or other wavelength or ultrasound, optionally coupled with physical manipulation e.g. locally compressing, brushing, shearing or polishing. The surface finish of a Product of Manufacture may be modified by 'smoothening out' the stitch structures via e.g. application of heat above the melting point of the yarn-like material, application of a dissolvent e.g. isopropanol or acetone, or specific radiation e.g. UV or other wavelength or ultrasound, optionally coupled with physical manipulation e.g. locally compressing, brushing, shearing or polishing.

In other embodiments, Post-Treatment 4504 may involve disinfection, pasteurization, or sterilization of the Product of Manufacture 1009, by application of high heat, suitable chemicals, irradiation, or high pressure to eliminate or deactivate lifeforms or biological agents on or within the Product of Manufacture.

In other embodiments, Post-Treatment 4504 may involve locally or globally coating the Product of Manufacture 1009 with one or more layers of one or more different materials. In some embodiments, the different coating materials may be materials not suited for full SAM manufacture but desirable in the 3D formats generated by SAM, such as brittle or inflexible materials (ceramic, metals, various plastics) or costly or precious materials (gold, silver, platinum). In other embodiments, the different coating materials may be used to alter the surface properties of the Product of Manufacture, e.g. imparting biocompatibility or enhanced bonding with other materials e.g. priming for metal coating or crystalline growth or deposition. In other embodiments, the different coating materials may be used in functional multi-layer configurations, such as reflective or anti-reflective coatings, thermal, electrical and/or magnetic insulation, or other functional multi-layer structures.

Pre-processing and post-processing processes are discussed as distinct functions for clarity. These functions may be more closely incorporated or integrated as components into a SAM apparatus. A SAM Product of Manufacture may be the final product, or may be used as input or tooling or support for other fabrication or manufacturing processes.

Hybridizations and Extensions of Stitch Additive Manufacturing

Stitch Additive Manufacturing (SAM) may be combined with other manufacturing or manipulation technologies. FIG. 45A is a simplified diagram depicting one embodiment of a Hybrid Stitch Additive Manufacturing (H-SAM) system combining SAM and Fused Deposition Modeling (FDM). A general build frame 4601 includes X-, Y- and Z-actuators for positioning various end effectors. Tanglehead end effector 4602 is also included, as is FDM end effector 4603, such as a heated printer nozzle. The Tanglehead 4602 and the FDM nozzle 4603 can move independently or semi-independently in this H-SAM embodiment. The Tanglehead 4602 and the FDM nozzle 4603 can be used to concurrently or sequentially form parts of a Product of Manufacture that combines 3D structured yarn stitches of various materials, with fused filaments of various materials (e.g. PLA, ABS, TPU). 3D structured yarn stitches formed by the Tanglehead 4602 may be used as the base for fused filament structures formed by the FDM nozzle 4603, or fused filament structures formed by the FDM nozzle 4603 can have arcs, slots or rings through which to anchor 3D structured yarn stitches formed by the Tanglehead 4602.

FIG. 45B is a simplified diagram depicting another embodiment of a H-SAM system combining SAM and FDM, including general build frame 4601 with X-, Y- and Z-actuators for positioning various end effectors. A Tanglehead 4602 end effector for SAM, as well as a FDM end effector 4603, such as a heated printer nozzle, are both attached to a sub-frame 4604 actuated in the X-, Y- and Z-directions. The Tanglehead 4602 and the FDM nozzle 4603 can be used to concurrently or sequentially form parts of a Product of Manufacture that combines 3D structured yarn stitches of various materials, with fused filaments of various materials (e.g. PLA, ABS, TPU) as previously described. In addition, 3D structured yarn stitches formed by the Tanglehead 4602 may be interlaced with fused filament structures formed by the FDM nozzle 4603 e.g. interstitial filling, interspersed small structures e.g. rings, brackets, larger shells, walls or other combinations of parts.

With reference to FIGS. 45A and 45B, other embodiments of a H-SAM system combining SAM and FDM may utilize the FDM nozzle 4603 to dynamically extrude a filament of various materials, and of various cross-sectional dimensions (e.g. small, medium, large circumference) and shapes (e.g. circular, square, polygonal, star-shaped) that is then used as the yarn-like build material by the SAM end effector 4602 to form stitches in a 3D structure.

FIG. 45C is a simplified diagram illustrating another embodiment of a H-SAM system combining SAM and FDM. In this embodiment, a Feeder dispenses a Filament 4605 (e.g. PLA, ABS, TPU or other flexible blend of heat-fusible materials) that may be selectively melted 4606 by an auxiliary FDM heating element 4607 that may be attached to an independently positioned end effector or limb. A SAM end effector 4608 e.g. an active receiver may be used to independently form stitches using the Filament 4605, producing HSAM structures with both stitched and fused structural elements.

FIG. 45D is a simplified diagram illustrating yet another embodiment of a H-SAM system combining SAM and FDM. In this embodiment, a Feeder dispenses a Filament 4605 (e.g. PLA, ABS, TPU or other flexible blend of materials) that may be selectively melted 4606 by an auxiliary FDM heating element 4607 that is attached to the SAM end effector 4608 e.g. an active receiver. The SAM end effector 4608 may be used to form stitches using the Filament 4605, and the FDM heating element 4607 may be selectively activated to melt, fuse or smoothen select portions of the stitched structure.

Other embodiments of a H-SAM system may combine SAM and Needle Felting. In one such embodiment similar to FIG. 45D, a felting needle-a mechanically reciprocating needle or passive needle moved by the SAM end effector—may replace 4607 and be attached to the tip of the SAM end effector 4608. The SAM end effector 4608 may be used to form stitches using yarn-like build material, and the Felting Needle may be used to repeatedly puncture the stitch structure to selectively alter the fiber arrangement of the formed stitches, e.g. to increase cohesion, modify the structure or produce a more uniform surface finish. The Felting Needle may be used to repeatedly puncture the stitch structure while forcing in externally applied fibers, to introduce new fibers e.g. different colored or different material fibers into the stitch structure. The Felting Needle may be used to attach or fuse a length of working yarn to various positions on the work in-progress by repeated puncturing and entangling of the fibers, without having to form a stitch.

Other embodiments of a H-SAM system may combine SAM with medical or surgical tools and operations. In one simple embodiment, a SAM or H-SAM system may construct a bio-compatible product of manufacture that is then utilized by an adjacent or co-operational surgical process. In another embodiment, a SAM apparatus may be integrated with a surgical apparatus, such that the resulting H-SAM apparatus has SAM components and/or end effectors (e.g. active feeder, active receiver) and surgical components and/or end effectors (e.g. scalpels, suturing needles, laparoscopes, biopsy needles, laser, ultrasound or thermal delivery systems, or other medical or surgical implements), with an optional pillow ground platform or utilizing the medical or surgery subject as the ground plane. In an example embodiment, a medical H-SAM may be used to construct arbitrary 3D structures (with properties such as flexibility, porosity, permeability) of bio-compatible materials in situ during medical or surgical operations. In another embodiment, a medical H-SAM may be used in conjunction with surgical tools or end effectors to e.g. construct scaffolding or facilitate suturing or other medical procedures.

Further extensions and embodiments of a SAM or H-SAM system may include more than one end effector e.g. multiple SAM active receivers and passive feeders and/or multiple types of end effectors e.g. SAM, FDM, Needle Felting tips and/or surgical implements in one apparatus.

Further extensions and embodiments of a SAM or H-SAM system may mount components or assemblies of components of a SAM system (e.g. an active receiver, an active feeder, an Infiltrator Limb, a Tanglehead) onto other actuating systems such as fixed robot arms or mobile (e.g. wheeled, walking, airborne, aquatic) robots, which may enhance the dexterity, range of motion, working volume, working environment, integration with other manufacturing or operational processes, or other considerations.

Production Line Integrating Stitch Additive Manufacturing

Figure 46:
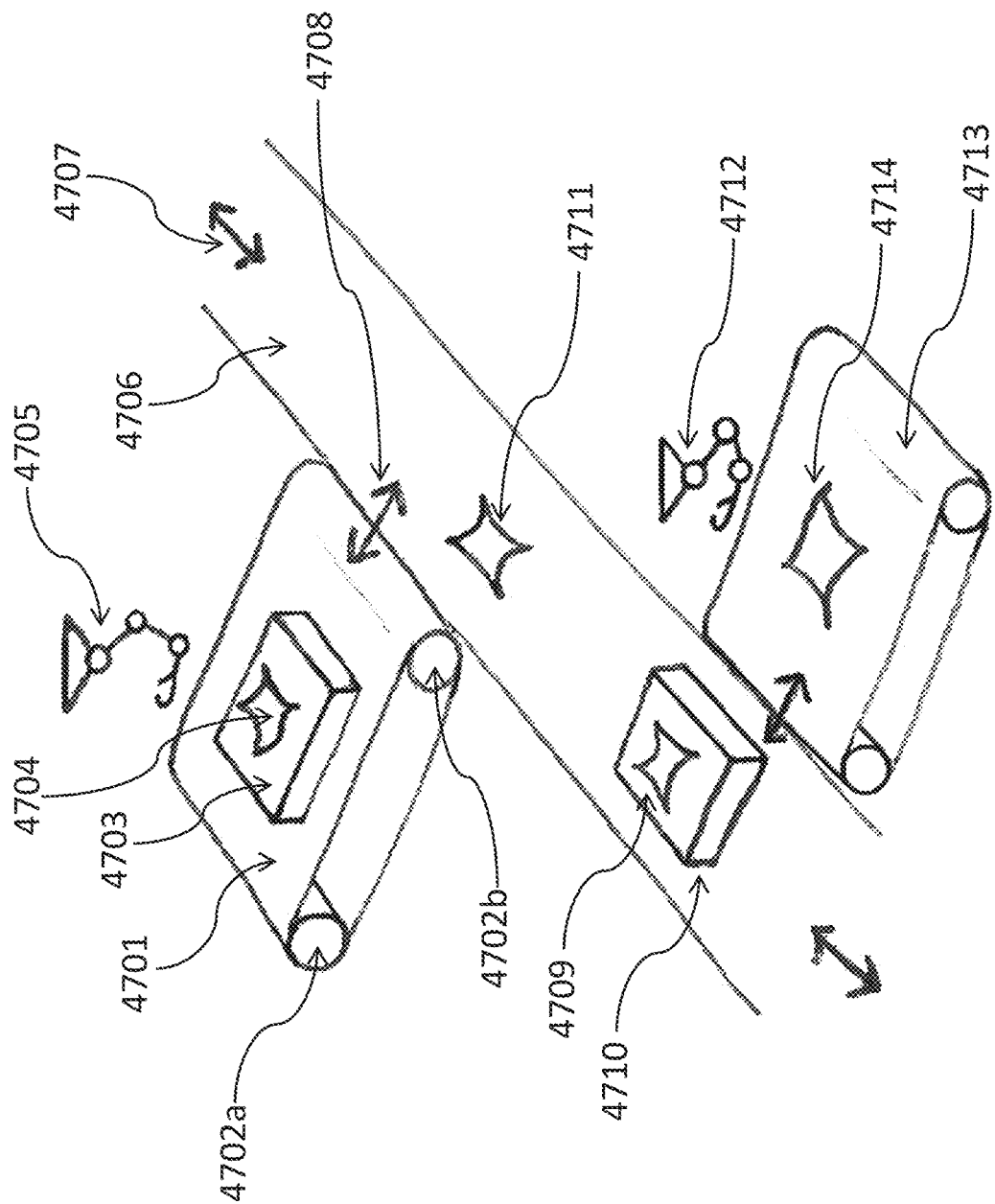
FIG. 46 depicts a diagram of a production line integrating SAM stations, in accordance with an embodiment of the present invention.

SAM systems may be incorporated into a streamlined and automated or semi-automated production line for high-throughput and efficient manufacturing. FIG. 46 is a simple diagram depicting a production line integrating SAM stations. A pillow ground platform 4701 is in the form of a conveyor belt system, with two roller ends 4702a and 4702b. The conveyor belt 4701 may be an elastic sheet material or fabric that can be directly used as a pillow ground for SAM processes. Alternatively, a slab of elastic or spongy material 4703 e.g. polyurethane foam or silicone may be used as a platform for the work in-progress 4704, that rests on or is temporarily anchored (via pins, hook-and-loop fasteners, tape, or magnetic or other temporary attachment) to the conveyor ground platform 4701. A first station 4705 for SAM manufacturing processes is disposed adjacent to another 'bus' conveyor system 4706 that can transport objects back-and-forth or in a single direction along a separate path 4707. Completed or partially completed works in-progress may be transferred 4708 to and from the conveyor/pillow ground platform 4701 of the first SAM station 4705 and the 'bus' conveyor 4706, optionally with assistance from actuators at the respective manufacturing stations. The transfer may transport a work 4709 that is still resting or anchored on a support slab 4710, or may transport isolated works 4711 in various stages of manufacture. The bus conveyor 4706 can then be used to transport the works to other manufacturing, treatment or finishing stations, optionally with assistance from actuators at the respective manufacturing stations. A second SAM station 4712 with a second conveyor belt pillow ground platform 4713 is connected to the bus conveyor 4706, that can send and receive works to and from other manufacturing stations including the first SAM station 4705. Reference numeral 4714 denotes an example of a work in-progress that uses the elastic conveyor belt 4713 as the pillow ground platform.

Figure 47B:
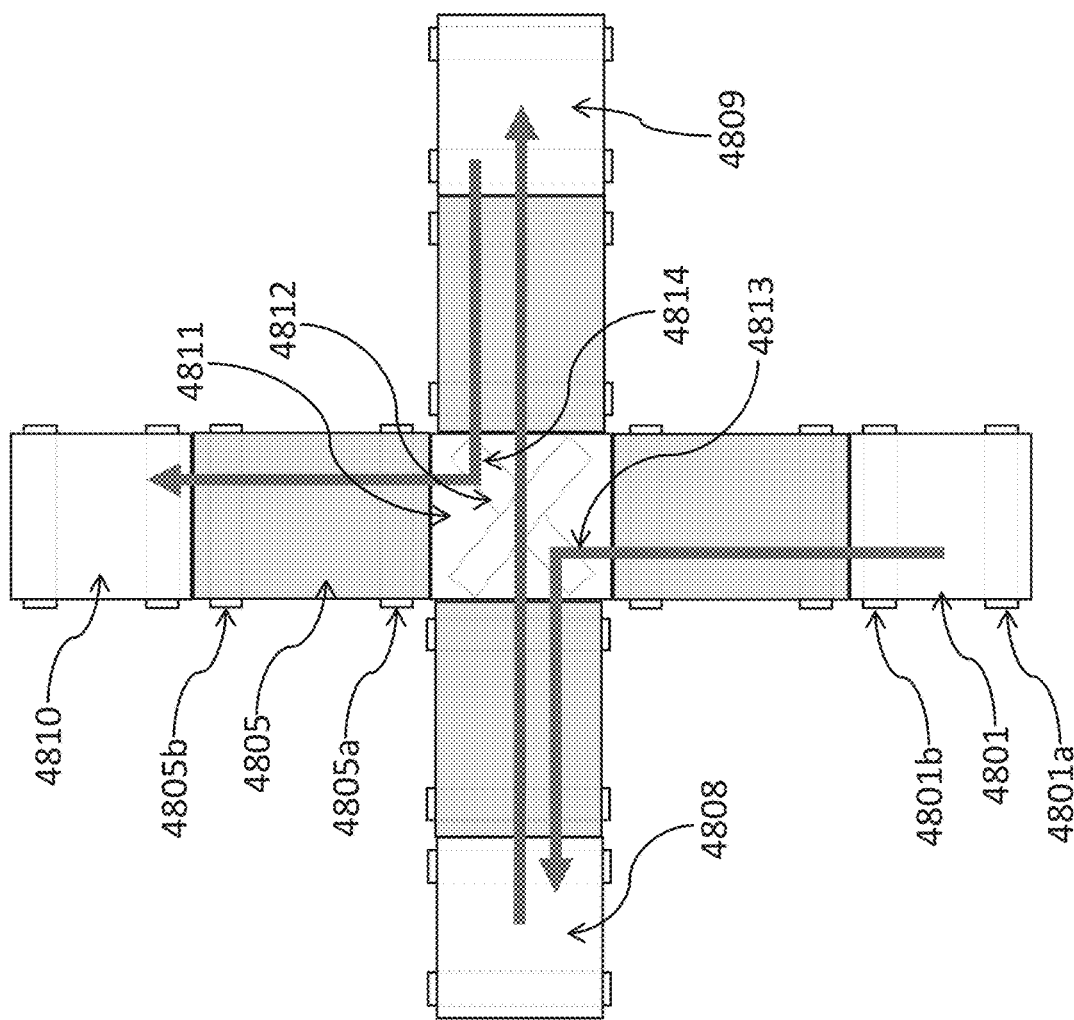
FIG. 47B depicts a diagram of a conveyor topology capable of integrating SAM and other manufacturing stations, in accordance with an embodiment of the present invention.
Figure 47A:
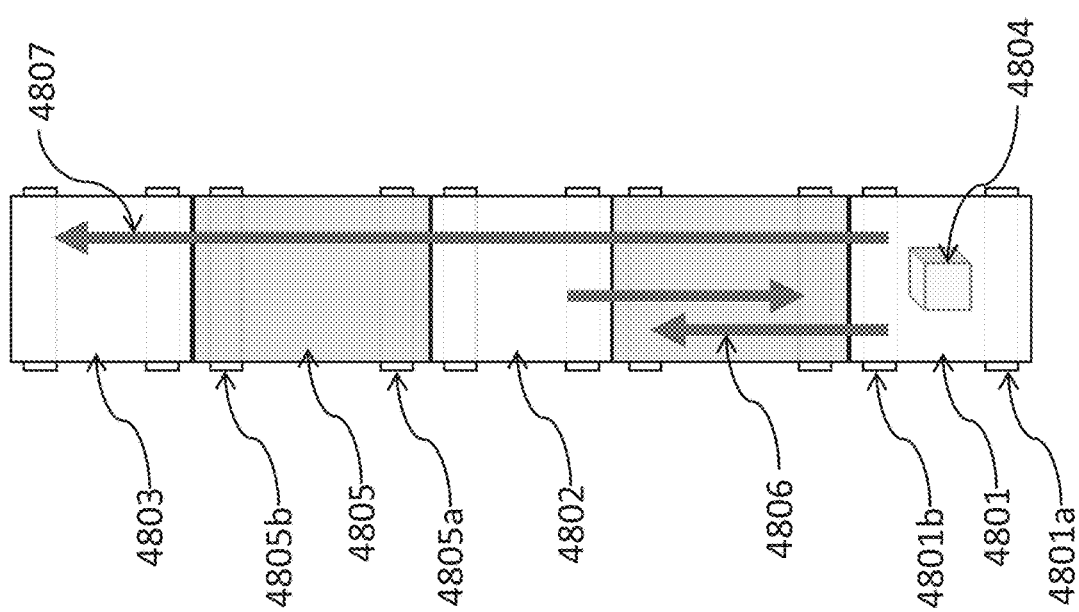
FIG. 47A depicts a diagram of a conveyor topology capable of integrating SAM and other manufacturing stations, in accordance with an embodiment of the present invention.

FIG. 47A is a simplified diagram of an embodiment of a 'serial' conveyor topology capable of integrating SAM and other manufacturing stations. A simplified conveyor belt system 4801 serves as a pillow ground platform for a first SAM or other manufacturing or manipulation station. The pillow ground platform conveyor system 4801 includes two rollers 4801a and 4801b. A second example SAM or other manufacturing station 4802 is depicted, as well as a third example SAM or other manufacturing station 4803. Reference numeral 4804 denotes an example work or work in-progress. Also included is a 'bus' or transporting conveyor system 4805 connecting the multiple manufacturing stations together, and including two rollers 4805a and 4805b. In this example 'serial' conveyor topology, the SAM or other manufacturing stations 4801, 4802 and 4803 are connected by bus conveyors in a series or serial arrangement. Works or works in-progress may be transported between adjacent SAM stations as depicted by the bi-directional arrows 4806, or transported between more distantly separated stations by traversing intermediate stations as depicted by the example arrow 4807. No assisting actuators would be necessary to move a work off or onto a station, as a station's conveyor belt or system can offload or uptake a work onto or from the connecting conveyors of the bus system.

FIG. 47B is a simplified diagram of an embodiment of a 'star' conveyor topology capable of integrating SAM and other manufacturing stations, including manufacturing systems 4801, 4808, 4809 and 4810. In this example 'star' conveyor topology, the SAM or other manufacturing stations 4801, 4808, 4809, and 4810 are connected by bus conveyors to a central redirecting station 4811 that has a redirecting element 4812. The redirecting element may be sets of omni-wheels, orthogonally arranged omni-wheels, a rotating roller table, actuated ball tables, or other multi-directional conveyor system. Works or works in-progress may be transported between any of the connected SAM or other manufacturing stations by offloading to a bus conveyor, redirection by the central station 4811, transport via another conveyor and arrival at a different manufacturing station. For example, the arrow 4813 depicts a work departing station 4801, being conveyed to the redirector 4811, and redirected leftwards to station 4808. In another example, arrow 4814 depicts a work moving from station 4809 to 4810 via the connecting bus conveyors and the central redirector 4812.

The bus or transporting conveyor systems are depicted as having two rollers for visual simplicity. Embodiments of conveyor systems may have two or more rollers with belts, be wheel or ball systems, or other conveyor systems with or without belts. Embodiments of conveyor systems may also follow linear, curved or other circuitous paths, be unidirectional or bidirectional, or be inclined or declined.

The example 'serial' and 'star' conveyor topologies may be combined in various series, parallel, star, tree, ring or other graph permutations to form larger and more complex conveyor topologies.

The various stations in a conveyor topology of a production line may be for example other SAM systems with e.g. different yarn-like build material or build conditions, other manufacturing stations (e.g. FDM, sheet bending, rolling), or heat, chemical or mechanical treatment stations, or packaging, quality control, or other stations.

From Desired 3D Structure to Product of Manufacture

Figure 48:
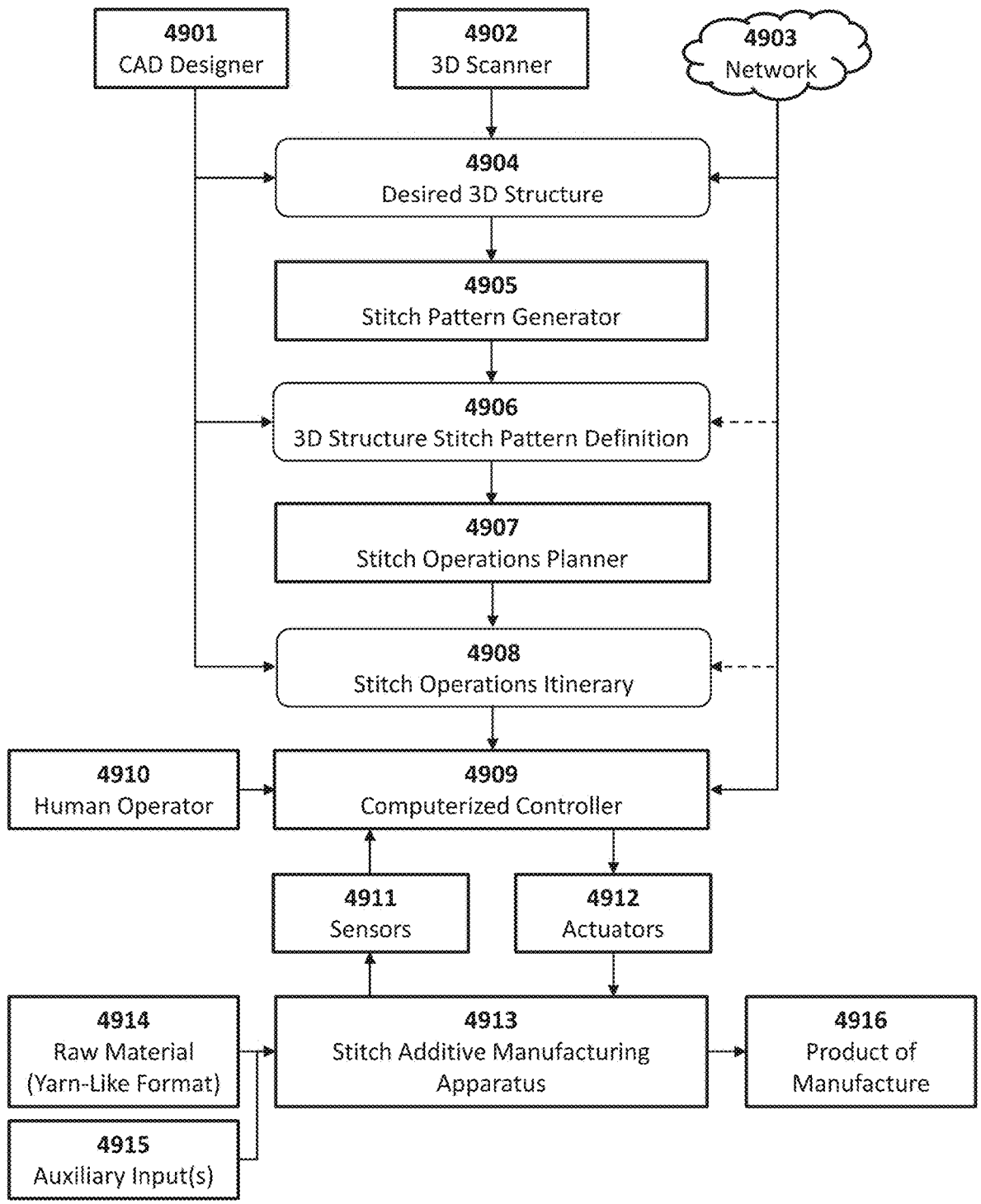
FIG. 48 depicts a diagram overview of the Stitch Additive Manufacturing (SAM) general workflow.

FIG. 48 is a diagram overview of the Stitch Additive Manufacturing (SAM) general workflow. A designer using Computer Aided Design tools (CAD Designer) 4901 is involved in the general SAM workflow by defining a Desired 3D Structure 4904 to be manufactured. In another embodiment, the Desired 3D Structure 4904 can also be defined or extracted by scanning an object using a 3D Scanner 4902. In yet another embodiment, the Desired 3D Structure 4904 data can be received from remote servers and sources over a Network 4903. The Desired 3D Structure 4904 may be represented by data stored in digital media, in Computer Aided Design (CAD) and 3D Modeling formats such as .stl, .iges, .3ds, .dxf, or .obj, in point cloud formats such as .csv, .ply, .pcd, or in any other format for defining 3D structures.

FIG. 48 also depicts the next step in the general workflow, which is to input the Desired 3D Structure 4904 data into a Stitch Pattern Generator 4905 that then outputs a 3D Structure Stitch Pattern Definition 4906. The 3D Structure Stitch Pattern Definition 4906 corresponds to the Desired 3D Structure 4904, but populates or represents the 3D volume with Stitch subunits data. In one embodiment, the 3D Structure Stitch Pattern Definition 4906 may be represented by data stored in digital media, in a format that defines a 3-dimensional array of stitches with associated metadata for each stitch including: stitch 3D coordinate, stitch size, stitch type, stitch 3D orientation, stitch color, stitch material, stitch index, and/or other stitch metadata.

The generation of the 3D Structure Stitch Pattern Definition 4906 by the Stitch Pattern Generator 4905 is in some regards analogous to the generation of voxels, to tessellation of 3D volumes, and to the generation of 3D filled meshes. Analogous algorithms may be applied in the Stitch Pattern Generator 4905 to generate the 3D Structure Stitch Pattern Definition 4906 such as marching cubes, marching tetrahedra, asymptotic decider, 3D contouring and 3D nesting algorithms.

FIG. 48 also depicts the following step in the general workflow, which is to input the 3D Structure Stitch Pattern Definition 4906 into a Stitch Operations Planner 4907 that then outputs a Stitch Operations Itinerary 4908. The Stitch Operations Itinerary 4908 is analogous to a g-code file in Computer Numerical Control (CNC) manufacturing that is a file defining a group and/or sequence of maneuvers and operations for a manufacturing apparatus.

The generation of Stitch Operations Itinerary 4908 by the Stitch Operations Planner 4907 is in some regards analogous to the generation of gcode files for CNC or additive manufacturing tools. Analogous algorithms may be applied in the Stitch Operations Planner 4907 to generate the Stitch Operations Itinerary 4908 such as sweep plane slicing, triangle grouping, incremental slicing, Vatti clipping, polygon offsetting, or other slicing, infill and tool path planning algorithms.

The Stitch Operations Itinerary 4908 for a SAM system has an expanded repertoire of operations compared to a traditional CNC gcode file, including new operations for yarn control: Yarn Dispensing and Retraction, Yarn Tension Control, Yarn Termination; SAM apparatus positioning: Feeder Positioning, Receiver Positioning, Pillow Ground Positioning, Work Manipulation, Work Anchoring, feeder control: Yarn Feeding, Yarn Injection, Loop Infiltration; receiver control: Loop Infiltration, Yarn Receiving, Yarn Pull-Through, Active Loop Holding; and other SAM operations.

In one embodiment, the Stitch Operations Itinerary 4908 may be represented by data stored in digital media, in a format that defines a sequence of operations for example: "1) Feeder Positioning to 'X1Y1Z1' coordinate. 2) Receiver Positioning to 'X2Y2Z2' coordinate. 3) Direct Yarn Receiving. 4) Yarn Pull-Through to 'P' Yarn Tension. 5) Feeder Positioning to 'X3Y3Z3' coordinate. 6) Receiver Positioning to 'X4Y4Z4' coordinate. 7) Yarn Receiving through the Left Loop of Stitch 1. 8) Yarn Pull-Through to 'P' Yarn Tension. 9) Feeder Positioning to 'X5Y5Z5' coordinate. 10) Receiver Positioning to 'X6Y6Z6' coordinate. 11) Yarn Receiving through the Right Loop of Stitch 2. 12) Yarn Pull-Through to 'P' Yarn Tension" . . . and so on.

In some embodiments, the Stitch Operations Itinerary 4908 may define SAM apparatus operations at a lower level of abstraction by declaring absolute positional coordinates, orientations and values as targets or parameters of each operation. In other embodiments, the Stitch Operations Itinerary 4908 may define SAM apparatus operations at a higher level of abstraction by declaring relative positions or movements, such as "Yarn Pull-Through" and "Stitch Setting toward the Left (Negative X-Axis) of the previously made stitch".

FIG. 48 also depicts another next step in the general workflow, which is to input the Stitch Operations Itinerary 4908 into the Computerized Controller 4909. The Computerized Controller 4909 interfaces with the SAM Apparatus 4913 via a set of Sensors 4911 and Actuators 4912. The Computerized Controller 4909 may also interface with a Human Operator 4910 for monitoring, fully automated operation or semi-automated operation. The Computerized Controller 4909 transcribes the Stitch Operations Itinerary 4908 and drives the SAM Apparatus 4913 in the appropriate manner such that Raw Material 4914 and any Auxiliary Inputs 4915 (e.g. partially completed products of manufacture from a different manufacturing station, manufacturing scaffolds, parts of other materials such as metals, plastics etc.) are processed into a final or intermediate Product of Manufacture 4916 that corresponds to the Desired 3D Structure 4904.

FIG. 48 depicts how in one embodiment, the CAD Designer 4901 may define a Desired 3D Structure 4904. In another embodiment, using custom CAD tools the CAD Designer 4901 may directly define part or all of the 3D Structure Stitch Pattern Definition 4906, to have more control over the stitch placements, orientations, types and other stitch properties of the final product. In yet another embodiment, using custom CAD tools the CAD Designer 4901 may directly define part or all of the Stitch Operations Itinerary 4908, to have more control over the stitch layout, surface finish, texture quality and other properties of the final product. Similarly, the Desired 3D Structure 4904, or the lower level 3D Structure Stitch Pattern Definition 4906 and Stitch Operations Itinerary 4908 may be fetched over a Network 4903. The Computerized Controller 4909 may also interface with the Network 4903 for monitoring, control assistance, remote commands or other communications or data transfer.

Figure 49A:
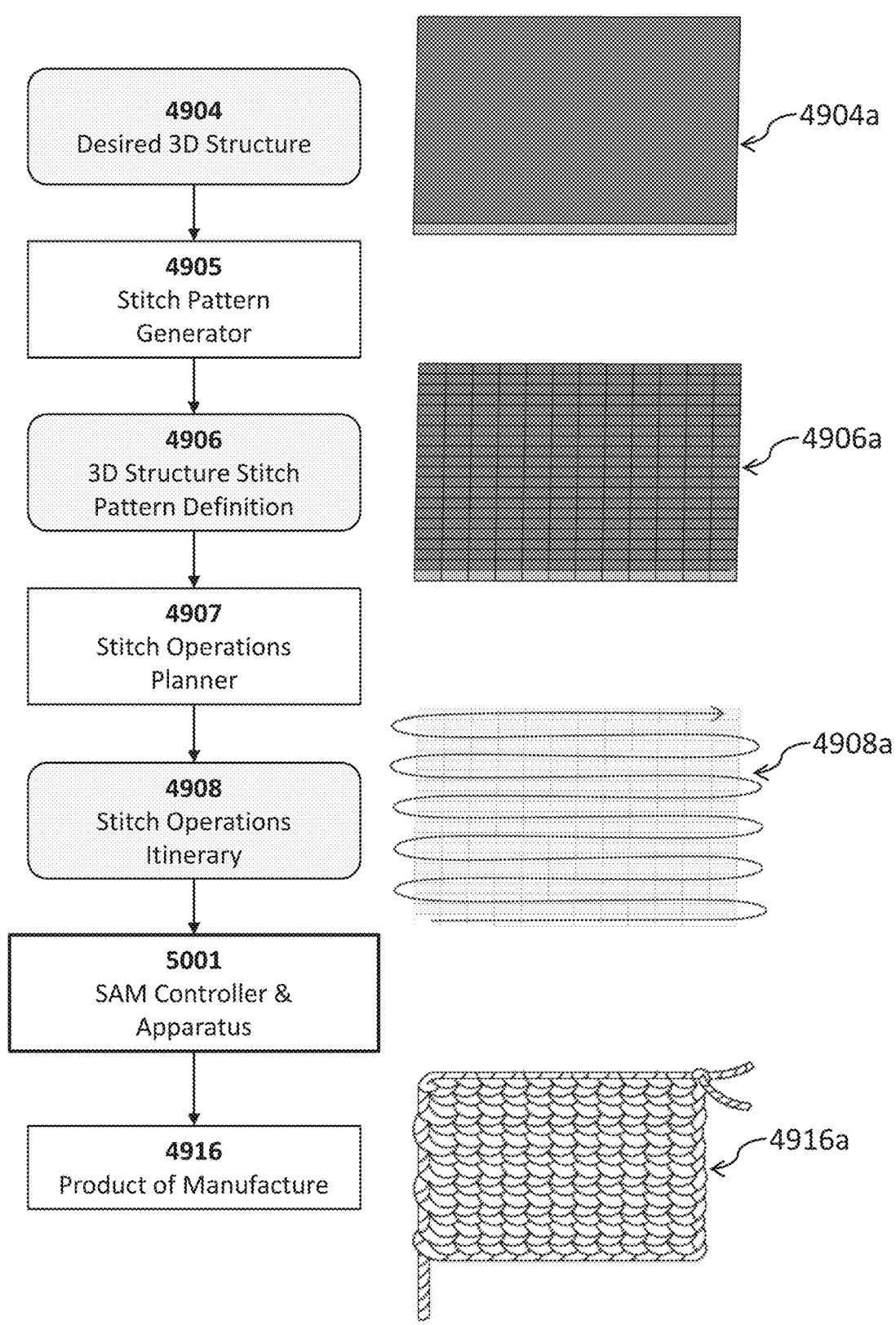
FIG. 49A depicts a diagram of an embodiment of the data representation flow in a SAM process.

FIG. 49A is a simple diagram of an embodiment of the data representation flow of a SAM process. Reference numeral 4904*a* denotes a simple example of a Desired 3D Structure 4904 in the form of a rectangular slab. The Desired 3D Structure 4904 is processed into a 3D Structure Stitch Pattern Definition 4906 by a Stitch Pattern Generator 4905. Reference numeral 4906*a* denotes a simple example of a 3D Structure Stitch Pattern Definition 4906, showing the individual stitches comprising the rectangular slab in the example form of cuboids. The 3D Structure Stitch Pattern Definition 4906 is next processed into a Stitch Operations Itinerary 4908 by a Stitch Operations Planner 4907. Reference numeral 4908*a* denotes a simple example of a Stitch Operations Itinerary 4908, showing the sequence by which the individual stitches are to be created for the rectangular slab. The Stitch Operations Itinerary 4908 is then input into the SAM Controller and Apparatus 5001 components, producing the Product of Manufacture 4916. Reference numeral 4916*a* denotes an example of a product of manufacture in the corresponding form of a rectangular slab.

Figure 49B:
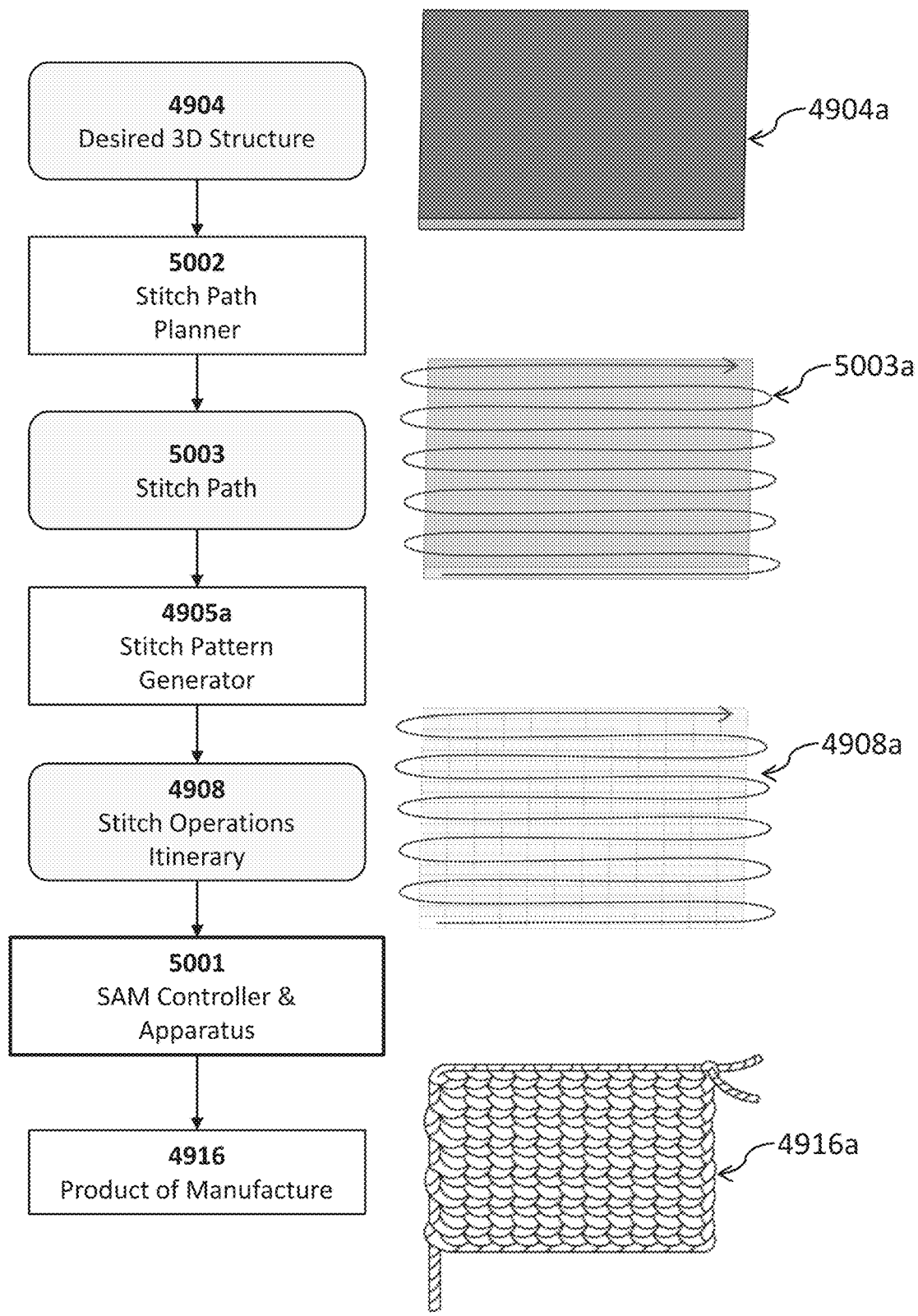
FIG. 49B depicts a diagram of another embodiment of the data representation flow in a SAM process.

FIG. 49B is a simple diagram of another embodiment of the data representation flow of a SAM process. In this embodiment the Desired 3D Structure 4904 is first processed by a Stitch Path Planner 5002 which outputs a Stitch Path 5003 that traverses the 3D volume of the desired structure, without yet defining the individual stitches. Reference numeral 5003*a* denotes a simple example of a Stitch Path 5003 that traverses the volume of the rectangular slab. The Stitch Path 5003 is then processed by a modified Stitch Pattern Generator 4905*a* which outputs the final Stitch Operations Itinerary 4908 containing both the traversal sequence and the individual stitch metadata. Reference numeral 4908*a* denotes a simple example of a Stitch Operations Itinerary 4908, showing the sequence by which the individual stitches are to be created for the rectangular slab. The Stitch Operations Itinerary 4908 is then input into the SAM Controller and Apparatus 5001 components, producing the Product of Manufacture 4916.

Figure 49C:
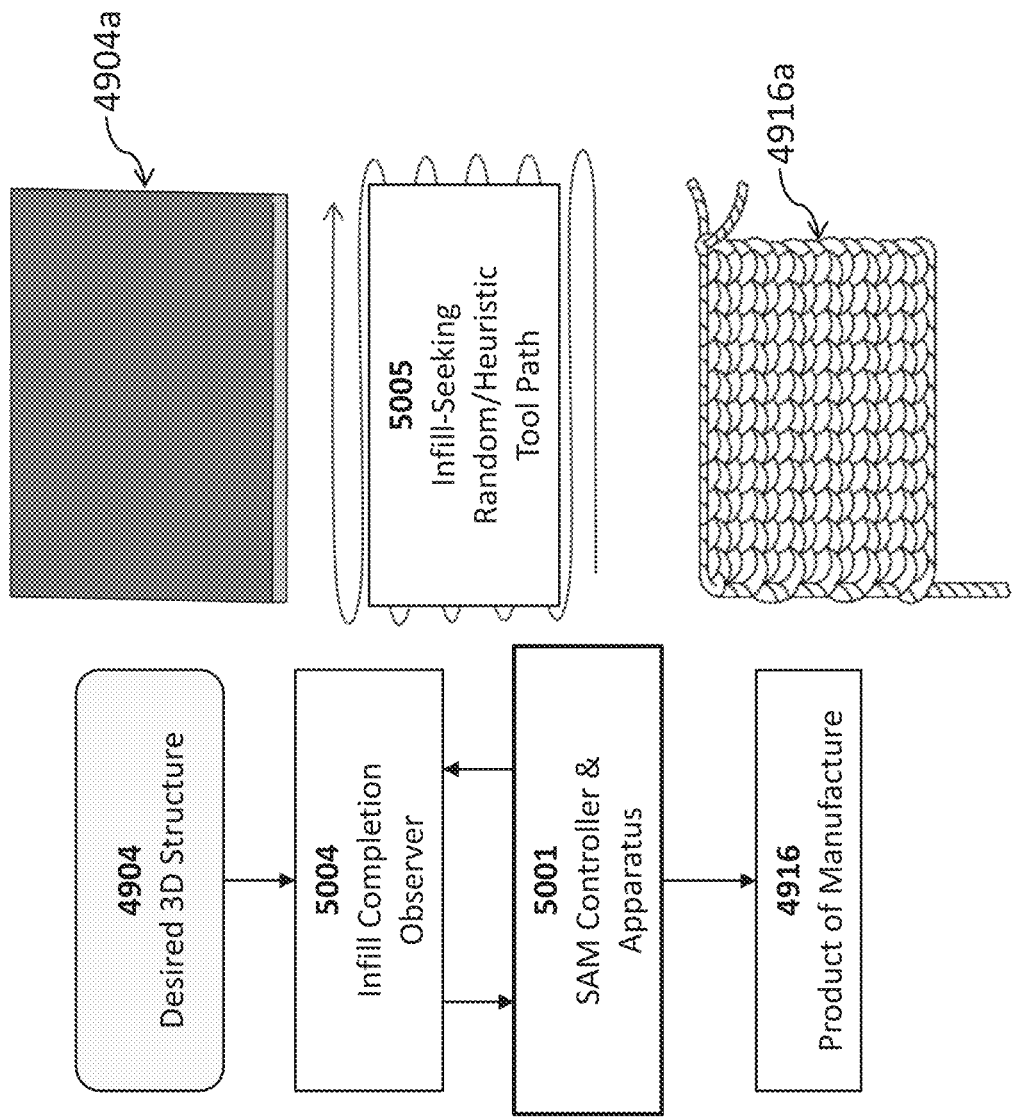
FIG. 49C depicts a diagram of yet another embodiment of the data representation flow in a SAM process.

FIG. 49C is a simple diagram of yet another embodiment of the data representation flow of a SAM process. In this embodiment the Desired 3D Structure 4904 is input into an Infill Completion Observer 5004 and passed on to the SAM Controller and Apparatus 5001 components. No predefined toolpaths or sequence of operation is provided, instead the SAM Controller and Apparatus 5001 begins an Infill-Seeking Random/Heuristic Tool Path 5005: Beginning at a starting point within the Desired 3D Structure 4904 volume, stitches are created in a heuristic pattern (e.g. hatched, back-and-forth or other traversals), gradually filling up the Desired 3D Structure 4904 volume. As the desired volume is filled up with generated stitches, the Infill Completion Observer 5004 monitors the percentage or completion progress of the infill, and provides feedback measures to the SAM Controller and Apparatus 5001. At the completion of this closed loop feedback process, the Desired 3D Structure 4904 is filled with stitch subunits, resulting in the Product of Manufacture 4916.

The different presented embodiments for data representation, processing and workflow of a SAM process may be combined, hybridized or expanded in various permutations.

Apparatus Perception and Control Architecture

FIG. 50 is a simplified schematic of an example SAM system sensors and actuators general configuration. The Computerized Controller 4909 interfaces with the SAM Apparatus 4913 via a set of Sensors 4911 and Actuators 4912. The Computerized Controller 4909 may also interface with a Human Operator 4910 for monitoring, fully automated operation or semi-automated operation.

FIG. 50 depicts a Tanglehead 5101 that can rotate about the vertical axis. The axes 5102 represent a gantry system that can move the Tanglehead 5101 over a horizontal plane. Reference numeral 5103 denotes a Vision or 3D Sensor (e.g. an RGB camera, a stereo camera, a time-of-flight camera or a laser scanner). Reference numeral 5104 denotes an Active Receiver Limb represented by a kinematic chain. Reference numeral 5105 is an example of a Rotary Actuator that is part of the kinematic chain of the Active Receiver Limb 5104. Reference numeral 5106 denotes an example of a Position Sensor or Encoder (e.g. optical encoders, hall sensors, feedback sensors, stepper counters, strain gages, accelerometers, gyroscopes, or piezoelectric sensors) on the Rotary Actuator 5105. Reference numeral 5107 denotes an example of the end effector of the Active Receiver Limb 5104 comprising a latch hook structure.

Reference numeral 5108 denotes an Active Feeder Limb represented by a kinematic chain. Reference numeral 5109 denotes an example of a Rotary Actuator that is part of the kinematic chain of the Active Feeder Limb 5108. Reference numeral 5110 denotes an example of a Position Sensor or Encoder (e.g. optical encoders, hall sensors, feedback sensors, strain gages, accelerometers, gyroscopes, or piezoelectric sensors) on the Rotary Actuator 5109. Reference numeral 5111 denotes an example of an end effector of the Active Feeder Limb 5104 comprising a tusk structure. The Tusk End Effector 5111 can also house or attach Proximity, Tactile Feedback or Other Sensors (e.g. capacitive sensors, resistive sensors, sonar sensors, air chamber resonance sensors, optical sensors, whisker strain gage sensors or soft collision sensors). Reference numeral 5112 denotes an example of another end effector of the Active Feeder Limb 5104 comprising an active feeder. Reference numeral 5113 denotes the working yarn. Reference numeral 5114 denotes an example of a work in progress, comprising a collection of interlinked set stitches in the form of an L-shaped structure.

Figure 51:
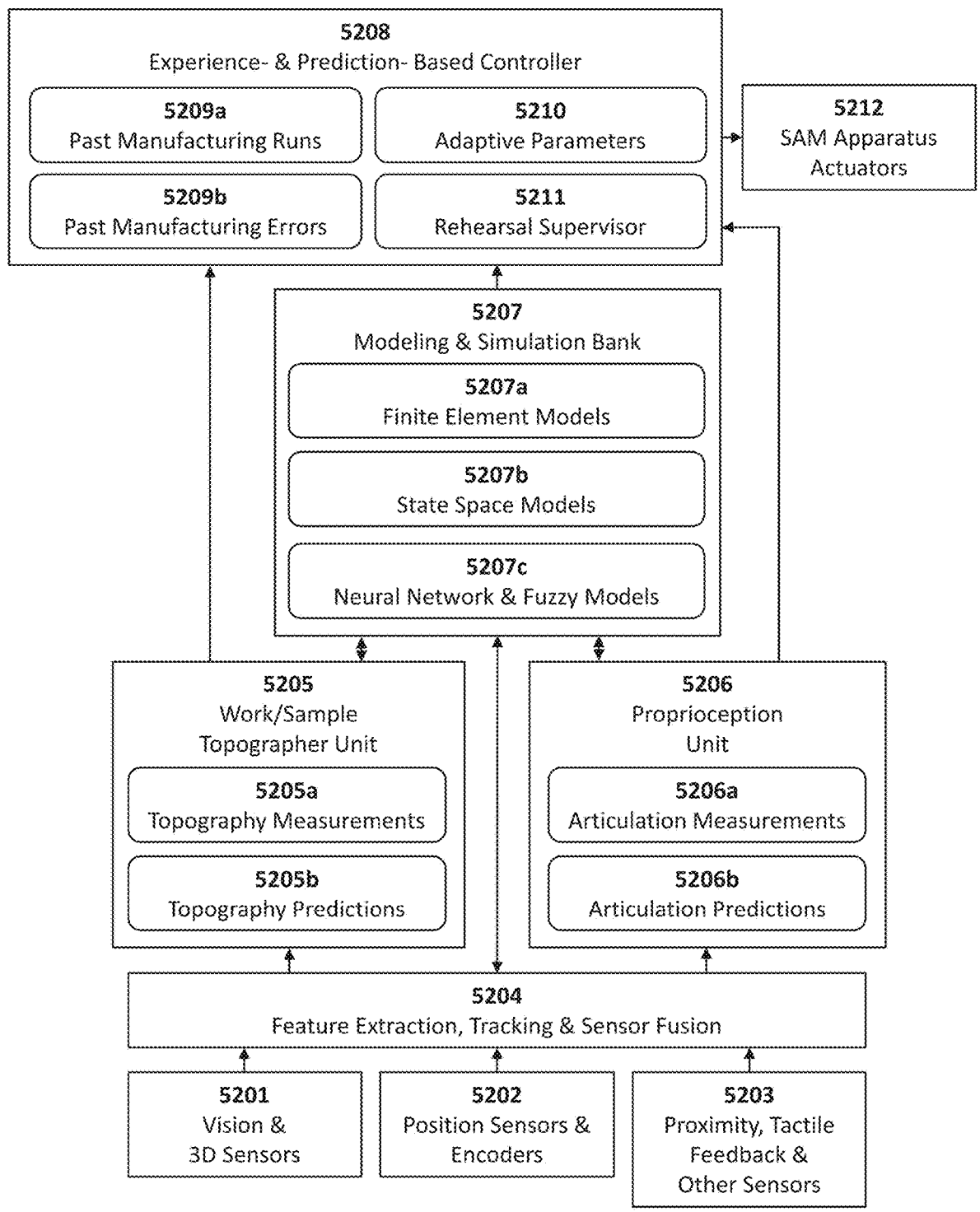
FIG. 51 depicts a diagram of a SAM system perception and control general architecture.

FIG. 51 is a diagram of a SAM system perception and control general architecture. The input to the perception and control system comprises the data from various sensor modules. Vision and 3D Sensors 5201 (e.g. RGB cameras, stereo cameras, time-of-flight cameras, laser scanners or other sensors) capture data of 3D structures such as the work in progress, the 3D position and orientation of the SAM apparatus limbs, and other structures in the work volume. There may be one or more Vision and 3D Sensors 5201, attached to the Tanglehead, the Build Frame, an articulating limb or other structure on the SAM apparatus. Position Sensors and Encoders 5202 (e.g. optical encoders, hall sensors, feedback sensors, stepper counters, strain gages, accelerometers, gyroscopes, or piezoelectric sensors) capture data on the absolute or relative position and/or orientation of structures relative to each other (e.g. relative angle between two rigid links, or displacement of the Tanglehead along a gantry axis). There may be one or more Position Sensors and Encoders 5202 on some or all of the fixed, or absolutely or relatively moving structures of the SAM apparatus to measure the displacements and motions of the moving parts. Proximity, Tactile Feedback and Other Sensors 5203 (e.g. capacitive sensors, resistive sensors, sonar sensors, air chamber resonance sensors, optical sensors, whisker strain gage sensors or soft collision sensors) capture data on the proximity, collision events, or other kinematic states of one structure relative to another structure. There may be one or more Proximity, Tactile Feedback and Other Sensors 5203 on some or all of the fixed, or absolutely or relatively moving structures of the SAM apparatus.

Referring to FIG. 51, the raw sensor data is then processed through various Feature Extraction, Tracking and Sensor Fusion 5204 operations. Feature Extraction may involve the identification of individual stitches, specific articulation limbs, or specific end effectors, using the images from the Vision and 3D Sensors 5201. Feature Tracking may involve the spatial localization and tracking over time of the identified features such as stitches, specific articulation limbs, or specific end effectors. Sensor Fusion may involve Kalman filtering, Bayesian networks, convolutional neural networks, regularization, denoising or other signal processing operations to aggregate the sensor data from the Vision and 3D Sensors 5201, Position Sensors and Encoders 5202 and Proximity, Tactile Feedback and Other Sensors 5203 into more accurate or precise measurements of the actual physical state of the SAM apparatus.

Referring still to FIG. 51, the processed sensor data 5204 is then input into a Work/Sample Topographer Unit 5205. The function of the Work/Sample Topographer Unit 5205 is to provide an accurate representation of the physical state of the work in progress. This includes inferring from the processed sensor data a set of Topography Measurements 5205*a* that define the 3D morphology of the work in progress e.g. 3D positions of the constituent stiches. During operation, the SAM system and the work sample is in dynamic motion. The Work/Sample Topographer Unit 5205 can also provide Topography Predictions 5205*b* e.g. predicted 3D positions of the stiches at a future point in time by extrapolating system models.

The processed sensor data 5204 is also input into a Proprioception Unit 5206. The function of the Proprioception Unit 5206 is to provide an accurate representation of the physical state of the SAM apparatus, including the absolute and relative positions of the relevant fixed and moving parts e.g. the Tanglehead, Build Frame, Pillow Ground and the various articulating limbs. This includes inferring from the processed sensor data a set of Articulation Measurements 5206*a* that define the 3D position and orientation of the apparatus components. The Proprioception Unit 5206 can also provide Articulation Predictions 5206*b* e.g. predicted 3D positions and orientations of the dynamically moving parts of the SAM apparatus at a future point in time by extrapolating system models.

Referring again to FIG. 51, a Modeling and Simulation Bank 5207 may take input from the Processed Sensor Data 5204, and also exchange data with the Work/Sample Topographer Unit 5205 and the Proprioception Unit 5206. The function of the Modeling and Simulation Bank 5207 is to provide an array of mathematical models of the SAM system comprising models of the physical state of the apparatus and the work in progress. The goal of the mathematical models is to obtain accurate information of the past, current and predicted future positions, orientations and other physical states of the apparatus and work in progress, so that correct motion control and manufacturing maneuvers can be executed. An array of one or more mathematical models can be used and the results from each model weighted and aggregated based on various measures of confidence, reliability, variance or other priors. The different mathematical models may include Finite Element Models 5207*a* such as numerical models of discretized representations of the work sample and/or the SAM apparatus; State Space Models 5207*b* such as Linear Time Invariant, Linear Time Varying, or other models that represent the work sample and/or the SAM apparatus as a collection of state variables with governing equations, constraints, inputs and outputs; and Neural Network and Fuzzy Models 5207*c* that represent the work sample and/or the SAM apparatus as a black box that receives inputs and produces outputs according to behaviors that can be trained or asymptotically approximated from training datasets comprising actual and/or simulated system inputs and outputs. Other mathematical model types, combinations or hybrids can also be applied.

Referring still to FIG. 51, an Experience- and Prediction-Based Controller 5208 may receive input from the Modeling and Simulation Bank 5207, the Work/Sample Topographer Unit 5205 and the Proprioception Unit 5206. The function of the Experience- and Prediction-Based Controller 5208 is to drive the SAM Apparatus Actuators 5212 in a correct set of operations, to correctly produce a Product of Manufacture that sufficiently conforms (within manufacturing tolerance) to the Desired 3D Structure.

For rapid operation, the Experience- and Prediction-Based Controller 5208 stores (or receives over the network) and utilizes data from previous or related manufacturing runs, analogous to muscle and temporal memory of biological systems. Past Manufacturing Runs 5209*a* and Past Manufacturing Errors 5209*b* are utilized to more rapidly manufacture a new or similar product of manufacture. Many copies of a product of manufacture e.g. a shoe design, will usually be produced by the same or similar SAM apparatus. The sequence of operations for each manufacturing run will thus be very similar, with deviations due to fluctuations in operating conditions (e.g. temperature, humidity, wear and tear, friction) and material (e.g. variations in yarn dimensions or flexibility). The SAM system can rapidly repeat past operations based on Past Manufacturing Runs 5209*a* and Past Manufacturing Errors 5209*b*, while correcting for deviations in real time using measurements and predictions from the Modeling and Simulation Bank 5207, the Work/Sample Topographer Unit 5205 and the Proprioception Unit 5206. Adaptive Parameters 5210 can be used to encapsulate the short-term deviations of the system e.g. parameters of temperature, humidity, friction and effective inertia of the various joints and bearings of the apparatus, where these parameters can be updated using the data from the Modeling and Simulation Bank 5207, the Work/Sample Topographer Unit 5205 and the Proprioception Unit 5206.

The Experience- and Prediction-Based Controller 5208 is a high-level controller that can also include a Rehearsal Supervisor 5211 that can initiate practice activities analogous to practicing to gain muscle memory in a biological system. Before beginning a manufacturing run, or during idle periods, the Rehearsal Supervisor 5211 may determine that certain Adaptive Parameters 5210 are outdated, fall below a confidence threshold, or are undefined relative to a new set of Desired 3D Structure or Stich Operation Itinerary. The Rehearsal Supervisor 5211 may then initiate a series of operations by the SAM Apparatus Actuators 5212, such that during these operations sensor data is collected, and the Adaptive Parameters 5210 can be updated using input from the Modeling and Simulation Bank 5207, the Work/Sample Topographer Unit 5205 and the Proprioception Unit 5206. Data from the practice/rehearsal runs can also be stored and utilized as part of Past Manufacturing Runs 5209*a* and Past Manufacturing Errors 5209*b*.

Figure 52A:
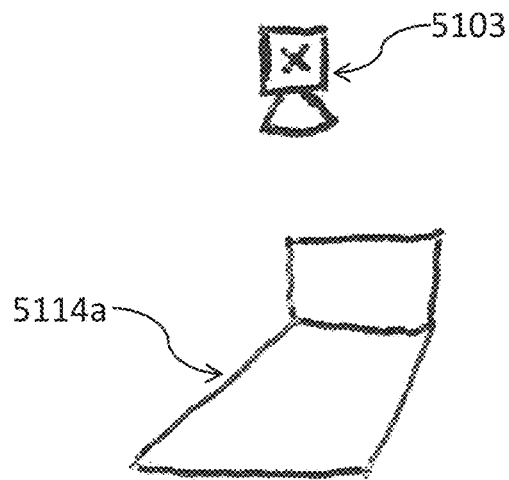

FIG. 52A is a simple diagram depicting work/sample topography sensing. Reference numeral 5103 denotes an example of a Vision or 3D Sensor (e.g. RGB cameras, stereo cameras, time-of-flight cameras, laser scanners or other sensors). Reference numeral 5114*s* denotes an example of a work in progress, comprising a collection of interlinked set stitches in the form of an L-shaped structure.

Figure 52B:
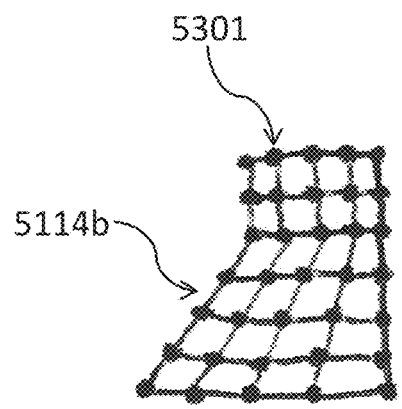

FIG. 52B is a simple diagram depicting the output of work/sample topography sensing, or the output of the Work/Sample Topographer Unit 5205. Reference numeral 5114*b* denotes an example of the extracted/estimated sample topography, comprising information of Nodes 5301 (corresponding to e.g. stitches, physical locations, fiducials, or other identifiable features on the work in progress) including node position, node connections, node relations to adjacent nodes, node velocity and acceleration, connection elasticity and flexibility, and other node information. The information of the Nodes 5301 in the sample topography may be represented by a 3D mesh, 3D matrix, voxel database or other data formats.

Figure 52C:
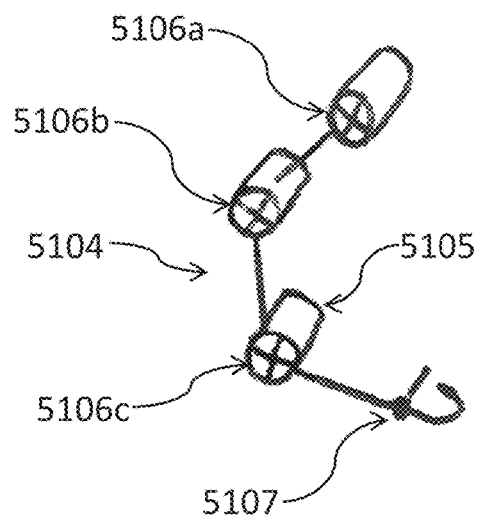

FIG. 52C is a simple diagram depicting an example of apparatus articulation sensing. Reference numeral 5104 denotes an Active Receiver Limb represented by a kinematic chain. Reference numeral 5105 (with cylinder) denotes one of three rotary actuators that are part of the kinematic chain of the Active Receiver Limb 5104. Reference numerals 5106*a*, 5106*b* and 5106*c* (with 'X') denote Position Sensors or Encoders (e.g. optical encoders, hall sensors, feedback sensors, stepper counters, strain gages, accelerometers, gyroscopes, or piezoelectric sensors) on the three rotary actuators. Reference numeral 5107 denotes an example of the end effector of the Active Receiver Limb 5104 comprising a latch hook structure. As the output angle of each rotary actuator changes, the relative position and orientation of the links on the Active Receiver Limb 5104 change. The final positions and orientations of the End Effector 5107 and each link are defined by the rotation angles (measured by the sensors 5106*a*, 5106*b* and 5106*c*) at the three joints.

Figure 52D:
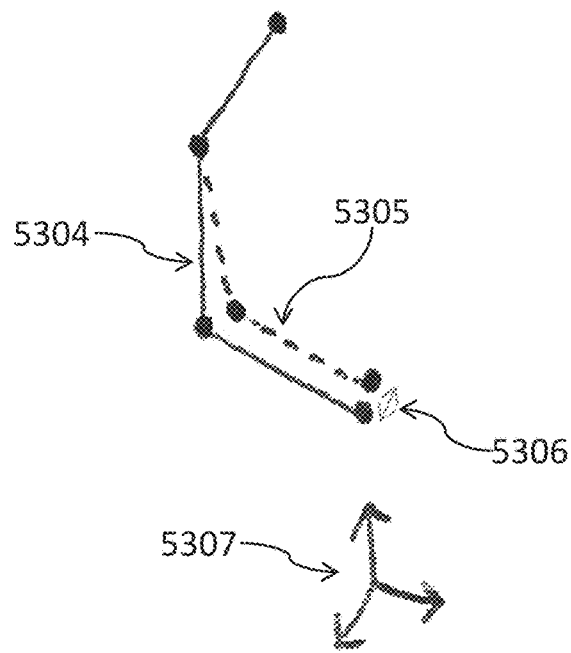

FIG. 52D is a simple diagram depicting the output of apparatus proprioception, or the output of the Proprioception Unit 5206. Reference numeral 5304 denotes an example of the estimated articulation state of the Active Receiver Limb 5104, comprising information of the position and orientation of each joint and link in the limb structure, with reference to a Coordinate System 5307. Reference numeral 5305 (with dotted lines) denotes a depiction of the 'true' articulation state of the actual Active Receiver Limb 5104. Reference numeral 5306 denotes the error between the estimated and the true position of the end effector node. Where the Limb 5104 is visible to other sensors e.g. Vision or 3D Sensors, more data is available to infer or estimate the articulation state of the Limb 5104, and sensor fusion from different sensors can reduce the estimation error 5306.

Referring to FIGS. 48 and 51, the perception and control system of a SAM unit can be fully automated or semi-automated. In a fully automated SAM unit, minimal or no Human Operator 4910 input is required. Instead, the Computerized Controller 4909 may receive the Stitch Operations Itinerary 4908, the 3D Structure Stitch Pattern Definition 4906, or the Desired 3D Structure 4904 (and implicitly perform the functions of e.g. the Stich Pattern Generator 4905 and/or the Stitch Operations Planner 4907), and drive the SAM Apparatus 4913 in an automated process.

In one embodiment of a semi-automated SAM unit, some Human Operator 4910 input may be required, with the Computerized Controller 4909 functioning as an efficiency tool. For example, the Human Operator 4910 may initiate a command to manufacture a sheet of stitches, followed by a circular wall of stitches, followed by a hollow structure of stitches. The Computerized Controller 4909 in such a semi-automated SAM unit will receive the high level commands and perform the low-level stitch formation operations.

In another embodiment of a semi-automated SAM unit, the Human Operator 4910 may initiate lower-level commands e.g. instruct that a stitch be formed at a specific location at some or each step of the manufacturing process, making use of visual feedback, 2D or 3D displays, haptic feedback, virtual or augmented reality displays, telemetry, teleoperation or other monitoring, maneuvering or feedback tools. The Computerized Controller 4909 facilitates the execution of the lower-level commands by e.g. providing smooth, accurate, rapid and repeatable motion of the SAM apparatus.

In yet another embodiment of a semi-automated SAM unit, the Human Operator 4910 may initiate lower-level commands, or even manually operate the SAM Apparatus 4913 for part or all of a manufacturing run for a Product of Manufacture 4916. The manufacturing run data is then recorded by the Experience- and Prediction-Based Controller 5208, in the Past Manufacturing Runs 5209a and Past Manufacturing Errors 5209b database. Future manufacturing runs of the same or similar Product of Manufacture 4916 may then be fully or semi-automated, using the initial manufacturing run data as a reference, baseline or training dataset for the Computerized Controller 4909.

Stitch Additive Manufacturing Ecosystem

Figure 53:
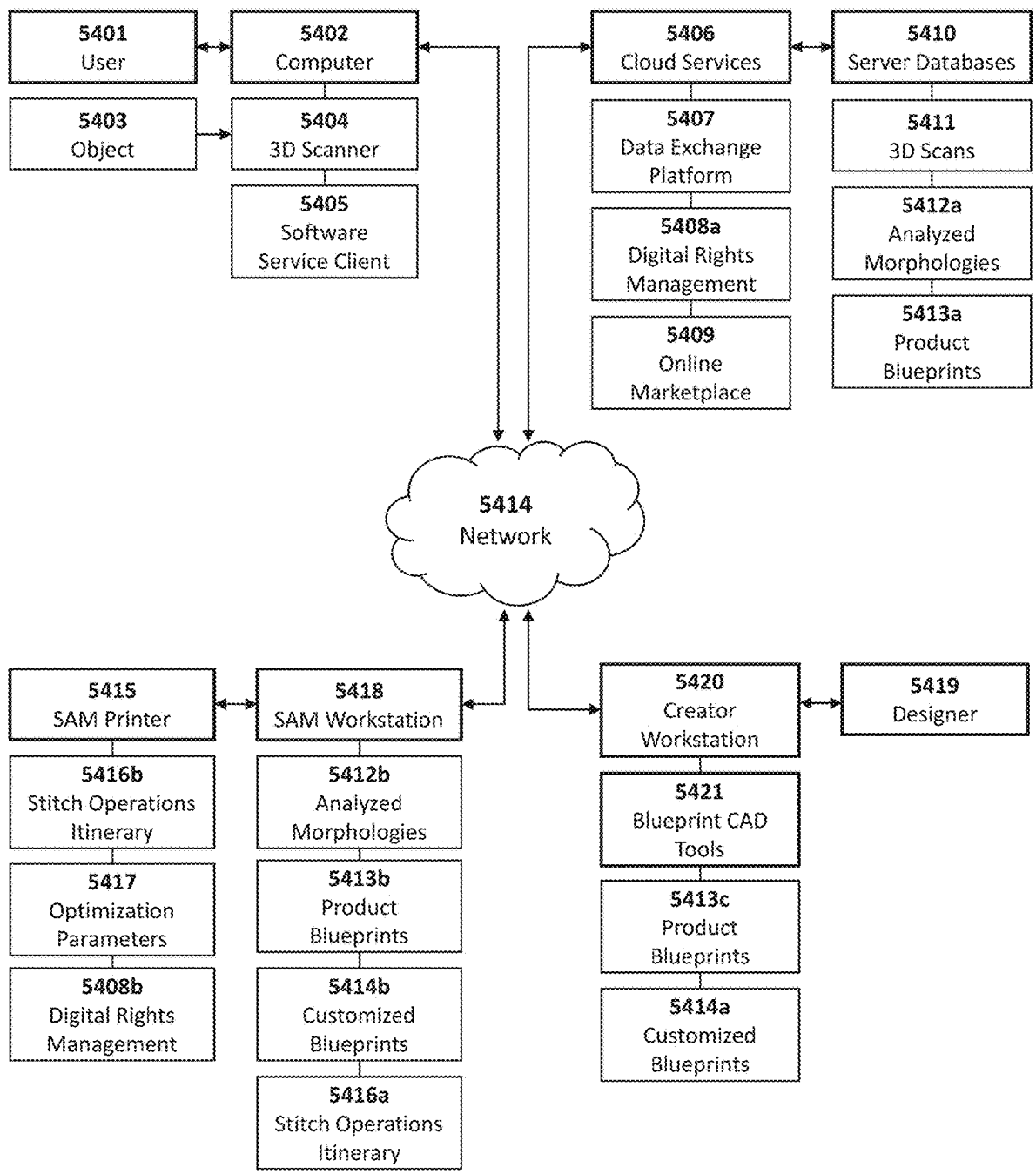

FIG. 53 is a simplified diagram of a SAM general ecosystem workflow. Within a SAM economic ecosystem, various entities interact and exchange services and physical or digital goods. A User 5401 entity may be a mass consumer. The User 5401 may possess or interact with a Computer 5402. The Computer 5402 may be interfaced with a 3D Scanner 5404 that can extract the morphology of physical Objects 5403. The User 5401, through the Computer 5402 and 3D Scanner 5404 may interface with a Software Service Client 5405. The Computer 5402 using protocols in the Software Service Client 5405 may then interface with other entities through a Network 5414 (e.g. an intranet or the world wide web via Wi-Fi, Ethernet, Bluetooth or other communication methods).

Also interfacing with the Network 5414 is one or more Cloud Services 5406. The Could Services 5406 may include a Data Exchange Platform 5407 that standardizes, facilitates and/or mediates the communication and exchange of information between SAM ecosystem entities across the Network 5414; Digital Rights Management 5408a systems that certify, secure and/or facilitate transfer of digital information ownership, rental or other transactions; an Online Marketplace 5409 where entities may discover, curate, sell, purchase, rent or otherwise transact digital information related to the SAM ecosystem. Interfacing with and supporting the Could Services 5406 is one or more Server Databases 5410. The Server Databases 5410 may store and retrieve 3D Scans 5411 of physical objects; Analyzed Morphologies 5412a i.e. processed information of the shape, structure and other features of the 3D Scans or other 3D objects; and Product Blueprints 5413a i.e. digital information related to manufacturing a Product of Manufacture, which may include a Desired 3D Structure 4904, a 3D Structure Stitch Pattern Definition 4906, and/or a Stitch Operations Itinerary 4908 or related digital information.

Also interfacing with the Network 5414 is one or more SAM Workstation(s) 5418, which may be a desktop, a laptop, an embedded computer or other computing device. The SAM Workstation 5418 may digitally store and manipulate Analyzed Morphologies 5412b, Product Blueprints 5413b, Customized Blueprints 5414b and Stich Operation Itineraries 5416a. Interfacing with the SAM Workstation 5418 is one or more Sam Printer(s) 5415, comprising the Computerized Controller 4909 and the entire SAM Apparatus 4913 including Sensors 4911 and Actuators 4912. The SAM Printer 5415 may digitally store and utilize Stitch Operation Itineraries 5416b; Optimization Parameters 5417 i.e. SAM unit or Product of Manufacture specific instructions or modifications of procedure, algorithm or heuristics to improve or otherwise tweak manufacturing operation; and a Digital Rights Management 5408b client that ensures ownership rights are verified for each Product Blueprint and/or Product of Manufacture.

Also interfacing with the Network 5414 is one or more Creator Workstation(s) 5420 which may be a desktop, a laptop, an embedded computer or other computing device. Designer 5419 entities may operate the Creator Work station(s) 5420 to use Blueprint CAD Tools 5421 that facilitate the creation of Product Blueprints 5413c i.e. digital information related to manufacturing a Product of Manufacture, which may include a Desired 3D Structure 4904, a 3D Structure Stitch Pattern Definition 4906, and/or a Stitch Operations Itinerary 4908 or related digital information; and the modification of existing Product Blueprints 5413c into Customized Blueprints 5414a. The designed Product Blueprints 5413c and Customized Blueprints 5414a may be shared over the Network 5414.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Detailed Description of the Steps Depicted in FIGS. 5A-5N

FIG. 5A depicts nine set stitches or "subunits" forming a 3-by-3 array (shaded in darker gray), spanning the two orthogonal horizontal directions "X" and "Y". These nine set stiches will be here called the "first layer". Reference numeral 509a denotes the ninth stitch of the first layer. Reference numeral 510a denotes the active loop that will next form the first stitch of the second layer in the "Z" direction. FIG. 5B depicts a corresponding symbolic representation of the structure in FIG. 5A. The cuboid 509b corresponds to the ninth stitch of the first layer 509a. The cuboid 510b corresponds to the active loop 510a. The nine shaded cuboids forming a planar first layer in FIG. 5B corresponds to the nine shaded stitches forming a planar first layer in FIG. 5A. In FIG. 5B the arced lines (for clarity only an example 598 is directly labeled) depicts the interlinks between stitches of the first layer, where each stitch has an interlink with each neighboring stitch on the horizontal plane spanned by "X" and "Y". Each interlink also denotes that a new stitch traversed each of the interlinked previous stitches during the new stitch's formation. Reference numeral 599 denotes the path of traversal for the formation and setting of stitches on the first layer.

As depicted in FIG. 5A the next step of this exemplary process is to draw a section of the working yarn 500 under the right loop of the ninth set stitch of the first layer 509a and then under the active loop 510a in a pull-through/traversal, biasing the yarn towards the negative "X" direction.

Figure 5C:
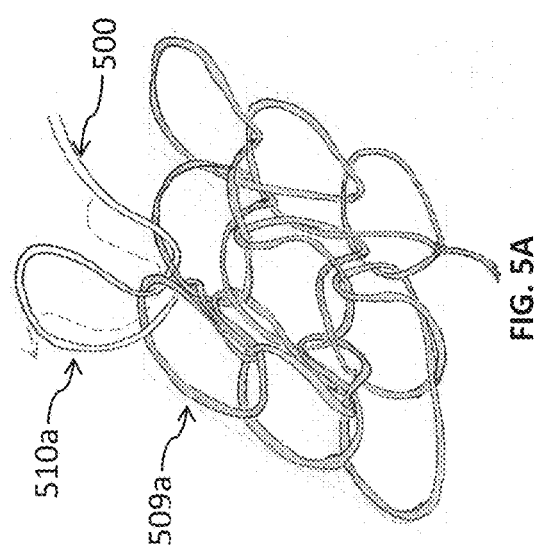
FIG. 5C depicts interlinking stitching subunits in two planes.

FIG. 5C depicts the result of said pull-through/traversal. A new active loop 511a has been formed that is interlinked to the previous stitch 510a. The stitch 510a is positioned on top of (with respect to the Z-axis) the stitch 509a of the first layer. The stitch 510a forms the first stitch of a "second layer" that extends the structure in the Z-direction. Because the working yarn has traversed through the ninth stitch of the first layer 509a, this first stitch of the second layer 510a is also interlinked in the Z-direction. FIG. 5D depicts a corresponding symbolic representation of the structure in FIG. 5C. The cuboid 511b corresponds to the active loop 511a, the cuboid 510b corresponds to the first stitch of a "second layer" 510a, and the cuboid 509b corresponds to the ninth stitch of the first layer 509a. The arced lines (for clarity only a subset is depicted and only an example denoted by reference numeral 598 is directly labeled) illustrate the interlinks between stitches also in the Z-direction.

As depicted in FIG. 5C the next step of this exemplary process is to draw a section of the working yarn 500 under the right loop of the eighth set stitch of the first layer 508a and then under the active loop 511a in a pull-through, biasing the yarn towards the negative "X" direction. Traversing the working yarn through a stitch on the first layer (508a) creates another interlink that binds the first layer and second layer.

Figure 5E:
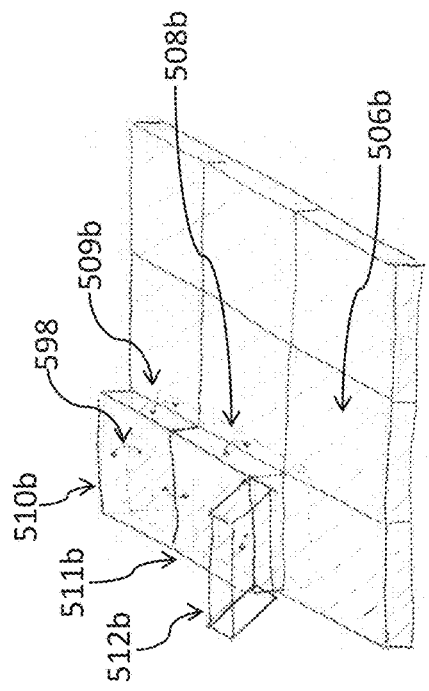
FIG. 5E depicts interlinking stitching subunits in two planes.
Figure 5F:
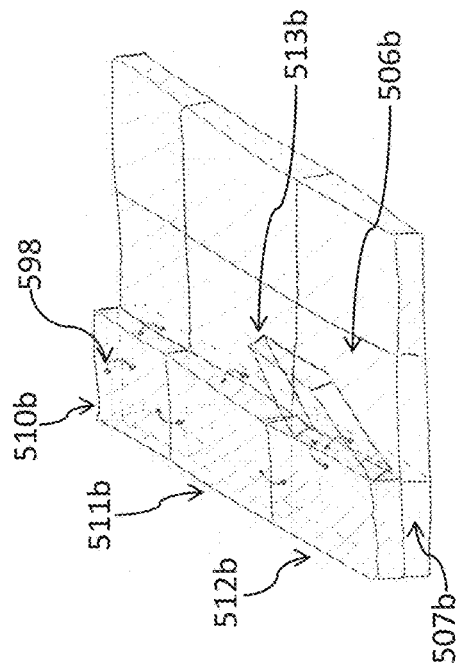
FIG. 5F depicts a cuboid representation of FIG. 5E.

FIG. 5E depicts the result of said pull-through/traversal. A new active loop 512a has been formed that is interlinked to the previous stitch 511a. The previous (now set) stitch 511a is positioned on top of (with respect to the Z-axis) the stitch 508a of the first layer. The stitch 511a forms the second stitch of a second layer that extends the structure in the Z-direction and negative X-direction. Because the working yarn has traversed through the eighth stitch of the first layer 508a, this second stitch of the second layer 511a is also interlinked in the Z-direction. FIG. 5F depicts a corresponding symbolic representation of the structure in FIG. 5E. The cuboid 512b corresponds to the active loop 512a, the cuboid 511b corresponds to the second stitch of the second layer 511a, and the cuboid 508b corresponds to the eighth stitch of the first layer 508a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

As depicted in FIG. 5E the next step of this exemplary process is to draw a section of the working yarn 500 under the left loop of the sixth set stitch of the first layer 506a and then under the active loop 512a in another pull-through. Traversing the working yarn through a stitch on the first layer (506a) creates another interlink that binds the first layer and second layer.

Figure 5G:
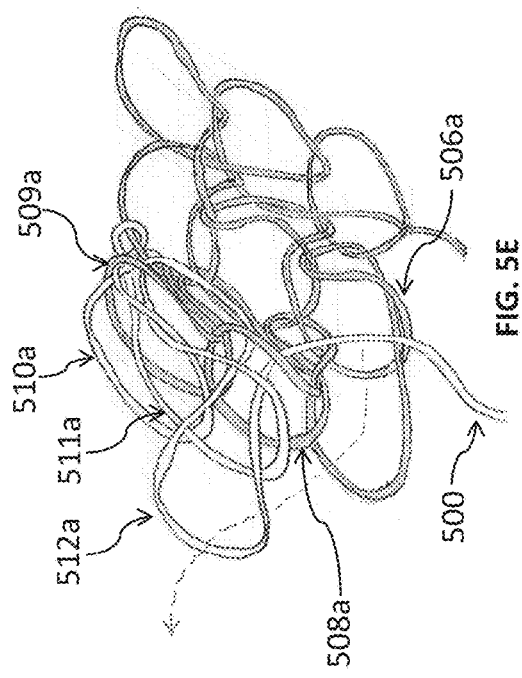
FIG. 5G depicts interlinking stitching subunits in two planes.
Figure 5H:
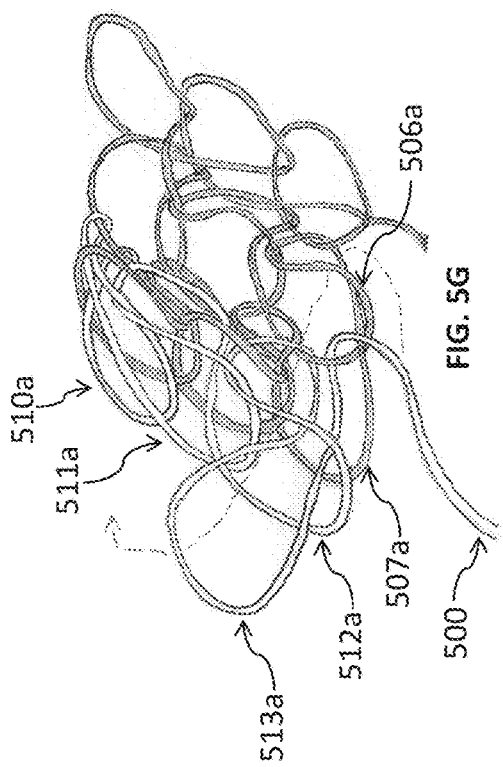
FIG. 5H depicts a cuboid representation of FIG. 5G.

FIG. 5G depicts the result of said pull-through/traversal. A new active loop 513a has been formed that is interlinked to the previous stitch 512a. The previous (now set) stitch 512a is positioned on top of (with respect to the Z-axis) the stitch 507a of the first layer. The stitch 512a forms a third stitch of the second layer that extends the structure in the Z-direction and negative X-direction. Because the working yarn has traversed through the sixth stitch of the first layer 506a (through a loop section shared with the seventh stitch of the first layer 507a), this third stitch of the second layer 512a is also interlinked in the Z-direction. FIG. 5H depicts a corresponding symbolic representation of the structure in FIG. 5G. The cuboid 513b corresponds to the active loop 513a, the cuboid 512b corresponds to the third stitch of the second layer 512a, and the cuboid 507b corresponds to the seventh stitch of the first layer 507a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

As depicted in FIG. 5G the next step of this exemplary process is to draw a section of the working yarn 500 under the right loop of the sixth set stitch of the first layer 506a and then under the active loop 513a in yet another pull-through. Traversing the working yarn through a stitch on the first layer (506a) creates another interlink that binds the first layer and second layer.

Figure 5J:
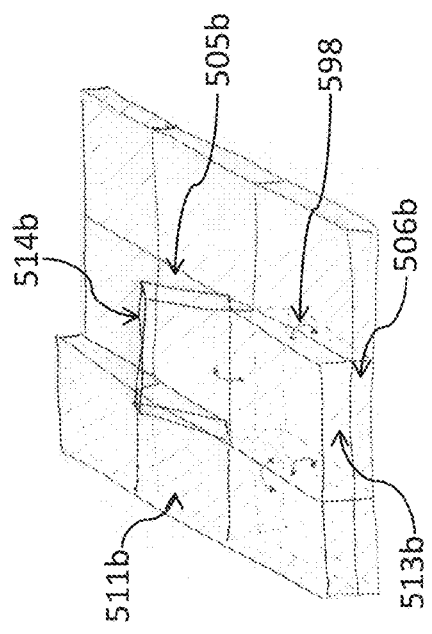
FIG. 5J depicts a cuboid representation of FIG. 5I.
Figure 5L:
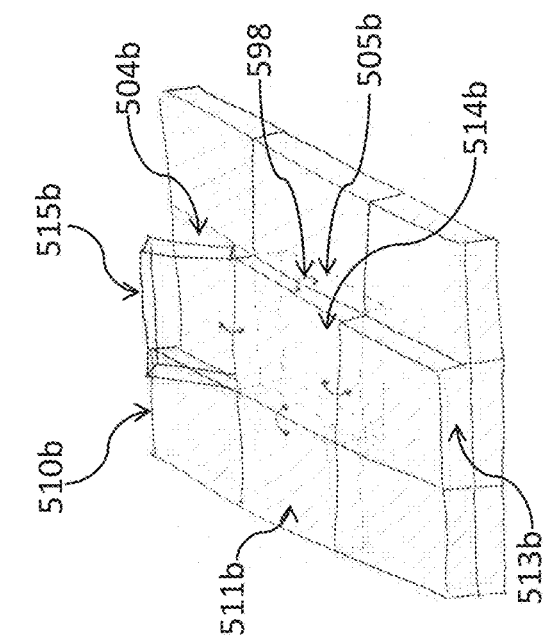
FIG. 5L depicts a cuboid representation of FIG. 5K.
Figure 5I:
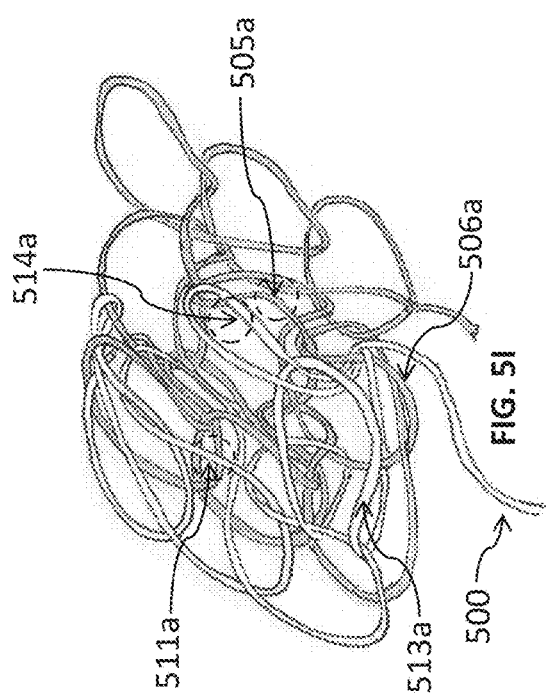
FIG. 5I depicts interlinking stitching subunits in two planes.

FIG. 5I depicts the result of said pull-through/traversal. A new active loop 514a has been formed that is interlinked to the previous stitch 513a. The previous (now set) stitch 513a is positioned on top of (with respect to the Z-axis) the stitch 506a of the first layer. The stitch 513a forms a fourth stitch of the second layer that extends the structure in the Z-direction and negative Y-direction. Because the working yarn has traversed through the sixth stitch of the first layer 506a, this fourth stitch of the second layer 513a is also interlinked in the Z-direction. FIG. 5J depicts a corresponding symbolic representation of the structure in FIG. 5I. The cuboid 514b corresponds to the active loop 514a, the cuboid 513b corresponds to the fourth stitch of the second layer 513a, and the cuboid 506b corresponds to the sixth stitch of the first layer 506a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

Referring to FIG. 5I and the circled regions, the next step of this exemplary process is to draw a section of the working yarn 500 firstly under the right loop of the fifth set stitch of the first layer 505a, then under the right loop of the second stitch of the second layer 511a, and then finally under the active loop 514a in a pull-through. Notice that the working yarn now traverses three loops. Traversing the working yarn through a stitch on the first layer (505a) creates another interlink that binds the first layer and second layer. Traversing the working yarn also through a stitch on the second layer (511a) creates another interlink that binds two stitches (511a and 514a) on the second layer in the Y-direction.

Figure 5K:
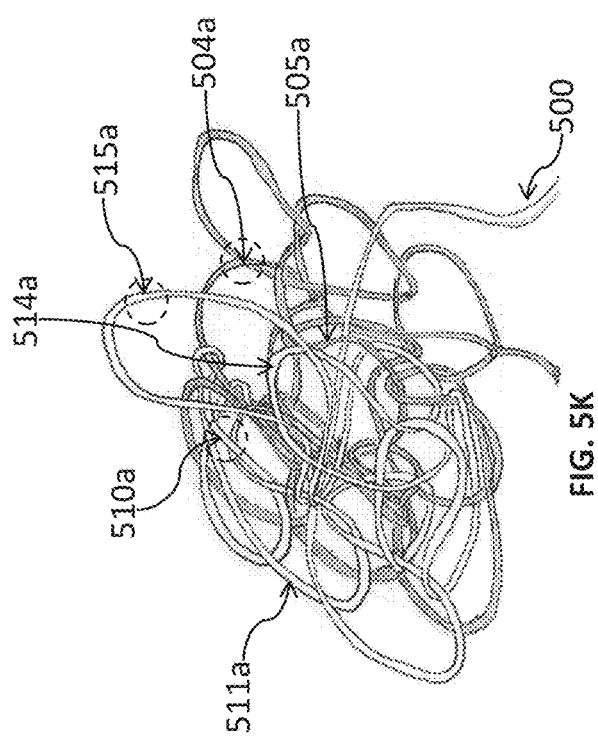
FIG. 5K depicts interlinking stitching subunits in two planes.
Figure 5N:
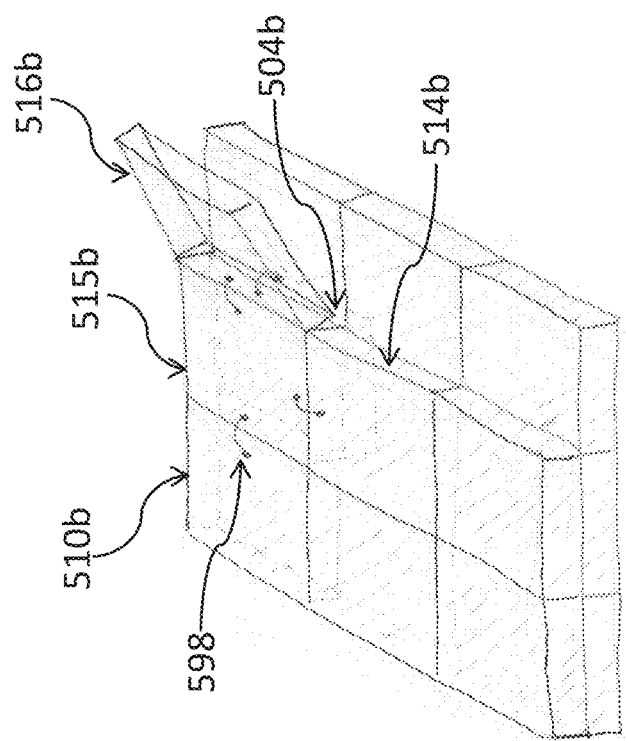
FIG. 5N depicts a cuboid representation of FIG. 5M.

FIG. 5K depicts the result of said pull-through/traversal. A new active loop 515a has been formed that is interlinked to the previous stitch 514a. The previous (now set) stitch 514a is positioned on top of (with respect to the Z-axis) the stitch 505a of the first layer. The stitch 514a forms a fifth stitch of the second layer that extends the 3D volume of the structure. Because the working yarn has traversed through the fifth stitch of the first layer 505a, this fifth stitch of the second layer 514a is also interlinked in the Z-direction. Because the working yarn has also traversed through the second stitch of the second layer 511a, this fifth stitch of the second layer 514a is also interlinked in the Y-direction. FIG. 5L depicts a corresponding symbolic representation of the structure in FIG. 5K. The cuboid 515b corresponds to the active loop 515a, the cuboid 514b corresponds to the fifth stitch of the second layer 514a, and the cuboid 505b corresponds to the fifth stitch of the first layer 505a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions.

Referring to FIG. 5K and the circled regions, the next step of this exemplary process is to draw a section of the working yarn 500 firstly under the right loop of the fourth set stitch of the first layer 504a, then under the right loop of the first set stitch of the second layer 510a, and then finally under the active loop 515a in a pull-through. Notice that the working yarn traverses three loops. Traversing the working yarn through a stitch on the first layer (504a) creates another interlink that binds the first layer and second layer. Traversing the working yarn also through a stitch on the second layer (510a) creates another interlink that binds two stitches (510a and 515a) on the second layer in the Y-direction.

Figure 5M:
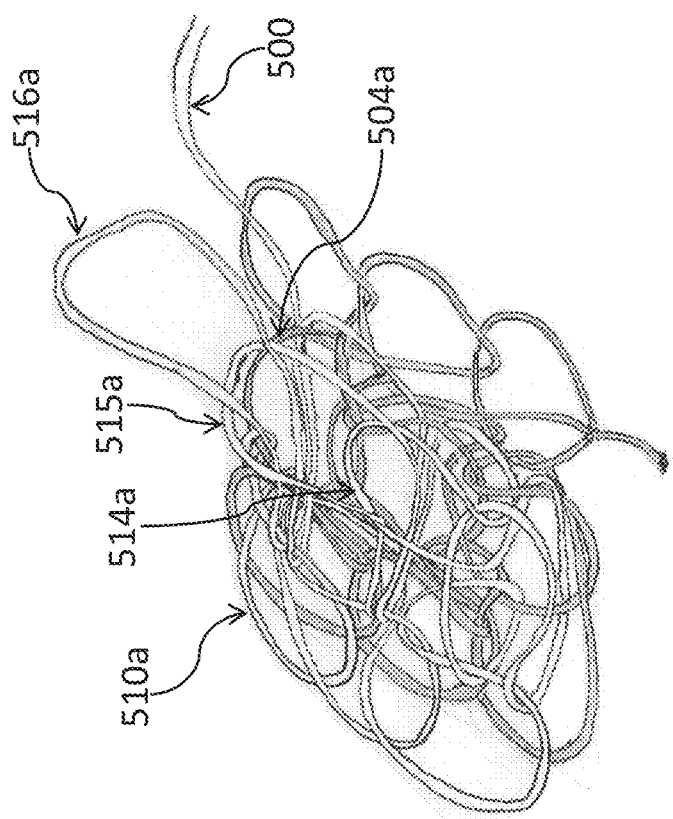
FIG. 5M depicts interlinking stitching subunits in two planes.

FIG. 5M depicts the result of said pull-through/traversal. A new active loop 516a has been formed that is interlinked to the previous stitch 515a. The previous (now set) stitch 515a is positioned on top of (with respect to the Z-axis) the stitch 504a of the first layer. The stitch 515a forms a sixth stitch of the second layer that extends the 3D volume of the structure. Because the working yarn has traversed through the fourth stitch of the first layer 504a, this sixth stitch of the second layer 515a is also interlinked in the Z-direction. Because the working yarn has also traversed through the first stitch of the second layer 510a, this sixth stitch of the second layer 515a is also interlinked in the Y-direction. FIG. 5N depicts a corresponding symbolic representation of the structure in FIG. 5M. The cuboid 516b corresponds to the active loop 516a, the cuboid 515b corresponds to the sixth stitch of the second layer 515a, and the cuboid 504b corresponds to the fourth stitch of the first layer 504a. The arced lines (for clarity only a subset is depicted and only an example denoted by reference numeral 598 is directly labeled) illustrate the interlinks between stitches. Notice that stitches on the second layer are interlinked with each other and also interlinked with stitches on the first layer. These interlinks will bind the structure together in the X-, Y- and Z-dimensions, and the specific pattern of interlinks give rise to the final shape and other physical properties of the article of manufacture.

What is claimed is:

1. A system capable of incrementally producing a 3D structure, without requiring a phase change of an input material to produce the 3D structure, the system comprising:
   a material feeder with an amount of an input material disposed thereon;
   an active receiver including a hook and latch element adapted to contact the amount of the input material disposed on the material feeder, and translate the amount of the input material away from the material feeder, wherein the active receiver arranges the amount of the input material into a plurality of interlinked subunits that resemble a desired 3D structure by:
      forming a subunit of the plurality of interlinked subunits by traversing the input material through at least one loop of at least one previously-formed subunit, thereby interlinking the formed subunit with the at least one previously-formed subunit; and
      selecting the at least one previously-formed subunit through which the formed subunit traverses, the selection made such that the interlinked formed subunit and at least one previously-formed subunit are disposed adjacent each other, such that a volume of an incrementally produced 3D structure incrementally increases;
   a planar ground platform disposed below the active receiver, the planar ground platform forming a work surface to anchor the incrementally produced 3D structure thereon; and an elongated, protruding tapered tusk having a blunt tip, the protruding tapered tusk disposed proximate to the active receiver with the blunt tip disposed proximate to the planar ground platform such that the incrementally produced 3D structure is disposed between the blunt tip and the planar ground platform, the protruding tapered tusk made of a material having a coefficient of friction greater than a coefficient of friction of the input material, the protruding tapered tusk capable of omnidirectional movement with respect to the planar ground platform, the protruding tapered tusk adapted to contact at least a portion of the incrementally produced 3D structure, and to apply a directed force onto the portion of the incrementally produced 3D structure, such that the portion of the incrementally produced 3D structure is translated, and such that a shape of the incrementally produced 3D structure can be manipulated.

* * * * *